(12) United States Patent
Oda et al.

(10) Patent No.: US 8,780,072 B2
(45) Date of Patent: Jul. 15, 2014

(54) POINTER DETECTION APPARATUS AND POINTER DETECTION METHOD

(75) Inventors: Yasuo Oda, Saitama (JP); Yoshihisa Sugiyama, Saitama (JP); Sadao Yamamoto, Saitama (JP)

(73) Assignee: Wacom Co., Ltd., Saitama (JP)

( * ) Notice: Subject to any disclaimer, the term of this patent is extended or adjusted under 35 U.S.C. 154(b) by 440 days.

(21) Appl. No.: 12/815,172

(22) Filed: Jun. 14, 2010

(65) Prior Publication Data

US 2011/0153263 A1    Jun. 23, 2011

(30) Foreign Application Priority Data

Dec. 18, 2009   (JP) ................................. 2009-288273

(51) Int. Cl.
| G06F 3/045 | (2006.01) |
|---|---|
| G06F 3/041 | (2006.01) |
| G06F 3/046 | (2006.01) |
| G06F 3/0354 | (2013.01) |

(52) U.S. Cl.
CPC .......... *G06F 3/03545* (2013.01); *G06F 3/0416* (2013.01); *G06F 2203/04111* (2013.01); *G06F 3/046* (2013.01)
USPC ...................... 345/174; 178/18.05; 178/18.06; 345/173

(58) Field of Classification Search
CPC ................................ G06F 3/041; G06F 3/044
USPC ............ 345/173, 174, 179; 178/18.01, 18.03, 178/18.05, 18.06, 19.01, 19.03
See application file for complete search history.

(56) References Cited

U.S. PATENT DOCUMENTS

| 5,625,382 | A | 4/1997 | Ebihara et al. | |
|---|---|---|---|---|
| 5,841,427 | A | 11/1998 | Teterwak | |
| 6,522,320 | B1* | 2/2003 | Chou | 345/157 |
| 7,075,316 | B2 | 7/2006 | Umeda et al. | 324/658 |
| 7,078,918 | B2 | 7/2006 | Umeda et al. | 324/679 |
| 7,084,645 | B1 | 8/2006 | Umeda et al. | 324/686 |

(Continued)

FOREIGN PATENT DOCUMENTS

| CA | 2 316 067 A1 | 2/2002 |
|---|---|---|
| CN | 1749819 A | 3/2006 |

(Continued)

OTHER PUBLICATIONS

Extended European Search Report for corresponding European Application No. 10158389.6, dated Dec. 30, 2010, 2 pages.

(Continued)

*Primary Examiner* — Lun-Yi Lao
*Assistant Examiner* — Ibrahim Khan
(74) *Attorney, Agent, or Firm* — Seed IP Law Group PLLC

(57) ABSTRACT

A pointer detection apparatus and a pointer detection method of the cross point electrostatic coupling type are disclosed, by which a pointer on a conductor pattern can be detected at a higher speed. The pointer detection apparatus includes a conductor pattern, a spread code supplying circuit, a reception conductor selection circuit, an amplification circuit, an analog to digital conversion circuit, and a correlation value calculation circuit. The spread code supplying circuit supplies a plurality of spread codes at the same time. The correlation value calculation circuit determines correlation values between signals output from the analog to digital conversion circuit and the correlation calculation codes respectively corresponding to the spread codes. A pointer is detected based on the determined correlation values.

10 Claims, 57 Drawing Sheets

(56) References Cited

U.S. PATENT DOCUMENTS

| | | |
|---|---|---|
| 7,084,860 B1 | 8/2006 | Jaeger et al. |
| 7,742,041 B2 | 6/2010 | Lee et al. |
| 7,773,078 B2 | 8/2010 | Lee et al. |
| 7,868,874 B2 | 1/2011 | Reynolds |
| 8,552,998 B2 | 10/2013 | Hotelling et al. |
| 2001/0008523 A1 | 7/2001 | Song |
| 2004/0113895 A1 | 6/2004 | Lubarsky, Jr. et al. |
| 2005/0001665 A1 | 1/2005 | Lin |
| 2005/0073324 A1 | 4/2005 | Umeda et al. |
| 2005/0146513 A1 | 7/2005 | Hill et al. |
| 2006/0007181 A1 | 1/2006 | Jung et al. |
| 2006/0017710 A1 | 1/2006 | Lee et al. |
| 2006/0060752 A1 | 3/2006 | Lee et al. |
| 2006/0097991 A1 | 5/2006 | Hotelling et al. |
| 2006/0146038 A1 | 7/2006 | Park et al. |
| 2007/0062852 A1 | 3/2007 | Zachut et al. |
| 2007/0109274 A1* | 5/2007 | Reynolds ............... 345/173 |
| 2007/0229464 A1* | 10/2007 | Hotelling et al. ...... 345/173 |
| 2007/0229468 A1 | 10/2007 | Peng et al. |
| 2007/0257890 A1 | 11/2007 | Hotelling et al. |
| 2008/0012835 A1* | 1/2008 | Rimon et al. ........... 345/173 |
| 2008/0062139 A1 | 3/2008 | Hotelling et al. ...... 345/173 |
| 2008/0122798 A1* | 5/2008 | Koshiyama et al. .... 345/173 |
| 2008/0158167 A1* | 7/2008 | Hotelling et al. ...... 345/173 |
| 2008/0158175 A1 | 7/2008 | Hotelling et al. ...... 345/173 |
| 2008/0158180 A1 | 7/2008 | Krah et al. ............. 345/173 |
| 2008/0162996 A1 | 7/2008 | Krah et al. |
| 2008/0225015 A1 | 9/2008 | Hashida |
| 2008/0309625 A1 | 12/2008 | Krah et al. ............. 345/173 |
| 2009/0002337 A1 | 1/2009 | Chang |
| 2009/0009483 A1 | 1/2009 | Hotelling et al. ...... 345/173 |
| 2009/0127005 A1 | 5/2009 | Zachut et al. |
| 2009/0167720 A1 | 7/2009 | Geaghan |
| 2010/0059295 A1* | 3/2010 | Hotelling et al. ...... 178/18.06 |
| 2010/0060591 A1 | 3/2010 | Yousefpor et al. |
| 2010/0060593 A1 | 3/2010 | Krah |
| 2010/0060596 A1* | 3/2010 | Whight ................... 345/173 |
| 2010/0073301 A1 | 3/2010 | Yousefpor et al. |
| 2010/0085324 A1 | 4/2010 | Noguchi et al. |
| 2010/0321313 A1 | 12/2010 | Oda et al. |
| 2010/0321314 A1 | 12/2010 | Oda et al. |
| 2010/0321315 A1 | 12/2010 | Oda et al. |
| 2010/0321331 A1 | 12/2010 | Oda et al. |
| 2010/0321332 A1 | 12/2010 | Oda et al. |
| 2010/0321333 A1 | 12/2010 | Oda et al. |
| 2010/0321334 A1 | 12/2010 | Oda et al. |
| 2010/0328265 A1 | 12/2010 | Hotelling et al. |
| 2011/0042152 A1 | 2/2011 | Wu |
| 2011/0148785 A1 | 6/2011 | Oda et al. ............... 345/173 |
| 2011/0148806 A1 | 6/2011 | Oda et al. ............... 345/174 |
| 2012/0212441 A1 | 8/2012 | Christiansson et al. |

FOREIGN PATENT DOCUMENTS

| | | |
|---|---|---|
| CN | 1753447 A | 3/2006 |
| CN | 1771430 A | 5/2006 |
| CN | 101046720 A | 10/2007 |
| CN | 101266531 A | 9/2008 |
| CN | 101310246 A | 11/2008 |
| CN | 201293982 Y | 8/2009 |
| EP | 2113828 A2 | 11/2009 |
| EP | 2133776 A1 | 12/2009 |
| JP | 5-224818 | 9/1993 |
| JP | 6-4213 | 1/1994 |
| JP | 7-141088 | 6/1995 |
| JP | 8-87369 | 4/1996 |
| JP | 8-179871 | 7/1996 |
| JP | 8-190453 | 7/1996 |
| JP | 8-241161 | 9/1996 |
| JP | 9-45184 | 2/1997 |
| JP | 9-222947 | 8/1997 |
| JP | 09292950 A | 11/1997 |
| JP | 10-161795 | 6/1998 |
| JP | 2000-76014 | 3/2000 |
| JP | 2000-105645 | 4/2000 |
| JP | 2000-112642 | 4/2000 |
| JP | 2002076984 A | 3/2002 |
| JP | 2003-22158 | 1/2003 |
| JP | 2005-114361 | 4/2005 |
| JP | 2005122814 A | 5/2005 |
| JP | 2005-152223 | 6/2005 |
| JP | 2005-157643 | 6/2005 |
| JP | 3144241 U | 8/2008 |
| JP | 2008-257374 A | 10/2008 |
| JP | 2009054141 A | 3/2009 |
| JP | 2009516295 A | 4/2009 |
| WO | 2007017848 A2 | 2/2007 |
| WO | 2008007372 A2 | 1/2008 |
| WO | 2008/085719 | 7/2008 |

OTHER PUBLICATIONS

Japanese Office Action dated Mar. 12, 2013, for corresponding JP Application No. 2009-288273, 2 pages.
Japanese Office Action dated Apr. 16, 2013, for corresponding JP Application No. 2009-145880, 2 pages.
Office Action, dated Nov. 22, 2013, for corresponding Chinese Application No. 201010208533.0, 15 pages.
Chinese Office Action dated Jan. 6, 2014, for corresponding CN Application No. 2014010100238580, 6 pages.
Partial European Search report dated Jan. 3, 2014, for corresponding EP Application No. 10194073.2, 6 pages.
Extended European Search Report dated Jan. 7, 2014, for corresponding EP Application No. 10194074.0, 8 pages.
Chinese Office Action dated Apr. 1, 2014, for corresponding CN Application No. 20101058324.0, 19 pages.

* cited by examiner

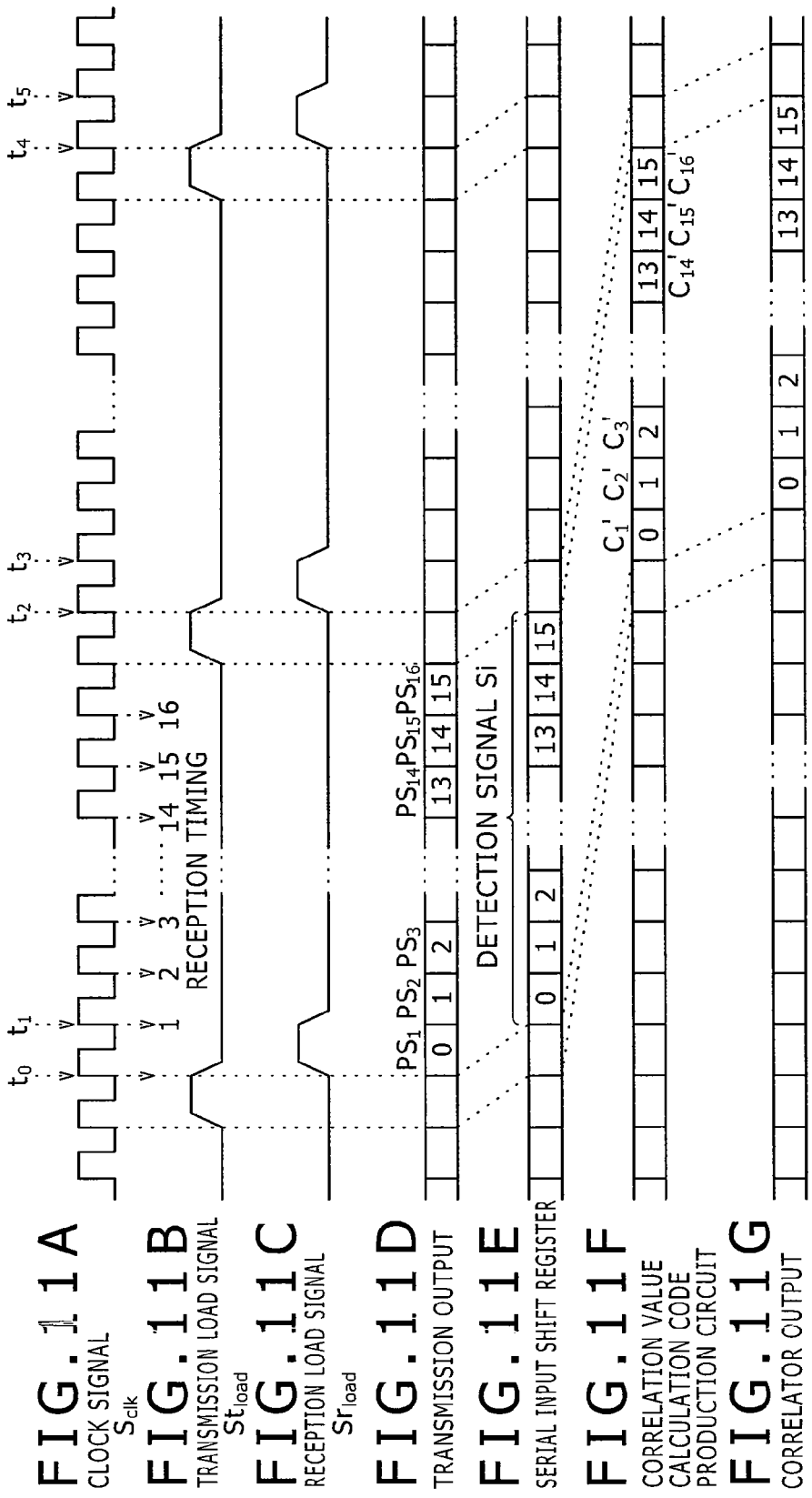

OUTPUT SIGNAL OF CORRELATOR

FIG.17A
EXAMPLE OF HADAMARD CODE (16 CHIPS)
|  | $PN_1$ | $PN_2$ | | | | | | | | | | | | | | $PN_{16}$ |
|---|---|---|---|---|---|---|---|---|---|---|---|---|---|---|---|---|
| $C_1$ | 1 | 1 | 1 | 1 | 1 | 1 | 1 | 1 | 1 | 1 | 1 | 1 | 1 | 1 | 1 | 1 |
| $C_2$ | 1 | -1 | 1 | -1 | 1 | -1 | 1 | -1 | 1 | -1 | 1 | -1 | 1 | -1 | 1 | -1 |
| $C_3$ | 1 | 1 | -1 | -1 | 1 | 1 | -1 | -1 | 1 | 1 | -1 | -1 | 1 | 1 | -1 | -1 |
| $C_4$ | 1 | -1 | -1 | 1 | 1 | -1 | -1 | 1 | 1 | -1 | -1 | 1 | 1 | -1 | -1 | 1 |
| $C_5$ | 1 | 1 | 1 | 1 | -1 | -1 | -1 | -1 | 1 | 1 | 1 | 1 | -1 | -1 | -1 | -1 |
| $C_6$ | 1 | -1 | 1 | -1 | -1 | 1 | -1 | 1 | 1 | -1 | 1 | -1 | -1 | 1 | -1 | 1 |
| $C_7$ | 1 | 1 | -1 | -1 | -1 | -1 | 1 | 1 | 1 | 1 | -1 | -1 | -1 | -1 | 1 | 1 |
| $C_8$ | 1 | -1 | -1 | 1 | -1 | 1 | 1 | -1 | 1 | -1 | -1 | 1 | -1 | 1 | 1 | -1 |
| $C_9$ | 1 | 1 | 1 | 1 | 1 | 1 | 1 | 1 | -1 | -1 | -1 | -1 | -1 | -1 | -1 | -1 |
| $C_{10}$ | 1 | -1 | 1 | -1 | 1 | -1 | 1 | -1 | -1 | 1 | -1 | 1 | -1 | 1 | -1 | 1 |
| $C_{11}$ | 1 | 1 | -1 | -1 | 1 | 1 | -1 | -1 | -1 | -1 | 1 | 1 | -1 | -1 | 1 | 1 |
| $C_{12}$ | 1 | -1 | -1 | 1 | 1 | -1 | -1 | 1 | -1 | 1 | 1 | -1 | -1 | 1 | 1 | -1 |
| $C_{13}$ | 1 | 1 | 1 | 1 | -1 | -1 | -1 | -1 | -1 | -1 | -1 | -1 | 1 | 1 | 1 | 1 |
| $C_{14}$ | 1 | -1 | 1 | -1 | -1 | 1 | -1 | 1 | -1 | 1 | -1 | 1 | 1 | -1 | 1 | -1 |
| $C_{15}$ | 1 | 1 | -1 | -1 | -1 | -1 | 1 | 1 | -1 | -1 | 1 | 1 | 1 | 1 | -1 | -1 |
| $C_{16}$ | 1 | -1 | -1 | 1 | -1 | 1 | 1 | -1 | -1 | 1 | 1 | -1 | 1 | -1 | -1 | 1 |
FIG.17B
EXAMPLE OF HADAMARD CODE (15 CHIPS)
|  | $PN_1$ | $PN_2$ | | | | | | | | | | | | | $PN_{15}$ |
|---|---|---|---|---|---|---|---|---|---|---|---|---|---|---|---|
| $C_1$ | 1 | 1 | 1 | 1 | 1 | 1 | 1 | 1 | 1 | 1 | 1 | 1 | 1 | 1 | 1 |
| $C_2$ | -1 | 1 | -1 | 1 | -1 | 1 | -1 | 1 | -1 | 1 | -1 | 1 | -1 | 1 | -1 |
| $C_3$ | 1 | -1 | -1 | 1 | 1 | -1 | -1 | 1 | 1 | -1 | -1 | 1 | 1 | -1 | -1 |
| $C_4$ | -1 | -1 | 1 | 1 | -1 | -1 | 1 | 1 | -1 | -1 | 1 | 1 | -1 | -1 | 1 |
| $C_5$ | 1 | 1 | 1 | -1 | -1 | -1 | -1 | 1 | 1 | 1 | 1 | -1 | -1 | -1 | -1 |
| $C_6$ | -1 | 1 | -1 | -1 | 1 | -1 | 1 | 1 | -1 | 1 | -1 | -1 | 1 | -1 | 1 |
| $C_7$ | 1 | -1 | -1 | -1 | -1 | 1 | 1 | 1 | 1 | -1 | -1 | -1 | -1 | 1 | 1 |
| $C_8$ | -1 | -1 | 1 | -1 | 1 | 1 | -1 | 1 | -1 | -1 | 1 | -1 | 1 | 1 | -1 |
| $C_9$ | 1 | 1 | 1 | 1 | 1 | 1 | 1 | -1 | -1 | -1 | -1 | -1 | -1 | -1 | -1 |
| $C_{10}$ | -1 | 1 | -1 | 1 | -1 | 1 | -1 | -1 | 1 | -1 | 1 | -1 | 1 | -1 | 1 |
| $C_{11}$ | 1 | -1 | -1 | 1 | 1 | -1 | -1 | -1 | -1 | 1 | 1 | -1 | -1 | 1 | 1 |
| $C_{12}$ | -1 | -1 | 1 | 1 | -1 | -1 | 1 | -1 | 1 | 1 | -1 | -1 | 1 | 1 | -1 |
| $C_{13}$ | 1 | 1 | 1 | -1 | -1 | -1 | -1 | -1 | -1 | -1 | -1 | 1 | 1 | 1 | 1 |
| $C_{14}$ | -1 | 1 | -1 | -1 | 1 | -1 | 1 | -1 | 1 | -1 | 1 | 1 | -1 | 1 | -1 |
| $C_{15}$ | 1 | -1 | -1 | -1 | -1 | 1 | 1 | -1 | -1 | 1 | 1 | 1 | 1 | -1 | -1 |
| $C_{16}$ | -1 | -1 | 1 | -1 | 1 | 1 | -1 | -1 | 1 | 1 | -1 | 1 | -1 | -1 | 1 |
FIG.17C
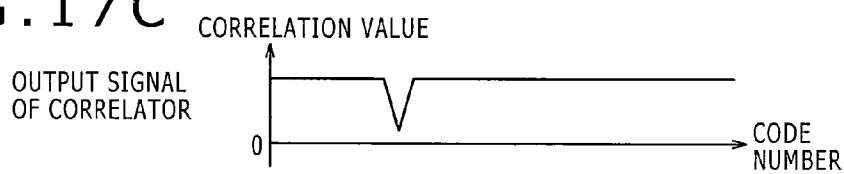
OUTPUT SIGNAL OF CORRELATOR
FIG.17D
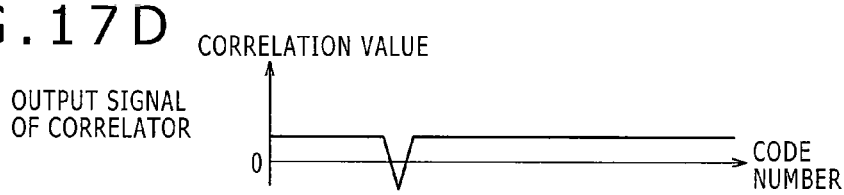
OUTPUT SIGNAL OF CORRELATOR

BEFORE PSK MODULATION

AFTER PSK MODULATION

BEFORE FSK MODULATION

AFTER FSK MODULATION $Y_{n+3}$
$Y_{n+2}$
$Y_{n+1}$ ← $C_k$
$Y_n$ ← $C_k$ $Y_{n+3}$ ← $C_k$
$Y_{n+2}$ ← $C_k$
$Y_{n+1}$
$Y_n$ $Y_{n+3}$
$Y_{n+2}$
$Y_{n+1}$ ← $C_k$
$Y_n$ ← $C_k$ $Y_{n+3}$
$Y_{n+2}$ ← $C_k$
$Y_{n+1}$ ← $C_k$
$Y_n$ $Y_{n+3}$ ← $C_k$
$Y_{n+2}$ ← $C_k$
$Y_{n+1}$
$Y_n$

FIG. 47A
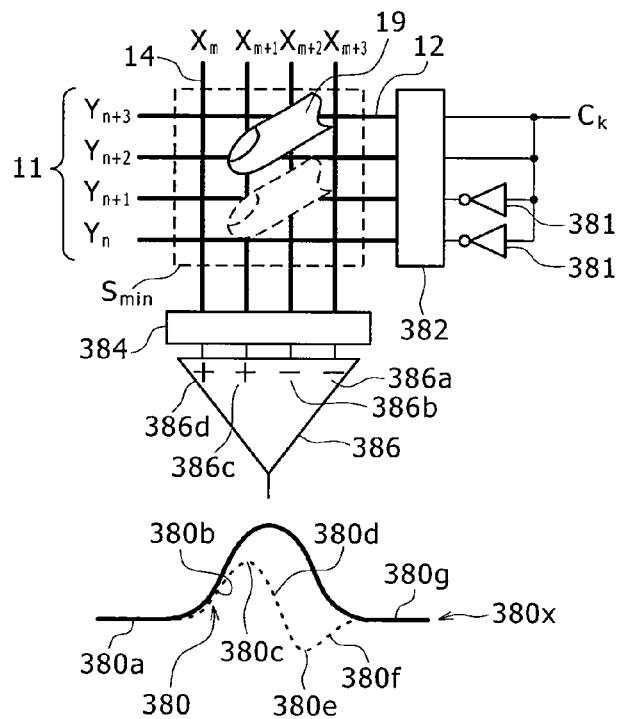
FIG. 47B
FIG. 48
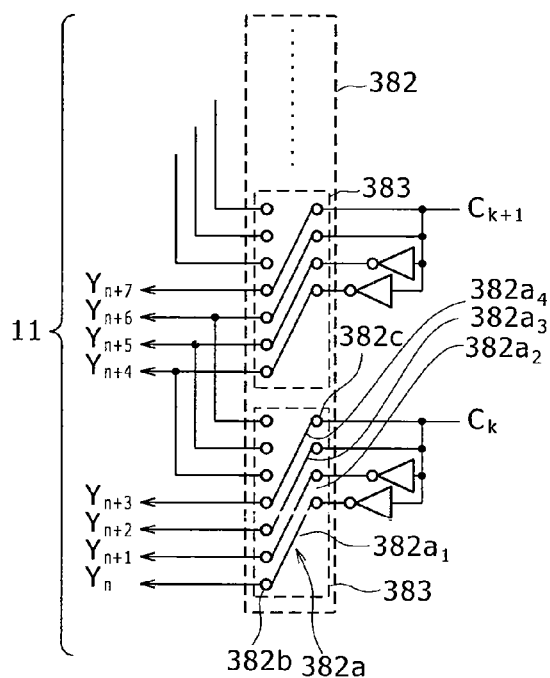

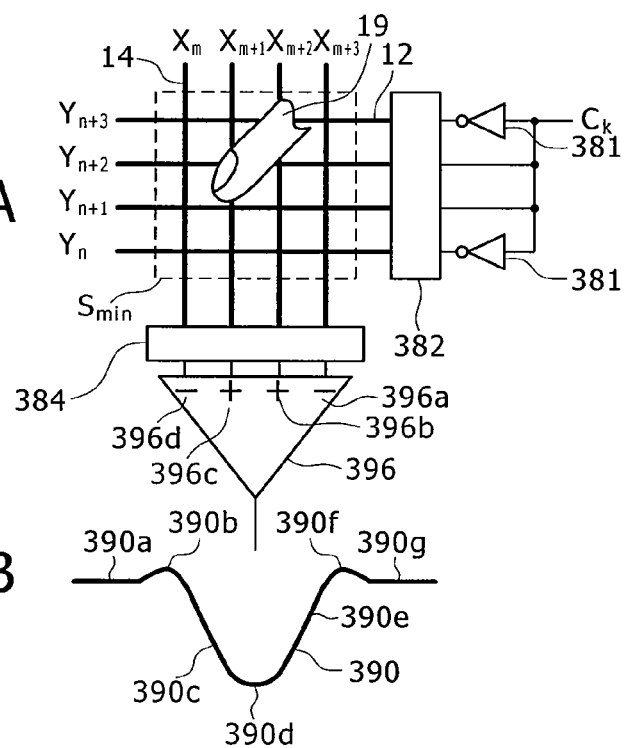
FIG.50A
FIG.50B
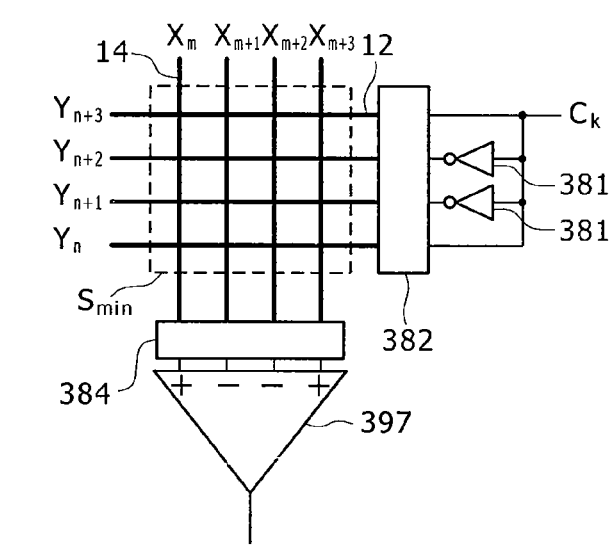
FIG.51

FIG.56A
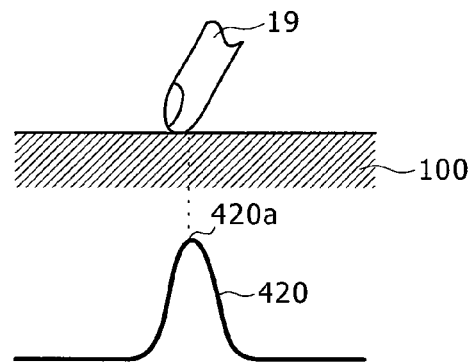
FIG.56B
FIG.57A
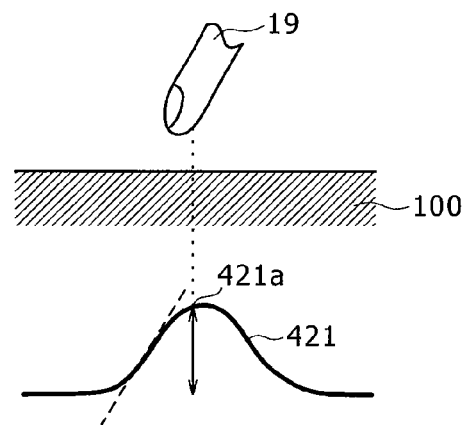
FIG.57B
FIG.58
| 20 | 50 | 20 |
|----|----|----|
| 50 | 100| 50 |
| 20 | 50 | 20 |

FIG.65A
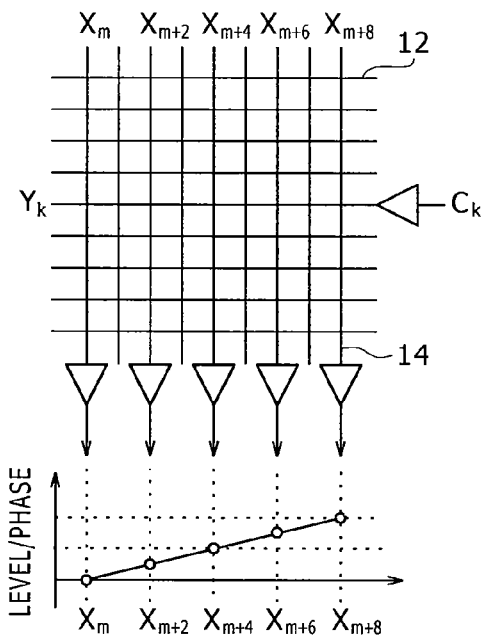
FIG.65B
FIG.66A
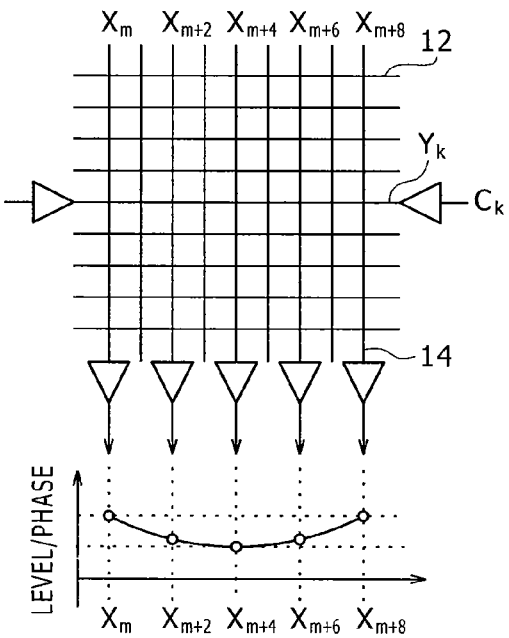
FIG.66B

POINTER DETECTION APPARATUS AND POINTER DETECTION METHOD

CROSS REFERENCES TO RELATED APPLICATIONS

The present application claims priority under 35 U.S.C. §119 from Japanese Patent Application JP 2009-288273, filed in the Japanese Patent Office on Dec. 18, 2009, the entire content of which is incorporated herein by reference.

BACKGROUND OF THE INVENTION

1. Field of the Invention

This invention relates to a pointer detection apparatus and a pointer detection method, and more particularly to a pointer detection apparatus and a pointer detection method wherein a plurality of pointers can be detected at a high speed.

2. Description of the Related Art

Conventionally, for the detection of the position of a pointer used with a touch panel or a like apparatus, various sensor systems have been proposed, such as a resistive film system, an electrostatic coupling system and an electrostatic capacitive system. In recent years, a pointer detection apparatus of the electrostatic coupling system type has been vigorously developed.

Electrostatic coupling systems are divided into two types including a surface capacitive type and a projected capacitive type. An electrostatic coupling system of the surface capacitive type is applied, for example, in an ATM (Automated Teller Machine), and that of the projected capacitive type is applied, for example, in a mobile telephone set. In both types, a variation of the electrostatic coupling state between a sensor electrode and a pointer such as a finger or an electrostatic pen is detected in order to detect the position of the pointer.

A pointer detection apparatus of the projected capacitive electrostatic coupling system includes an electrode formed in a predetermined pattern, for example, on a transparent substrate or a transparent film. The apparatus detects a variation of the electrostatic coupling state between a pointer and the electrode when the pointer approaches the electrode. For a pointer detection apparatus of this type, various techniques for optimizing the configuration have been proposed and are disclosed, for example, in Japanese Patent Laid-Open Nos. 2003-22158, Hei 9-222947, and Hei 10-161795 (referred to as Patent Document 1, 2 and 3, respectively, hereinafter). In particular, Patent Document 1 discloses a code division multiplexing system which uses an orthogonal spread code. Patent Document 2 discloses a coordinate inputting apparatus which uses a pseudo-random signal. Patent Document 3 discloses a pen for use with an electrostatic capacitive coordinate apparatus.

A pointer detection apparatus of the type called cross point electrostatic coupling system has been developed from the projected capacitive type electrostatic coupling system. Here, operation of a pointer detection apparatus of the cross point electrostatic coupling system is described briefly with reference to the accompanying drawings. FIG. 75A shows a general configuration of a sensor section and associated elements of a pointer detection apparatus of the cross point electrostatic coupling system, and FIG. 75B illustrates an output signal waveform of the pointer detection apparatus.

Referring to FIGS. 75A and 75B, a sensor section 900 includes a transmission conductor array 901 formed from a plurality of transmission conductors 902, and a reception conductor array 903 formed from a plurality of reception conductors 904. An insulating film is formed between the transmission conductor array 901 and the reception conductor array 903. The transmission conductors 902 have a predetermined shape and extend in a predetermined direction, in FIG. 75A, in the direction indicated by an arrow mark X and are disposed in parallel to, and spaced apart by a predetermined distance from, each other. The reception conductors 904 have a predetermined shape and extend in a direction crossing the extension direction of the transmission conductors 902, that is, in the direction indicated by an arrow mark Y in FIG. 75A. The reception conductors 904 are disposed in parallel to, and spaced apart by a predetermined distance from, each other.

In a pointer detection apparatus which uses the sensor section 900 having the configuration described above, for example, a predetermined signal is supplied to a predetermined one of the transmission conductors 902. A variation of current flowing to a cross point between the predetermined transmission conductor 902, to which the predetermined signal is supplied, and a reception conductor 904 is detected at each of all cross points of the predetermined transmission conductor 902 and the reception conductors 904. Here, at a position of the sensor section 900 at which a pointer 910 such as a finger is placed, part of current flowing to the transmission conductor 902 is shunted through the pointer 910 and this changes the current flowing into the reception conductor 904. Therefore, the position of the pointer 910 can be detected by detecting a cross point between the transmission conductor 902, to which the signal is supplied, and the reception conductor 904, to which a varying amount of current flows into. Further, with a pointer detection apparatus of the cross point electrostatic coupling system, simultaneous detection of a plurality of pointers is possible because the current variation is detected for each of a plurality of cross points formed on the sensor section 900.

The principle of position detection of the cross point electrostatic coupling system is described more particularly. A case is considered here where a predetermined signal is supplied to the transmission conductor $Y_6$ and a pointing position of the pointer 910 such as, for example, a finger on the transmission conductor $Y_6$ is detected as seen in FIG. 75A. First, in the state where a signal is supplied to the transmission conductor $Y_6$, the difference between currents flowing to the reception conductors $X_1$ and $X_2$ is detected by means of a differential amplifier 905. Then, after a predetermined interval of time, the reception conductors to be connected to the differential amplifier 905 are switched to the reception conductors $X_2$ and $X_3$, and the difference between currents flowing through the reception conductors $X_2$ and $X_3$ is detected. This operation is repeated up to the reception conductor $X_M$.

Then, a level variation of an output signal of the differential amplifier 905 at the position of each of the cross points between the transmission conductor $Y_6$ and the reception conductors is determined. FIG. 75B illustrates a characteristic of the level variation. Referring to FIG. 75B, the axis of abscissa of the illustrated characteristic represents detection signals output from the reception conductors $X_1$ to $X_M$ when they are temporally successively selected and connected to the differential amplifier 905. It is to be noted that a characteristic indicated by a broken line curve in FIG. 75B represents a level variation of the signal actually output from the differential amplifier 905 and another characteristic indicated by a solid line curve represents a variation of the integration value of the output signal of the differential amplifier 905.

Since the pointer or finger 910 is placed in proximity to the cross points between the transmission conductor $Y_6$ and the reception conductors $X_5$ and $X_{M-5}$, current flowing in the proximity of these cross points varies. Therefore, as seen in FIG. 75B, the output signal of the differential amplifier 905 varies at positions corresponding to positions in proximity to the cross points between the transmission conductor $Y_6$ and the reception conductors $X_5$ and $X_{M-5}$, and the integration value of the output signal varies. The position of the pointer 910 can be detected based on the variation of the integration value. In the conventional pointer detection apparatus, such detection as described above is carried out while successively switching the transmission conductors to be used for the detection one by one.

SUMMARY OF THE INVENTION

A conventional pointer detection apparatus of the cross point electrostatic coupling system as described above carries out supply and reception processes of a signal for each of the transmission conductors and the reception conductors, which define the cross points, to carry out a position detection process of a pointer. Therefore, it has a problem in that, if the position detection process is carried out for all cross points, then a long period of time is required for the process. For example, if the sensor section includes 64 transmission conductors and 128 reception conductors and the detection processing time at each of the cross points is, for example, 256 μsec, then a period of time of approximately two seconds is required for detection at all cross points, that is, at totaling 8,192 cross points. Therefore, such conventional pointer detection apparatus is not suitable for practical use.

It is an object of the present invention to provide a pointer detection apparatus and a pointer detection method of the cross point electrostatic coupling system using which a pointer can be detected at a higher speed.

According to an aspect of the present invention, there is provided a pointer detection apparatus for detecting a pointer positioned on a conductor pattern including a plurality of first conductors disposed in a first direction and a plurality of second conductors disposed in a second direction which crosses the first direction. The pointer detection apparatus further includes a code supplying circuit having a plurality of code strings of different codes from each other for supplying predetermined ones of the code strings to the first conductors disposed in the first direction and forming the conductor pattern. The pointer detection apparatus also includes a correlation value calculation code supplying circuit for supplying correlation value calculation codes that respectively correspond to the code strings, and a correlation calculation circuit for carrying out correlation calculation between signals produced in the second conductors disposed in the second direction and the correlation value calculation codes. The pointer positioned on the conductor pattern is detected based on results of the correlation calculation carried out by the correlation calculation circuit.

According to another aspect of the present invention, there is provided a pointer detection method for detecting a pointer positioned on a conductor pattern including a plurality of first conductors disposed in a first direction and a plurality of second conductors disposed in a second direction which crosses the first direction. The method includes a code supplying step for supplying predetermined ones of a plurality of code strings of different codes from each other to the first conductors disposed in the first direction and forming the conductor pattern. The method further includes a correlation value calculation code supplying step for supplying correlation value calculation codes that respectively correspond to the code strings. The method also includes a correlation calculation processing step for carrying out correlation calculation between signals produced in the second conductors disposed in the second direction and the correlation value calculation codes. According to the method, the pointer positioned on the conductor pattern is detected based on results of the correlation calculation carried out at the correlation calculation processing step.

In the pointer detection apparatus and the pointer detection method according to various exemplary embodiments of the present invention, by supplying a plurality of signals produced based on one or a plurality of code strings different from each other to a plurality of transmission conductors at the same time, presence of a pointer on the conductor pattern as well as the pointing position of the pointer can be detected. In other words, a detection process for a pointer can be carried out at the same time with regard to a plurality of cross points. Therefore, with the pointer detection apparatus and the pointer detection method according to the present invention, presence of one or a plurality of pointers and the pointing positions of the pointer(s) can be detected at a higher speed at the same time.

The above and other objects, features and advantages of the present invention will become apparent from the following description and the appended claims, taken in conjunction with the accompanying drawings.

BRIEF DESCRIPTION OF THE DRAWINGS

FIGS. 11A to 11G are time charts illustrating operation of several components of the pointer detection apparatus of FIG. 1;

FIG. 17A is a view illustrating an example of an Hadamard matrix of 16 chips, FIG. 17B is a similar view but illustrating an example of Hadamard codes of 15 chips, and FIGS. 17C and 17D are waveform diagrams illustrating correlation values where the Hadamard codes illustrated in FIGS. 17A and 17B are used, respectively;

FIG. 47A is a diagrammatic view showing a general configuration of a modification 16, and FIG. 47B is a waveform diagram illustrating a waveform of an output signal of a differential amplifier in the modification 16;

FIG. 48 is a circuit diagram showing a configuration of a transmission conductor selection circuit in the modification 16;

FIG. 50A is a diagrammatic view illustrating supply of a spread code and a reversed code to four transmission conductors positioned adjacent to each other according to a modification 17, and FIG. 50B is a waveform diagram illustrating a waveform of an output signal of a differential amplifier in the modification 17;

FIG. 51 is a diagrammatic view illustrating supply of a spread code and a reversed code to four transmission conductors positioned adjacent to each other according to a modification 18;

FIGS. 56A, 56B and 57A, 57B are views illustrating a principle of discrimination of a hovering state according to a modification 21;

FIG. 58 is a distribution diagram illustrating the principle of discrimination of a hovering state in the modification 21;

FIG. 65A is a schematic view illustrating a manner wherein a spread code is supplied to an arbitrary transmission conductor according to a modification 27, and FIG. 65B is a graph illustrating signals from reception conductors where the spread code supplying manner of FIG. 65A is used;

FIG. 66A is a schematic view illustrating a supplying method of a spread code according to the modification 27, and FIG. 66B is a graph illustrating signals from reception conductors where the supplying method of FIG. 66A is used;

DETAILED DESCRIPTION OF THE PREFERRED EMBODIMENTS

In the following, several embodiments of the present invention of a pointer detection apparatus and a pointer detection method are described with reference to the accompanying drawings. The description is given in the order given below. It is to be noted that, while the following description is given using a pointer detection apparatus as an example, the present invention is not limited to the illustrated embodiments and can be applied in various other apparatus as long as the apparatus detect a pointer positioned in the proximity of, or in contact with, the apparatus.

1. First Embodiment: examples of a basic configuration;
2. Second Embodiment: examples of a configuration which uses a PSK-modulated spread code;
3. Third Embodiment: examples of a configuration which uses an FSK-modulated spread code;
4. Fourth Embodiment: different supplying methods of a spread code;
5. Fifth Embodiment: selection methods of a reception conductor;
6. Sixth Embodiment: different examples of a configuration of a sensor section;
7. Seventh Embodiment: different examples of a configuration of an amplification circuit; and
8. Eighth Embodiment: detection of hovering.

1. First Embodiment

Examples of a Basic Configuration

An example of a basic configuration of a pointer detection apparatus and a pointer detection method according to the present invention is described with reference to FIGS. 1 to 18. It is to be noted that, as a position detection method in the present invention, an electrostatic coupling method is used for detecting the position of a pointer based on the variation of an electrostatic coupling state between a transmission conductor and a reception conductor of a sensor section. Further, in the present embodiment, an example of a configuration is described where spread codes in the form of code strings are supplied at the same time to all transmission conductors and signal detection is carried out at the same time through all reception conductors.

[Configuration of the Pointer Detection Apparatus]

Figure 1:
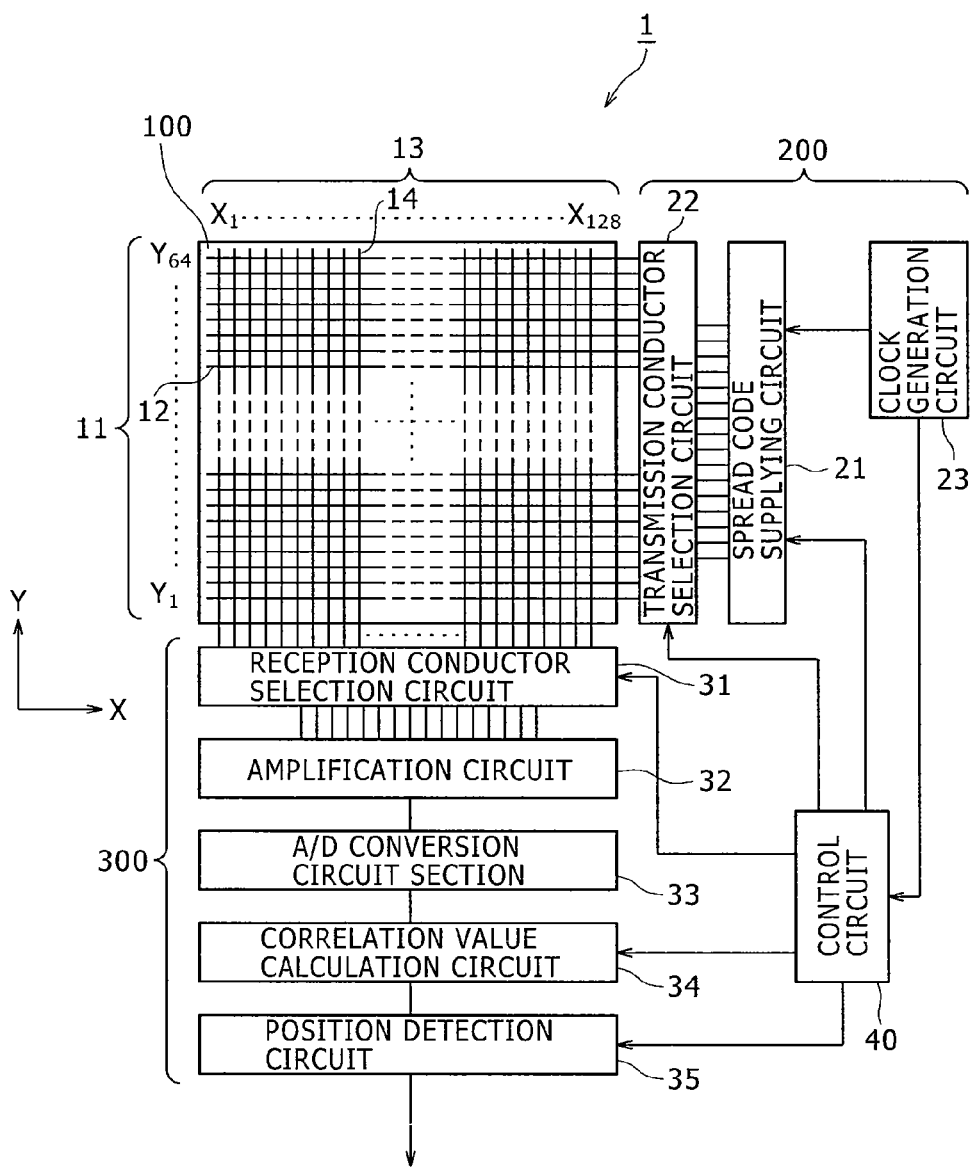
FIG. 1 is a schematic block diagram of a pointer detection apparatus according to a first embodiment of the present invention.

FIG. 1 shows a general configuration of the pointer detection apparatus according to the first embodiment of the present invention.

Referring to FIG. 1, the pointer detection apparatus 1 includes, as principal components thereof, a sensor section 100, a transmission section 200, a reception section 300, and a control circuit 40 for controlling operation of the transmission section 200 and the reception section 300. In the following, the components are described individually.

First, the configuration of the sensor section 100 is described with reference to FIGS. 1 and 2.

Figure 2:
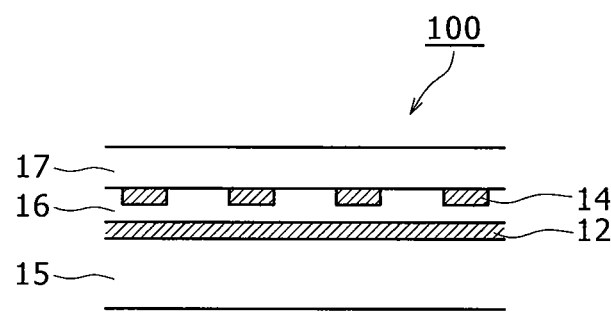
FIG. 2 is a schematic sectional view of a sensor section of the pointer detection apparatus of FIG. 1.

Referring first to FIG. 2, the sensor section 100 includes a first substrate 15 in the form of a substantially flat plate, a transmission conductor array 11 including a plurality of transmission conductors 12, a reception conductor array 13 including a plurality of reception conductors 14, a spacer 16, and a second substrate 17 in the form of a flat plate. In the sensor section 100, the transmission conductors 12, spacer 16, reception conductors 14 and second substrate 17 are arranged and formed in this order on the first substrate 15. Accordingly, the transmission conductors 12 and the reception conductors 14 are disposed in an opposing relationship to each other with the spacer 16 interposed therebetween.

A pointer such as a finger or an electrostatic pen is used on the second substrate 17 side, that is, on the side opposite to the face of the second substrate 17 opposing the first substrate 15. Accordingly, the reception conductors 14 are disposed nearer to the detection face of the pointer detection apparatus 1 than the transmission conductors 12. In one example, a known glass substrate having transparency is used to form the first substrate 15 and the second substrate 17, though a substrate in the form of a sheet or film made of a synthetic resin or the like may also be used in place of the glass substrate.

Each of the transmission conductors 12 and the reception conductors 14 is formed from a transparent electrode film, for example, of an ITO (Indium Tin Oxide) film, a copper foil or the like. The electrode patterns of the transmission conductors 12 can be formed, for example, in the following manner. First, an electrode film formed from any of the materials described above is formed on the first substrate 15, for example, by sputtering, vapor deposition, or (painting) application. Then, the formed electrode film is etched to form the predetermined electrode patterns. Electrode patterns of the reception conductors 14 can be formed on the second substrate 17 in a similar manner. Where the transmission conductors 12 and the reception conductors 14 are formed from a copper foil, it is also possible to use an ink jet printer to spray ink including copper particles to a glass plate or the like to form the predetermined electrode patterns. The transmission conductors 12 and the reception conductors 14 can be formed, for example, as linear or line-shaped conductors. Further, the transmission conductors 12 may be formed as a diamond shape, a linear pattern shape, or the like.

The spacer 16 can be formed from a synthetic resin material such as, for example, PVB (Polyvinyl Butyral), EVA (Ethylene Vinyl Acetate Copolymer), an acrylic-based resin or the like. The spacer 16 may otherwise be formed from a silicon resin having a high refractive index, that is, a high dielectric constant. Also, it is possible to form the spacer 16 from liquid such as oil having a high refractive index, that is, a high dielectric constant. Where a material of a high refractive index is used to form the spacer 16 in this manner, the parallax by the spacer 16 can be suppressed and an optical characteristic is improved.

Where the spacer 16 is formed from a synthetic resin, it can be formed, for example, in the following manner. First, a plastic resin sheet is sandwiched between the transmission conductors 12 and the reception conductors 14. Then, while evacuation between the conductors is carried out, pressurization and heating are carried out to form the spacer 16. Or, for example, a synthetic resin in the form of liquid may be supplied into the space between the transmission conductors 12 and the reception conductors 14, which is thereafter solidified to form the spacer 16.

Referring back to FIG. 1, the transmission conductor array 11 includes, for example, 64 transmission conductors 12 extending in a predetermined direction, in FIG. 1, in the direction indicated by an arrow mark X. The transmission conductors 12 are disposed in parallel to each other and are spaced apart by a predetermined distance from each other. The reception conductor array 13 includes, for example, 128 reception conductors 14 extending in a direction perpendicular to the extension direction of the transmission conductors 12, that is, in the direction indicated by an arrow mark Y in FIG. 1. The reception conductors 14 are disposed in parallel to each other and are spaced apart by a predetermined relationship from each other. In the illustrated example, the transmission conductors 12 and the reception conductors 14 are each formed from a conductor of a linear or plate shape. Where the transmission conductor array 11 and the reception conductor array 13 are disposed in an opposing relationship to each other with the spacer 16 interposed therebetween as in the present example, a capacitor of 0.5 pF is formed at each of the cross points between the transmission conductor array 11 and the reception conductor array 13.

Although it is described in the following description that the transmission conductors 12 and the reception conductors 14 each formed in a linear shape are disposed so as to extend perpendicularly to each other, the shape of the transmission conductors 12 and the reception conductors 14 may vary suitably in accordance with a specific application of the invention. Further, in the transmission conductor array 11 and the reception conductor array 13, the transmission conductors 12 and the reception conductors 14 may be configured so as to cross each other at an angle other than the right angle, for example, in an obliquely crossing relationship with each other. Different embodiments are hereinafter described. Further, for an improved electric characteristic, the reception conductors 14 should be formed with a width smaller than that of the transmission conductors 12. This will reduce the floating capacitance, to thereby suppress noise which may mix into the reception conductors 14.

The disposition distance, that is, the pitch, of both of the transmission conductors 12 and the reception conductors 14 is 3.2 mm in one example. It is to be noted that the number and the pitch of the transmission conductors 12 and the reception conductors 14 are not limited to those specified above, and they may be set suitably in accordance with the size of the sensor section 100, required detection accuracy, and so forth.

In the following description, the transmission conductors 12 which form the transmission conductor array 11 are represented by indexes n ranging from "1" to "64," in the order beginning with the transmission conductor 12 which is positioned nearest to the reception section 300. A transmission conductor 12 corresponding to index "n" is referred to as transmission conductor $Y_n$. Similarly, in regard to the reception conductor array 13, the reception conductors 14 are represented by indexes m ranging from "1" to "128" in the order beginning with the reception conductors 14 which is positioned farthest from the transmission section 200. A reception conductor 14 corresponding to index "m" is referred to as reception conductor $X_m$.

In the present first embodiment, each of the transmission conductor array 11 and the reception conductor array 13 is divided into 16 groups or blocks. A group of the transmission conductor array 11 is hereinafter referred to as a transmission block, and a group of the reception conductor array 13 is hereinafter referred to as a detection block.

Each transmission block includes four transmission conductors 12. In particular, each transmission block includes four transmission conductors 12 which are positioned adjacent to each other and, therefore, have indexes "n" that are consecutive. More particularly, in the present embodiment, the transmission conductor array 11 is divided into transmission blocks $\{Y_1 \sim Y_4\}$, $\{Y_5 \sim Y_8\}$, . . . , $\{Y_{57} \sim Y_{60}\}$ and $\{Y_{61} \sim Y_{64}\}$.

Similarly, each detection block includes eight reception conductors 14. In particular, each detection block includes eight reception conductors 14 which are positioned adjacent to each other and, therefore, have indexes "m" that are consecutive. More particularly, in the present embodiment, the reception conductor array 13 is divided into detection blocks $\{X_1 \sim X_8\}$, $\{X_9 \sim X_{16}\}$, . . . , $\{X_{113} \sim X_{120}\}$ and $\{X_{121} \sim X_{128}\}$. However, the present invention is not limited to the configuration just described, and the number of conductors in one group, the number of groups, and the form or arrangement of groups such as the positional relationship of the conductors belonging to the same group may be variably set in accordance with the size of the sensor section 100, the required detection speed, and so forth. Details are hereinafter described.

Next, the transmission section 200 is described. Referring to FIG. 1, the transmission section 200 includes a spread code supplying circuit 21, a transmission conductor selection circuit 22, and a clock generation circuit 23. The transmission conductor selection circuit 22, spread code supplying circuit 21 and clock generation circuit 23 are arranged in this order from the sensor section 100 side. The spread code supplying circuit 21 is connected to the control circuit 40 and the clock generation circuit 23 hereinafter described, and receives a clock signal output from the clock generation circuit 23. The clock signal output from the clock generation circuit 23 is input also to the control circuit 40 hereinafter described.

Figure 3:
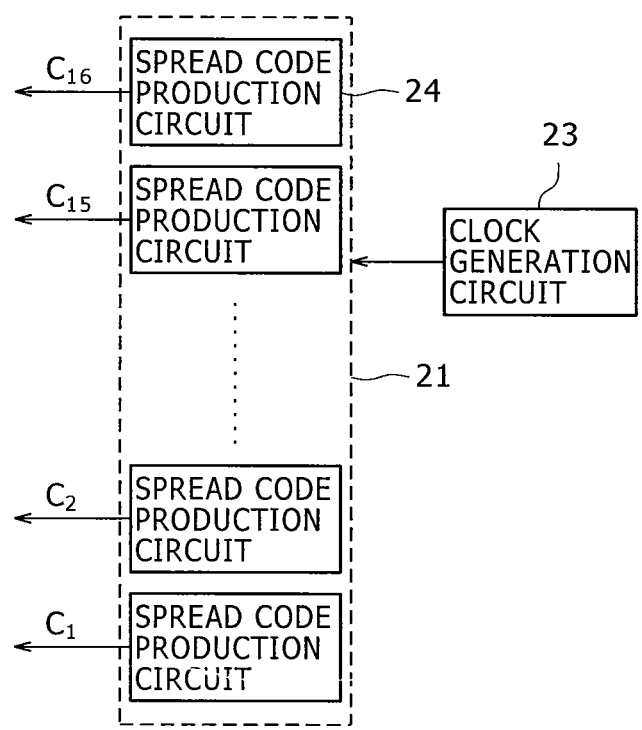
FIG. 3 is a block diagram showing a general configuration of a spread code supplying circuit of the pointer detection apparatus of FIG. 1.

Now, the spread code supplying circuit 21 is described with reference to FIG. 3. FIG. 3 shows an example of a general configuration of the spread code supplying circuit 21.

The spread code supplying circuit 21 in the first embodiment is provided in order to supply a code having a predetermined number of bits, such as a spread code, to the transmission conductors 12 so that the value obtained from a correlation value calculation circuit 34 of the reception section 300 hereinafter described will be a predetermined value depending upon whether or not a pointer exists. The spread code supplying circuit 21 includes, for example, a number of spread code production circuits 24 that equals the number of the transmission blocks of the transmission conductor array 11, that is, 16 spread code production circuits 24. The spread code production circuits 24 each produce a spread code $C_k$ (k: integer from 1 to 16) having a fixed code length of 2n bits (n: integer) under the control of the control circuit 40 hereinafter described. In particular, the spread codes $C_k$ are produced by the spread code production circuits 24, respectively, in synchronism with a clock signal output from the clock generation circuit 23, for example. The n-th chip of each of the spread codes $C_k$ produced in this manner is output at a timing of a rising edge of the clock signal. The spread code supplying circuit 21 may be configured differently, for example, such that it stores data produced based on spread codes in a ROM or the like and controls the read address of the ROM to output a suitable signal to be supplied to each transmission conductor. In the following description, 16 spread codes produced by the 16 spread code production circuits 24 are respectively referred to as spread codes $C_1, C_2, C_3, \ldots, C_{16}$. As the 16 spread codes $C_1$ to $C_{16}$, for example, Hadamard codes synchronized with each other can be used. The Hadamard codes are hereinafter described.

As hereinafter described, spread codes modulated by PSK modulation, FSK modulation, or some other modulation may be used. Further, since, in a radio communication technique which adopts CDMA, usage of the word "chip" is common, in the following description, the communication speed is referred to as a chip rate (i.e., the number of pulses in a code that are transmitted/received per second (chips per second).

Figure 4:
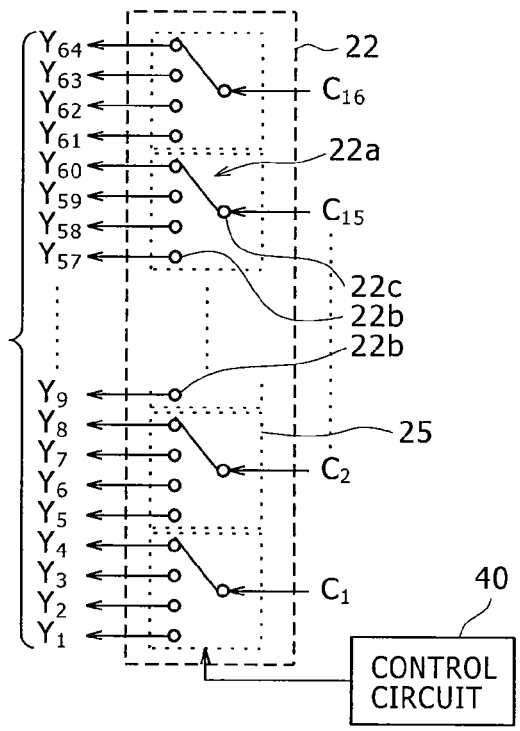
FIG. 4 is a diagrammatic view showing a general configuration of a transmission conductor selection circuit of the pointer detection apparatus of FIG. 1.

Now, the transmission conductor selection circuit 22 is described with reference to FIG. 4. FIG. 4 shows an internal configuration of the transmission conductor selection circuit 22.

The transmission conductor selection circuit 22 is provided in order to selectively supply spread codes $C_1$ to $C_{16}$ supplied from the spread code supplying circuit 21 to the transmission conductors 12. The transmission conductors 12, which form the transmission conductor array 11, are divided into 16 transmission blocks 25 each of which including four transmission conductors 12. The transmission conductor selection circuit 22 includes a number of switches 22a equal to the number of transmission blocks 25, that is, 16 switches 22a. Each of the switches 22a has four output terminals 22b which are respectively connected to corresponding ones of the transmission conductors 12. Each of the switches 22a further has one input terminal 22c which is connected to an output terminal of a corresponding one of the spread code production circuits 24 of the spread code supplying circuit 21 shown in FIG. 3. Each of the switches 22a connects, at a predetermined interval of time, particularly at an interval of time corresponding to 16 periods of the clock output from the clock generation circuit 23 in one example, a selected one of the transmission conductors 12 to an output terminal of a corresponding one of the spread code production circuits 24 which outputs a predetermined spread code $C_k$. The switching operation of the switches 22a is controlled by the control circuit 40.

An example of the switching operation of the transmission conductor selection circuit 22 is described with reference to FIG. 5. It is assumed here that one of the transmission conductors 12 which has the highest index in each of the transmission blocks 25, that is, the transmission conductor $Y_4$, $Y_8, \ldots, Y_{60}$ and $Y_{64}$, is connected to an output terminal of a corresponding one of the spread code production circuits 24 through a switch 22a as illustrated in FIG. 4.

The spread codes $C_1$ to $C_{16}$ output from the spread code production circuits 24, which form the spread code supplying circuit 21, are supplied at the same time to 16 transmission conductors 12 selected by the switches 22a of the transmission blocks 25. In this state, position detection of a pointer is carried out for a predetermined period of time, that is, for a period of time corresponding to 16 periods of the clock in one example. Then, after the predetermined period of time passes, that is, after supply of the spread codes $C_1$ to $C_{16}$ to the transmission conductors 12 selected by the switches 22a is completed, the switches 22a change-over (switch) the spread code production circuits 24 to be connected to adjacent ones of the transmission conductors 12 positioned in the direction in which the index n decreases, that is, to the transmission conductors $Y_3, Y_7, \ldots, Y_{59}$ and $Y_{63}$. Then, after the switching, the spread codes $C_1$ to $C_{16}$ output from the spread code production circuits 24 of the spread code supplying circuit 21 are supplied at the same time to the 16 selected transmission conductors 12 to carry out position detection. These operations are repeated to carry out supplying of spread codes.

After those transmission conductors 12 which have the lowest indexes in the respective transmission blocks 25, that is, the transmission conductors $Y_1, Y_5, \ldots, Y_{57}$ and $Y_{61}$, are selected by the switches 22a to carry out supply of the spread codes $C_1$ to $C_{16}$, those transmission conductors 12 having the highest indexes in the respective transmission blocks 25 are again selected by the switches 22a, and the operations described above are repeated in each group. It is to be noted that the procedure of the switching operation of the transmission conductors 12 is not limited to the example described above with reference to FIG. 5. For example, while the switching operation of the transmission conductors 12 in FIG. 5 is carried out after the spread codes $C_k$ to be supplied to the individual transmission conductors 12 are supplied, the switching of transmission conductors 12 may also be carried out every time one chip in each spread code is supplied. Other modifications are hereinafter described in detail.

Figure 5:
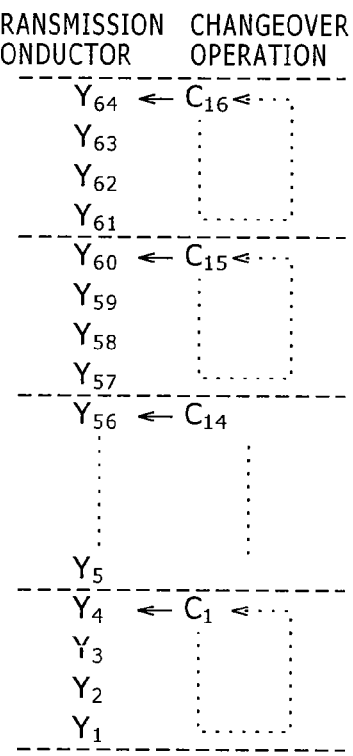
FIG. 5 is a diagrammatic view illustrating spread code switching operation by a transmission section of the pointer detection apparatus of FIG. 1.

As described above, the plural transmission conductors 12 are divided into a plurality of groups each including a predetermined number M (M is an integer equal to or greater than 2 (M≥2); in the example of FIG. 5, M=4) of conductors. Then, the spread codes $C_1$ to $C_{16}$ produced by the spread code supplying circuit 21 are supplied to predetermined ones of the transmission conductors 12 which form the groups, and the transmission conductors 12 to which the spread codes are to be supplied in the respective groups are successively switched. Since the transmission section 200 is configured in such a manner as described above, spread codes for position detection can be supplied at the same time to a plurality of transmission conductors 12. Since, in the example described, 16 different spread codes are supplied at the same time, the time required for transmission of a signal for position detection can be reduced to 1/16 of what was required in the prior art.

Now, the reception section 300 is described. Referring back to FIG. 1, the reception section 300 includes a reception conductor selection circuit 31, an amplification circuit 32, an A/D (Analog to Digital) conversion circuit section 33, a correlation value calculation circuit 34, and a position detection circuit 35. A correlation value obtained by the correlation value calculation circuit 34 of the reception section 300 corresponds to a detection state of a pointer, based on which the position of the pointer is calculated by the position detection circuit 35.

Now, the reception conductor selection circuit 31 is described with reference to FIG. 6.

The reception conductors 14 which form the reception conductor array 13 are divided into 16 detection blocks 36, each of which including eight reception conductors 14. The reception conductor selection circuit 31 includes a number of switches 31a equal to the number of the detection blocks 36, that is, 16 switches 31a. The switches 31a are provided in a one-to-one corresponding relationship with the detection blocks 36 to switch among those reception conductors 14 to be selected in each block, in accordance with a control signal of the control circuit 40 hereinafter described.

Each of the switches 31a has eight terminals 31b on the input side thereof, which are connected to corresponding ones of the reception conductors 14. Each of the switches 31a further has a terminal 31c on the output side thereof, which is connected to an input terminal of a corresponding one of I/V conversion circuits 32a hereinafter described. Further, each of the switches 31a switches among the reception conductors 14 to be connected to a corresponding one of the I/V conversion circuit 32a at a predetermined interval of time, that is, in a period equal to four times that of the switching timing of the switches 22a of the transmission conductor selection circuit 22 in the illustrated example. Output signals of the I/V conversion circuits 32a are output to the A/D conversion circuit 33 through a changeover switch 32d after it is amplified to a predetermined signal level by an amplifier (32b).

Now, the switching operation of the reception conductor selection circuit 31 is described with reference to FIG. 7. It is assumed here that, in the detection blocks 36, those reception conductors 14 having the lowest indexes, that is, the reception conductors $X_1$, $X_9$, ..., and $X_{121}$, are connected to the amplification circuit 32 through the switches 31a as seen in FIG. 6.

Figure 6:
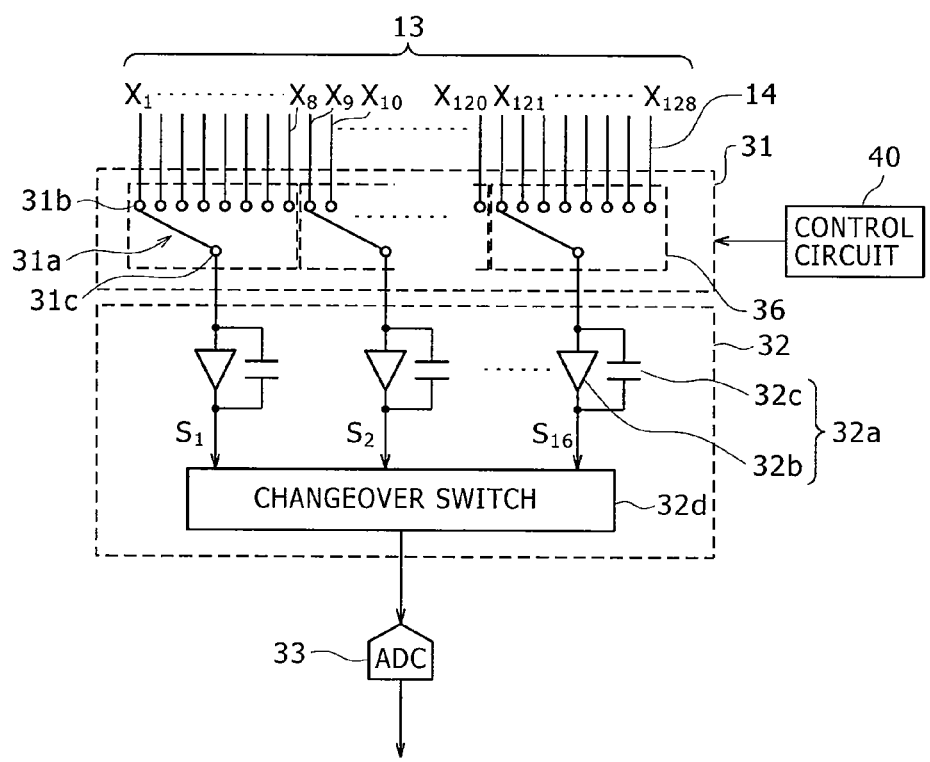
FIG. 6 is a diagrammatic view showing a general configuration of a reception conductor selection circuit of the pointer detection apparatus of FIG. 1.
Figure 7:
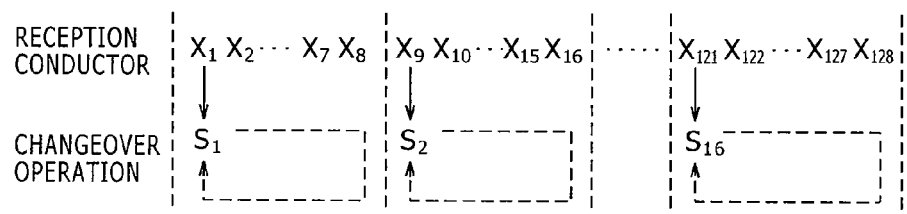
FIG. 7 is a diagrammatic view illustrating switching operation of reception conductors by the reception section of the pointer detection apparatus of FIG. 1.

First, in the state illustrated in FIG. 6, the reception conductor selection circuit 31 selects a plurality of reception conductors 14 at the same time such that output signals $S_1$, $S_2$, ..., $S_{16}$ of the detection blocks 36 (current signals) are obtained for a predetermined period of time.

Then, after the predetermined period of time elapses, the switches 31a of the reception conductor selection circuit 31 change (switch) to adjacent ones of the reception conductors 14 which are positioned in the direction in which the index m increases, that is, to the reception conductors $X_2$, $X_{10}$, ..., and $X_{122}$. Then, new output signals $S_1$, $S_2$, ..., $S_{16}$ output from the reception conductors $X_2$, $X_3$, ..., $X_{114}$ and $X_{122}$ connected to the switches 31a after the switching are obtained. Thereafter, the switches 31a of the reception conductor selection circuit 31 repeat the switching operation as described above.

Then, the switches 31a are connected to the reception conductors 14 having the highest indexes in the respective detection blocks 36, that is, to the reception conductors $X_8$, $X_{16}$, ..., $X_{120}$ and $X_{128}$ such that new output signals output from the selected reception conductors $X_8$, $X_{16}$, ..., $X_{120}$ and $X_{128}$ are obtained. Thereafter, the switches 31a are connected to the reception conductors 14 having the lowest indexes in the individual detection blocks 36 again such that new output signals output from the reception conductors 14 having the lowest indexes in the detection blocks 36 are obtained. The operations described above are repeated in the respective detection blocks 36. It is to be noted that those reception conductors 14 which are not selected by the switches 31a are preferably connected to an arbitrary reference potential or the ground potential. Where the reception conductors 14 which are not selected by the switches 31a are connected to an arbitrary reference potential or the ground potential in this manner, noise can be discharged into the reception conductors 14 in a non-selected state. Consequently, the noise resisting property of the pointer detection apparatus can be improved. Also this arrangement helps reduce the wraparound of a transmission signal. The procedure of the switching operation of the reception conductors 14 is not limited to the example described above with reference to FIG. 7. Various modifications are hereinafter described in detail.

As described above, in the reception conductor selection circuit, the reception conductors 14 are divided into a plurality of groups each including a predetermined number of conductors, and at least one conductor in each group is selected and the selected conductor is successively switched among the conductors which form each group. According to the configuration described above, multiple output signals for position detection can be obtained at the same time from the reception conductor array 13. In the present first embodiment, since the reception conductor array 13 is divided into 16 groups, the time required for reception of signals for position detection can be reduced to 1/16 of what was required in the prior art.

Now, the amplification circuit 32 is described with reference to FIG. 6. The amplification circuit 32 converts current signals output from the reception conductors 14 into voltage signals, and amplifies the voltage signals. The amplification circuit 32 includes a number of I/V conversion circuits 32a equal to the number of detection groups in the reception conductor array 13, that is, 16 I/V conversion circuits 32a, and a changeover switch 32d. One I/V conversion circuit 32a is connected to each of the detection blocks 36.

Each of the I/V conversion circuits 32a includes an amplifier 32b in the form of an operational amplifier having one input and one output, and a capacitor 32c connected to the amplifier 32b. The I/V conversion circuits 32a convert the output signals $S_1, S_2, \ldots, S_{16}$ of the detection blocks 36, which form the reception conductor selection circuit 31, into voltage signals and output the voltage signals. It is to be noted that, a resistance element, a transistor, or the like (not shown) may be connected in parallel to the capacitor 32c in order to adjust the dc bias.

The changeover switch 32d successively switches among the I/V conversion circuits 32a to be connected to the A/D conversion circuit 33 hereinafter described, after every predetermined interval of time, to output voltage signals output from the I/V conversion circuits 32a time-divisionally to the A/D conversion circuit 33. Where the configuration just described is adopted, the reception section 300 needs only one system of the A/D conversion circuit 33 and the correlation value calculation circuit 34. Therefore, the circuit configuration of the reception section 300 can be simplified. While the changeover switch 32d described above is provided in the amplification circuit 32, it may otherwise be provided between the reception conductor selection circuit 31 and the amplification circuit 32. Where the changeover switch 32d is provided between the reception conductor selection circuit 31 and the amplification circuit 32, it is not necessary to provide a number of I/V conversion circuits 32a equal to the number of switches 31a in the reception conductor selection circuit 31. Consequently, the circuit configuration of the reception section 300 can be simplified. It is to be noted that, while in the first embodiment described the changeover switch 32d is provided so that only one system of the A/D conversion circuit 33 and the correlation value calculation circuit 34 is provided, the present invention is not limited to this configuration, and a number of A/D conversion circuits 33 and a number of correlation value calculation circuits 34 equal to the number of the I/V conversion circuits 32a, that is, 16 A/D conversion circuits 33 and 16 correlation value calculation circuits 34, may be provided. Such a configuration as just described eliminates the need to carry out the switching control by means of the changeover switch 32d, and therefore is suitable to form a pointer detection circuit for which a higher speed signal processing is required.

The A/D conversion circuit section 33 is connected to an output terminal of the amplification circuit 32, and converts an analog signal output from the amplification circuit 32 into a digital signal and outputs the digital signal. The output signals $S_1, S_2, \ldots, S_{16}$ converted into voltage signals by the I/V conversion circuits 32a are converted into and output as digital signals by and from the A/D conversion circuit 33. It is to be noted that a known A/D converter can be used for the A/D conversion circuit section 33.

Now, a configuration of the correlation value calculation circuit 34 is described in detail with reference to FIG. 8. The correlation value calculation circuit 34 calculates correlation values from the output signals $S_1, S_2, \ldots, S_{16}$ successively output from the A/D conversion circuit 33. The correlation value calculation circuit 34 is connected to the A/D conversion circuit 33, control circuit 40, and position detection circuit 35, which is hereinafter described, as shown in FIG. 1.

The correlation value calculation circuit 34 includes a signal delay circuit 34a, a number of correlators $34b_1, 34b_2, 34b_3, \ldots, 34b_{16}$ equal to the number of the spread codes $C_k$, that is, 16 correlators $34b_1, 34b_2, 34b_2, \ldots, 34b_{16}$, correlation value calculation code production circuits $34c_1, 34c_2, 34c_3, \ldots, 34c_{15}, 34c_{16}$ for supplying correlation value calculation codes to the correlators $34b_1$ to $34b_{16}$, respectively, and a correlation value storage circuit 34d.

The signal delay circuit 34a temporarily retains digital signals successively output from the A/D conversion circuit 33 and supplies the retained data simultaneously to the correlators $34b_1$ to $34b_{16}$. The signal delay circuit 34a includes a number of D-flip-flop circuits equal to the code length of the spread codes $C_k$, that is, 16 D-flip-flop circuits $34a_1, 34a_2, 34a_3, \ldots, 34a_{15}, 34a_{16}$. The D-flip-flop circuits $34a_{16}, 34a_{15}, 34a_{14}, \ldots, 34a_3, 34a_2, 34a_1$ are connected in series and in this order from the A/D conversion circuit 33 side. An output terminal of each of the D-flip-flop circuits $34a_1$ to $34a_{16}$ is connected to a neighboring next one of the D-flip-flop circuits $34a_1$ to $34a_{16}$ (for example, the output terminal of the D-flip-flop circuit $34a_{16}$ is connected to the D-flip-flop circuit $34a_{15}$) and also to the correlators $34b_1$ to $34b_{16}$. As illustrated, output signals of the D-flip-flop circuits $34a_1$ to $34a_{16}$ are input to all of the correlators $34b_1$ to $34b_{16}$. Output signals consisting of 16 chips from the 16 D-flip-flop circuits $34a_1$ to $34a_{16}$ are hereinafter referred to as output signals $PS_1, PS_2, PS_3, \ldots, PS_{15}, PS_{16}$, respectively.

The correlators $34b_1$ to $34b_{16}$ multiply the output signals $PS_1, PS_2, \ldots, PS_{16}$ output from the D-flip-flop circuits $34a_1$ to $34a_{16}$ by correlation value calculation codes $C_1'$ to $C_{16}'$, respectively, which are input from the correlation value calculation code production circuits $34c_1$ to $34c_{16}$, to produce and output the correlation value of each of the spread codes $C_k$. Since the correlators $34b_1$ to $34b_{16}$ carry out correlation calculation for the spread codes $C_1$ to $C_{16}$, respectively, total 16 correlators $34b_1$ to $34b_{16}$ are provided. In particular, the correlator $34b_1$ multiplies the output signals $PS_1, PS_2, \ldots, PS_{16}$ from the D-flip-flop circuits $34a_1$ to $34a_{16}$ by the correlation value calculation code $C_1'$ to calculate a correlation value, and the correlator $34b_2$ calculates a correlation value between the output signals $PS_1, PS_2, \ldots, PS_{16}$ and the correlation value calculation code $C_2'$. Similar calculation is carried out until correlation values regarding all of the 16 spread codes $C_1$ to $C_{16}$ are calculated. Then, the correlators $34b_1$ to $34b_{16}$ output the calculated correlation values to the correlation value storage circuit 34d.

The correlation value calculation code production circuits $34c_1, 34c_2, 34c_3, \ldots, 34c_{15}, 34c_{16}$ supply correlation value calculation codes $C_k'$ to be used for correlation calculation by the correlators $34b_1$ to $34b_{16}$, respectively. The correlation value calculation code production circuits $34c_1$ to $34c_{16}$ are connected to corresponding ones of the correlators $34b_1$ to $34b_{16}$. The correlation calculation codes $C_1'$ to $C_{16}'$ to be supplied from the correlation value calculation code production circuits $34c_1$ to $34c_{16}$ to the corresponding correlators $34b_1$ to $34b_{16}$ have a code length of 2n. For example, since the correlator $34b_1$ carries out correlation calculation of the spread code $C_1$, the correlation value calculation code $C_1'$ of 16 chips $(PN_1, PN_2, PN_2, \ldots, PN_{15}, PN_{16})$ is supplied to the correlator $34b_1$. A correlation value calculation code supplied from each of the correlation value calculation code production circuits $34c_1$ to $34c_{16}$ to a corresponding one of the correlators $34b_1$ to $34b_{16}$ is hereinafter represented by $C_x'$ $(PN_1', PN_2', PN_3', \ldots, PN_{15}', PN_{16}')$.

Then, as the correlators $34b_1$ to $34b_{16}$ carry out correlation calculation between the reception signals $PS_1, PS_2, \ldots, PS_{16}$ and the correlation value calculation codes $C_1'$ to $C_{16}'$, if no pointer exists on the sensor section 100, then correlation values of a fixed value are universally obtained. On the other hand, if a pointer 19 (see FIG. 12B) exists on the sensor section 100, then a correlation value having a value different from the fixed value is obtained.

The correlation value storage circuit 34d is a storage section for temporarily storing correlation values obtained by the correlation calculation by the correlators $34b_1$ to $34b_{16}$. The correlation value storage circuit 34d is formed from a number of registers (not shown) equal to the number of the correlators $34b_1$ to $34b_{16}$. Since each of the transmission blocks 25 of the transmission conductor selection circuit 22 is formed from four transmission conductors 12, which are switched between by a switch 22a as described hereinabove with reference to FIGS. 4 and 5, if detection of a pointer is carried out with one reception conductor 14, then four correlation values are obtained. Therefore, each of registers from which the correlation value storage circuit 34d is formed has four regions. Into the four regions, correlation values obtained by the correlation calculation are stored respectively. Accordingly, the registers store data for the cross points between an arbitrary one of the transmission conductors 12 and all of the reception conductors 14 which form the reception conductor array 13, that is, 128 data. The correlation value storage circuit 34d thus maps the input correlation values at the cross points over the entire surface of the sensor section 100 to thereby produce a spatial distribution or mapping data of the correlation values.

Now, operation of the correlation value calculation circuit 34 is described. The output signals $S_1, S_2, \ldots, S_{16}$ of the I/V conversion circuits 32a are successively converted into digital signals by the A/D conversion circuit 33 and input to the correlation value calculation circuit 34. The first one of the digital signals input from the A/D conversion circuit 33 to the correlation value calculation circuit 34 is first stored into the D-flip-flop circuit $34a_{16}$ of the signal delay circuit 34a. Then, the D-flip-flop circuit $34a_{16}$ supplies the stored data to the correlators $34b_1$ to $34b_{16}$. Then, a next digital signal output from the A/D conversion circuit 33 is supplied to the D-flip-flop circuit $34a_{16}$, and thereupon, the D-flip-flop circuit $34a_{16}$ outputs the data stored therein to the adjacent D-flip-flop circuit $34a_{15}$, and stores the newly supplied digital signal and outputs the newly stored data to the correlators $34b_1$ to $34b_{16}$. Thereafter, every time new data is input, the D-flip-flop circuits $34a_1$ to $34a_{16}$ repeat the process of outputting data stored therein to the adjacent D-flip-flop circuits and the correlators $34b_1$ to $34b_{16}$ and storing the newly supplied digital signals.

The output signals $PS_1$ to $PS_{16}$ of the 16-chip length stored in the D-flip-flop circuits $34a_1$ to $34a_{16}$ are supplied to the 16 correlators $34b_1$ to $34b_{16}$, respectively. The correlators $34b_1$ to $34b_{16}$ carry out correlation calculation between the output signals $PS_1$ to $PS_{16}$ supplied from the D-flip-flop circuits $34a_1$ to $34a_{16}$ and the correlation value calculation codes $C_1'$ to $C_{16}'$ supplied from the correlation value calculation code production circuits $34c_1$ to $34c_{16}$ to respectively obtain correlation values.

Then, the correlators $34b_1$ to $34b_{16}$ output only the correlation values obtained as a result of the 16th calculation to the correlation value storage circuit 34d under the control of the control circuit 40 hereinafter described. By repeating this, only those results of the correlation calculation carried out for the output signals obtained when the spread codes $C_1$ to $C_{16}$ are supplied to all of the transmission conductors 12 which cross an arbitrary one of the reception conductors 14, are output to the correlation value storage circuit 34d. The correlation values of the results of the correlation calculation are stored into predetermined regions of the registers of the correlation value storage circuit 34d.

Similarly, the switches 31a which form the reception conductor selection circuit 31 and the changeover switch 32d of the amplification circuit 32 are suitably switched so that correlation calculation is carried out for all output signals obtained from all of the reception conductors 14 which form the sensor section 100.

Although the correlation value calculation circuit 34 described above with reference to FIG. 8 uses a number of correlators $34b_1$ to $34b_{16}$ equal to the number of the spread codes $C_k$ to respectively carry out correlation calculation, another configuration is possible where a plurality of correlation value calculation codes $C_1'$ to $C_{16}'$ are successively supplied to a single correlator such that correlation calculation is carried out by the single correlator.

Figure 9:
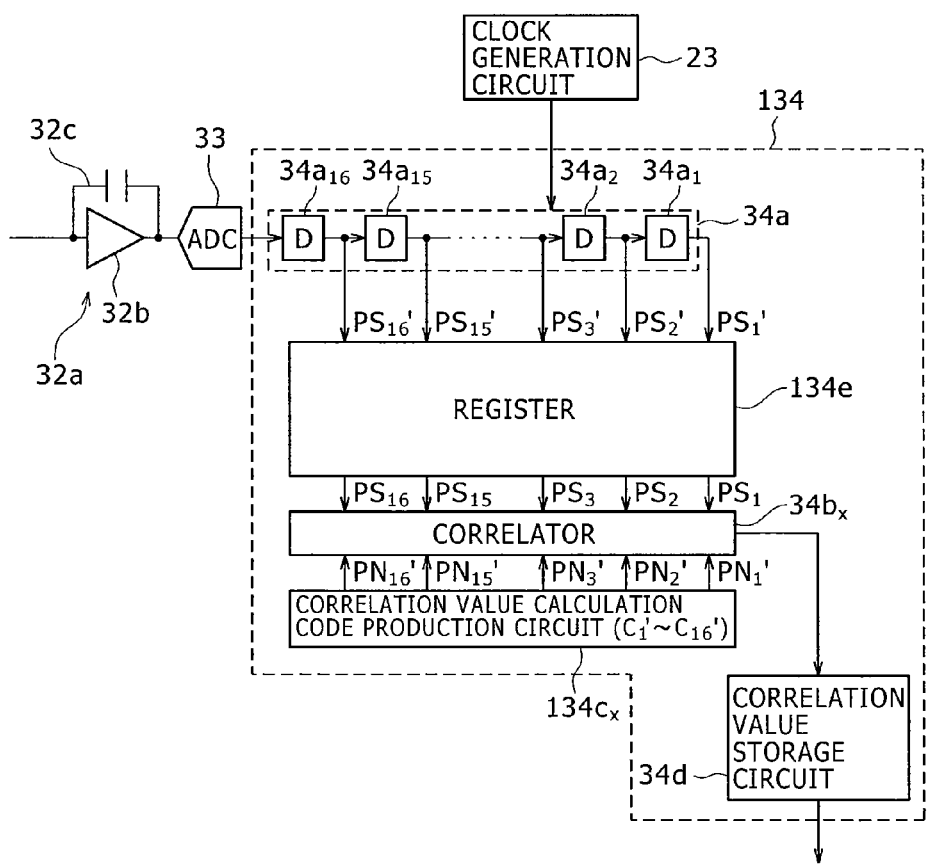
FIG. 9 is a similar view but showing another correlation value calculation circuit of the pointer detection apparatus of FIG. 1.

The following describes an example of a correlation value calculation circuit wherein a plurality of correlation value calculation codes are successively supplied to a single correlator such that the correlator time-divisionally carries out correlation calculation. FIG. 9 shows an example of a configuration of the correlation value calculation circuit which carries out correlation calculation of spread codes time-divisionally.

A configuration and components of the correlation value calculation circuit 134 shown in FIG. 9 are described. Referring to FIG. 9, the correlation value calculation circuit 134 includes a signal delay circuit 34a, a correlator $34b_x$, a correlation value calculation code production circuit $134c_x$, a correlation value storage circuit 34d, and a register 34e. The register 34e is provided between output terminals of the D-flip-flop circuits $34a_1$ to $34a_{16}$, which form the signal delay circuit 34a, and the correlator $34b_x$ and temporarily stores output signals $PS_1'$ to $PS_{16}'$ of 16 chips output from the D-flip-flop circuits $34a_1$ to $34a_{16}$.

The correlator $34b_x$ carries out correlation calculation between the data stored in the register 134e and correlation calculation codes $c_x$ supplied from the correlation value calculation code production circuit $134c_x$ to calculate correlation values. An output terminal of the correlator $34b_x$ is connected to the correlation value storage circuit 34d.

The correlation value calculation code production circuit $134c_x$ supplies a correlation value calculation code $C_x'$ ($PN_1'$, $PN_2'$, $PN_3'$, ..., $PN_{15}'$, $PN_{16}'$) to the correlator $34b_x$. The correlation value calculation code production circuit $134c_x$ time-dependently changes (switches) the correlation value calculation code $C_x'$ to be supplied to the correlator 34b.

The correlation value storage circuit 34d is a storage section for temporarily storing correlation values output from the correlator $34b_x$. The correlation value storage circuit 34d is connected to the correlator $34b_x$ and the position detection circuit 35 shown in FIG. 1. The configuration of the other part of the correlation value storage circuit 34d is the same as that of the correlation value calculation circuit 34 described hereinabove with reference to FIG. 8, and overlapping description of the same is omitted herein to avoid redundancy.

In the following, operation of the correlation value calculation circuit 134 is described in detail. The output signals $S_1$ to $S_{16}$ of the I/V conversion circuits 32a shown in FIG. 6 are converted into digital signals by the A/D conversion circuit 33 and input to the signal delay circuit 34a. The digital signals input to the signal delay circuit 34a are successively supplied to the D-flip-flop circuits $34a_1$ to $34a_{16}$ connected in series at 16 stages. Then, the D-flip-flop circuits $34a_1$ to $34a_{16}$ temporarily store the data supplied thereto and output the stored data to the register 134e. Thereafter, every time a new digital signal is supplied, the D-flip-flop circuits $34a_1$ to $34a_{16}$ supply data currently retained therein to the respective adjacent D-flip-flop circuits $34a_x$, and store the data newly supplied thereto and output the newly supplied data as output signals to the register 134e.

The correlator $34b_x$ carries out, if data become complete in the register 134e, correlation calculation operation between the data stored in the register 134e and the correlation value calculation code $C_1'$ supplied from the correlation value calculation code production circuit $134c_x$ under the control of the control circuit 40 hereinafter described, to calculate a correlation value. Then, the correlator $34b_x$ outputs the correlation value as a result of the calculation operation to the correlation value storage circuit $34d$. Thereafter, the correlator $34b_x$ carries out similar correlation calculation operation also for the correlation value calculation codes $C_2', C_3', \ldots, C_{16}'$, respectively, and outputs correlation values as the results of the calculation operation to the correlation value storage circuit $34d$. Thereafter, after the correlator $34b_x$ carries out the correlation calculation operation for all correlation value calculation codes $C_1' \ldots C_{16}'$, the data stored in the register $134e$ is discarded and the correlator $34b_x$ waits until the next complete data is stored. Thereafter, the sequence of processes described above is repeated to carry out the correlation calculation for reception signals obtained from all of the reception conductors 14 which form the sensor section 100.

Although the correlation value calculation circuit configured in such a manner as described above with reference to FIG. 9 includes a smaller number of correlators and correlation value calculation code production circuits than the correlation value calculation circuit described above with reference to FIG. 8, correlation values of the respective spread codes can be obtained similarly as in the case where the same number of correlators are provided as the number of spread codes.

Figure 10:
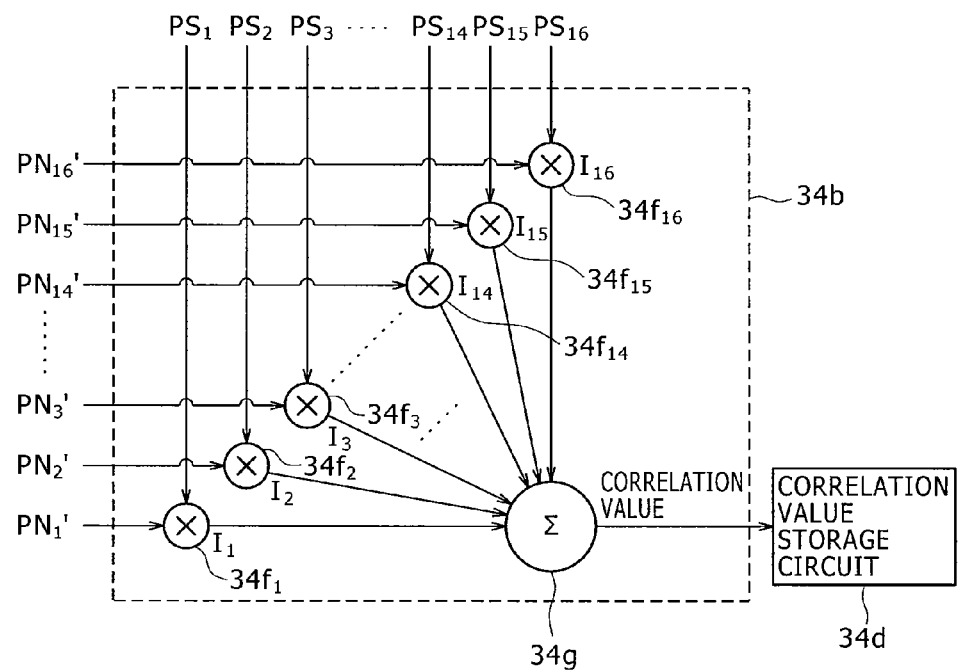
FIG. 10 is a block diagram showing a general configuration of an example of an internal configuration of a correlator of the correlation value calculation circuit of the pointer detection apparatus of FIG. 1.

Now, the configuration of the correlator is described in detail with reference to FIG. 10. FIG. 10 shows an example of the configuration of the correlators $34b_1$ to $34b_{16}$ and $34b_x$ shown in FIGS. 8 and 9. The correlator $34b$ is composed of 16 multipliers $34f_1, 34f_2, \ldots, 34f_{16}$ and an adder $34g$. The reason why the number of multipliers $34f_1$ to $34f_{16}$ in the present first embodiment is 16 is that it is intended to determine a correlation of the spread codes $C_k$ of 16 chips. Accordingly, the number of multipliers differs depending upon the number of chips included in each of the spread codes $C_k$.

To the multipliers $34f_1$ to $34f_{16}$, the chips $PS_1$ to $PS_{16}$ of the output signal and the chips $PN_1'$ to $PN_{16}'$ of the correlation value calculation code are supplied, and the signals at the same chip positions are multiplied to obtain multiplication signals. The multiplication signals calculated by the multipliers $34f_1$ to $34f_{16}$ are supplied to the adder $34g$. The adder $34g$ adds the signals at all chip positions supplied thereto from the multipliers $34f_1$ to $34f_{16}$ to obtain a correlation value. This correlation value is stored into the correlation value storage circuit $34d$. It is to be noted that, depending upon the code to be used, the multipliers $34f_1$ to $34f_{16}$ may be formed with an adder or a subtracter.

The position detection circuit 35 determines a region of correlation values which are higher than a predetermined threshold value, based on the mapping data stored in the correlation value storage circuit $34d$, and calculates, for example, the central point of the region as the position of a pointer. Referring to FIG. 1, the position detection circuit 35 is connected to the correlation value calculation circuit 34 and the control circuit 40. It is to be noted that the position detection circuit 35 may include an interpolation circuit for calculating a coordinate at which a pointer exists, when the pointer exists between two cross points, based on correlation values stored in the correlation value storage circuit $34d$ so that mapping data of interpolation values of a higher resolution may be calculated.

The control circuit 40 controls the components of the pointer detection apparatus 1 according to the present embodiment. Referring to FIG. 1, the control circuit 40 is connected to the clock generation circuit 23, spread code supplying circuit 21, transmission conductor selection circuit 22, correlation value calculation circuit 34, and position detection circuit 35. The control circuit 40 suitably produces and outputs a transmission load signal $St_{load}$ (FIG. 11B) and a reception load signal $Sr_{load}$ (FIG. 11C) based on the clock signal $S_{clk}$ (FIG. 11A) output from the clock generation circuit 23, in order to control the operation timings of the components.

In the following, operation of the control circuit 40 and the pointer detection apparatus 1 according to the present first embodiment is described with reference to FIGS. 1, 9 and 11A to 11G. It is to be noted that, in the following description, it is assumed that the correlation value calculation circuit has the configuration of the correlation value calculation circuit 134 described hereinabove with reference to FIG. 9 in order to facilitate understanding of the principle.

FIG. 11A illustrates a signal waveform of the clock signal $S_{clk}$ supplied from the clock generation circuit 23 to the control circuit 40 and the spread code supplying circuit 21. The clock signal $S_{clk}$ has a period set to a one-chip length of the spread codes $C_k$ for example. FIG. 11B illustrates a signal waveform of the transmission load signal $St_{load}$ supplied from the control circuit 40 to the transmission conductor selection circuit 22 and the reception conductor selection circuit 31. The transmission load signal $St_{load}$ is a pulse signal whose period is set, for example, to the code length of the spread codes $C_k$, that is, to 16 periods of the clock signal. FIG. 11C illustrates a signal waveform of the reception load signal $Sr_{load}$ supplied from the control circuit 40 to the correlation value calculation circuit 34. The reception load signal $Sr_{load}$ is a pulse signal whose period is set, for example, to the code length of the spread codes $C_k$, that is, to 16 periods of the clock signal. As illustrated, the reception load signal $Sr_{load}$ is output one clock signal $S_{clk}$ period later than the transmission load signal $St_{load}$. FIG. 11D illustrates an output for transmitting codes from the spread code supplying circuit 21 to the transmission conductor array 11 shown in FIG. 1. FIG. 11E illustrates an output signal of 16 chips set (stored) in the register $134e$ through the D-flip-flop circuits $34a_1$ to $34a_{16}$, and FIG. 11F illustrates production of correlation value calculation codes $(C_1', C_2', C_3', \ldots, C_{16}')$ to be multiplied with the reception signal set in the register $134e$.

When the clock signal $S_{clk}$ (FIG. 11A) output from the clock generation circuit 23 is input to the control circuit 40 and the spread code supplying circuit 21, then the control circuit 40 inputs the transmission load signal $St_{load}$ (FIG. 11B) to the transmission conductor selection circuit 22 and the reception conductor selection circuit 31 in synchronism with the clock signal $S_{clk}$. After a one-clock period delay, the control circuit 40 inputs the reception load signal $Sr_{load}$ to the A/D conversion circuit 33.

The transmission conductor selection circuit 22 starts supply of spread codes $C_k$ to the transmission conductors 12 at a rising edge timing $t_0$ illustrated in FIG. 11A of the clock signal $S_{clk}$ when the transmission load signal $St_{load}$ has the high level. Thereafter, the transmission conductor selection circuit 22 successively switches the transmission conductors 12 to which the spread codes $C_k$ are to be supplied at every rising edge timing such as timings $t_2$ and $t_4$ in FIG. 11A of the clock signal $S_{clk}$ when the transmission load signal $St_{load}$ has the high level.

Similarly, the switches $31a$ of the reception conductor selection circuit 31 select the reception conductors 14 which are to carry out reception first (see FIG. 6) at a rising edge timing of the clock signal $S_{clk}$ when the transmission load signal $St_{load}$ has the high level. Thereafter, the reception conductor selection circuit 31 controls the switches $31a$ to switch the reception conductors 14 to be selected every time a pulse of the transmission load signal $St_{load}$ is input successively four times. Here, the reason why the reception conductor selection circuit 31 is set so as to carry out the switching every time a pulse of the transmission load signal $St_{load}$ is input four times is that, since each transmission block 25 shown in FIG. 4 consists of four transmission conductors 12, if the transmission conductors 12 to which a spread code $C_k$ is to be supplied are switched at this timing, then the spread code $C_k$ is supplied to all of the transmission conductors 12 which form each transmission block 25. As a result, the spread codes $C_k$ are supplied to all of the transmission conductors 12 which form the sensor section 100.

In such a manner as described above, to the transmission conductors 12 selected by the transmission conductor selection circuit 22, the nth chip of each spread code $C_k$ is supplied at a rising edge timing of the clock signal $S_{clk}$. In particular, at timing $t_0$, the first chips of the spread codes $C_1$ to $C_{16}$, respectively, are supplied, and thereafter, the chips to be supplied to the transmission conductors 12 are switched for every one clock at a rising edge timing of the clock for the second chip, third chip, and so forth, as seen in FIG. 11D. Then, at a next rising edge timing of the transmission load signal $St_{load}$, that is, at the 17th rising edge timing of the clock signal $S_{clk}$, the supply of the spread codes $C_k$ to the transmission conductors 12 selected by the transmission conductor selection circuit 22 is completed, and consequently, the transmission conductor selection circuit 22 switches to the next (adjacent) transmission conductors 12 at this timing. Thereafter, the transmission conductors are successively switched at each rising edge timing of the transmission load signal $St_{load}$. In the illustrated example, a one clock period is provided during which no chip of the spread codes $C_k$ is to be supplied prior to the next supplying starting timing of the spread codes $C_k$. This is to prevent generation of noise due to a transition phenomenon caused by the switching operation of the transmission conductor selection circuit 22.

Then, after the fourth transmission load signal $St_{load}$ is input to the transmission conductor selection circuit 22, the transmission conductor selection circuit 22 returns to the initial state and then repeats the sequence of the switching operation described above.

An output signal is output at a rising edge timing of the clock signal $S_{clk}$ from each of the reception conductors 14 selected by the reception conductor selection circuit 31. The reception conductor selection circuit 31 successively switches the reception conductors 14 to be selected at the timing of each rising edge of the clock signal $S_{clk}$ when the fifth pulse of the transmission load signal $St_{load}$ has the high level. Then, the reception conductor selection circuit 31 returns to the initial state thereof at a rising edge timing of the clock signal $S_{clk}$ when the 33rd pulse of the transmission load signal $St_{load}$ has the high level, and then repeats the sequence of the switching operation.

Output signals obtained through the reception conductor selection circuit 31 at a rising edge timing of the clock signal $S_{clk}$ are amplified in signal level by the amplification circuit 32, digitally converted by the A/D conversion circuit 33, and input to the correlation value calculation circuit 134 as seen in FIG. 9. The digital signals are successively input to the D-flip-flops $34a_1$ to $34a_{16}$ of the signal delay circuit $34a$ connected to the output terminals of the A/D conversion circuit 33 beginning with the D-flip-flop $34a_{16}$ as seen in FIG. 9. The D-flip-flops $34a_1$ to $34a_{16}$ store the digital signals input from the A/D conversion circuit 33 and supply the stored digital signals to the correlators $34b_1$ to $34b_{16}$, respectively (FIG. 8) or to the single correlator $34b_x$ (FIG. 9) provided at the succeeding stage of the D-flip-flops $34a_1$ to $34a_{16}$.

In FIG. 9, the transmission signals $PS_1'$ to $PS_{16}'$ output from the signal delay circuit $34a$ are set in the register $134e$ at a rising edge timing of the clock signal $S_{clk}$ when the transmission load signal $St_{load}$ has the high level. This operation is carried out repetitively with reference to the rising edge timings $t_0, t_2, t_4, \ldots$ of the clock signal $S_{clk}$ (FIG. 11A) when the transmission load signal $St_{load}$ has the high level.

The correlation value calculation circuit 134 causes the correlation value calculation code production circuit $134c_x$ to successively produce 16 different correlation value calculation codes $C_1'$ to $C_{16}'$ and supply the produced correlation value calculation codes $C_1'$ to $C_{16}'$ to the correlator $34b_x$ at a timing of a rising edge, in FIG. 11A, at time $t_3$, of the clock signal $S_{clk}$ when the pulse of the reception load signal $Sr_{load}$ has the high level. At this timing of a rising edge of the clock signal $S_{clk}$ when the reception load signal $Sr_{load}$ has the high level, the correlator $34b_x$ starts correlation calculation between the correlation value calculation codes $C_1'$ to $C_{16}'$ and the signal set in the register $134e$ (FIG. 11 (f)). The correlator $34b_x$ successively outputs the calculation results to the correlation value storage circuit $34d$ as seen in FIG. 11G. Thereafter, correlation calculation is carried out similarly for the spread codes $C_2$ to $C_{16}$ and results of the calculation are output to the correlation value storage circuit $34d$ similarly as seen in FIGS. 11F and 11G. The correlation values are obtained with respect to the correlation value calculation codes $C_1'$ to $C_{16}'$, respectively, in a manner described above.

[Principle of Position Detection]

Now, the principle of position detection of the pointer detection apparatus 1 according to the present embodiment is described with reference to FIGS. 12A to 16B. As described hereinabove, the pointer detection apparatus 1 of the present embodiment is an apparatus of the cross point electrostatic coupling system and detects a pointer based on a variation of the electrostatic coupling state of the transmission conductors and the reception conductors of the sensor section.

Figure 12A:
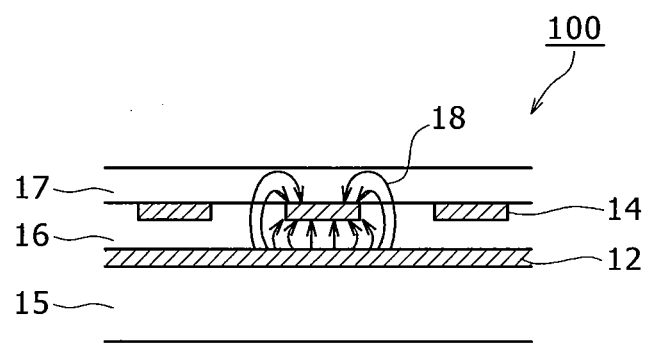
FIG. 12A is a schematic view illustrating an operation principle of the pointer detection apparatus of FIG. 1 where no pointer exists on the sensor section.
Figure 12B:
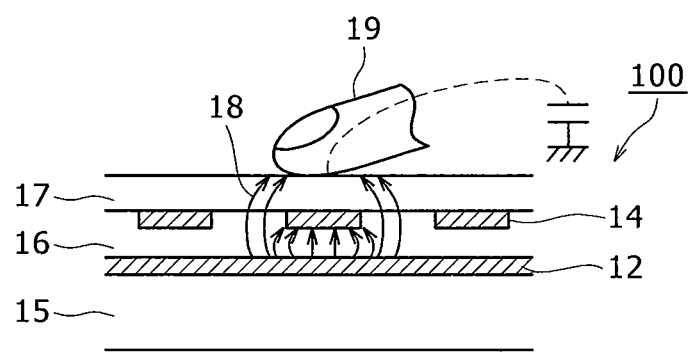
FIG. 12B is a similar view but illustrating an operation principle of the pointer detection apparatus of FIG. 1 where a pointer exists on the sensor section shown in FIG. 2.

First, the detection principle of a pointer is described with reference to FIGS. 12A and 12B. FIGS. 12A and 12B are sectional views illustrating electrostatic coupling states between a transmission conductor 12 and a reception conductor 14 in a state wherein a pointer 19 such as a finger does not exist on the sensor section 100 (FIG. 12A) and another state wherein a pointer 19 such as a finger exists on the sensor section 100 (FIG. 12B), respectively.

Where no pointer 19 exists on the sensor section 100, a transmission conductor 12 disposed on the first substrate 15 and a reception conductor 14 disposed on the second substrate 17 are in an electrostatically coupled state through the spacer 16 as seen in FIG. 12A, and an electric field emerging from the transmission conductor 12 converges to the reception conductor 14. As a result, all current flows from the transmission conductor 12 to the reception conductor 14. On the other hand, where a pointer 19 exists on the sensor section 100, the transmission conductor 12 is coupled not only to the reception conductor 14 but also to the ground through the pointer 19, as seen in FIG. 12B. In this state, part of the electric field emerging from the transmission conductor 12 converges to the pointer 19, and part of the current flowing from the transmission conductor 12 to the reception conductor 14 is shunted to the ground through the pointer 19. As a result, the current flowing to the reception conductor 14 decreases. This current variation is detected to detect the position pointed to by the pointer 19.

Now, a calculation principle of a coordinate of a position pointed by a pointer is described with reference to FIGS. 13A to 14B. It is to be noted that attention is paid to a cross point between a transmission conductor $Y_9$, to which the spread code $C_2$ is supplied, and a reception conductor $X_{124}$. Correlation values obtained depending upon presence and absence of a pointer 19 at this cross point are described in comparison, so as to explain the coordinate calculation principle. This cross point is indicated by a blank circle in FIG. 13A, and this cross point is hereinafter referred to simply as "the cross point." Further, it is assumed that other spread codes ($C_1$ and $C_3$ to $C_{16}$) are supplied from the other transmission conductors 12, which also cross the reception conductor $X_{124}$, and that the pointer 19 does not exist on or near any cross points other than the cross point ($X_{124}$, $Y_9$).

Figure 13A:
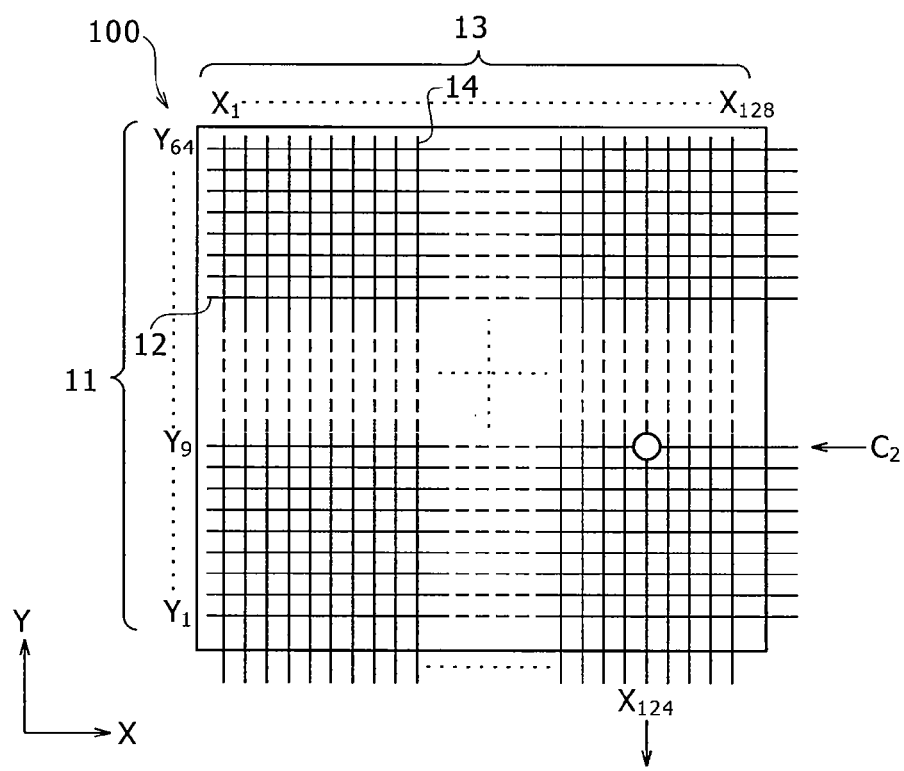
FIG. 13A is a schematic view of the sensor section of the pointer detection apparatus of FIG. 1 where no pointer exists on the sensor section.
Figure 13B:
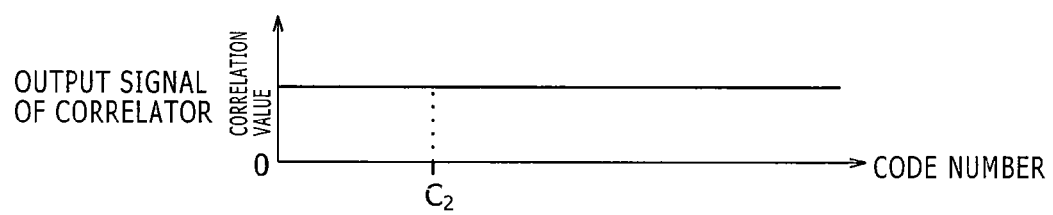
FIG. 13B is a graph illustrating a relationship between an output signal of the correlator of FIG. 10, obtained where no pointer exists on the sensor section, and a code number.

First, a correlation value obtained from the reception conductor 14 when the pointer 19 does not exist on the sensor section 100 is described with reference to FIGS. 13A and 13B. When the pointer 19 does not exist on any cross point such as the cross point ($X_{124}$, $Y_9$), the transmission conductor 12 is electrostatically coupled only to the reception conductor 14 (refer to FIG. 12A). As a result, since all of the current which should flow to the reception conductor $X_{124}$ flows to the reception conductor $X_{124}$, the correlation value obtained by correlation calculation of the output signal from the reception conductor $X_{124}$ exhibits a fixed value in terms of the correlation characteristic between the output signal of the correlator and the spread code number ($C_2$) (see FIG. 13B).

Figure 14A:
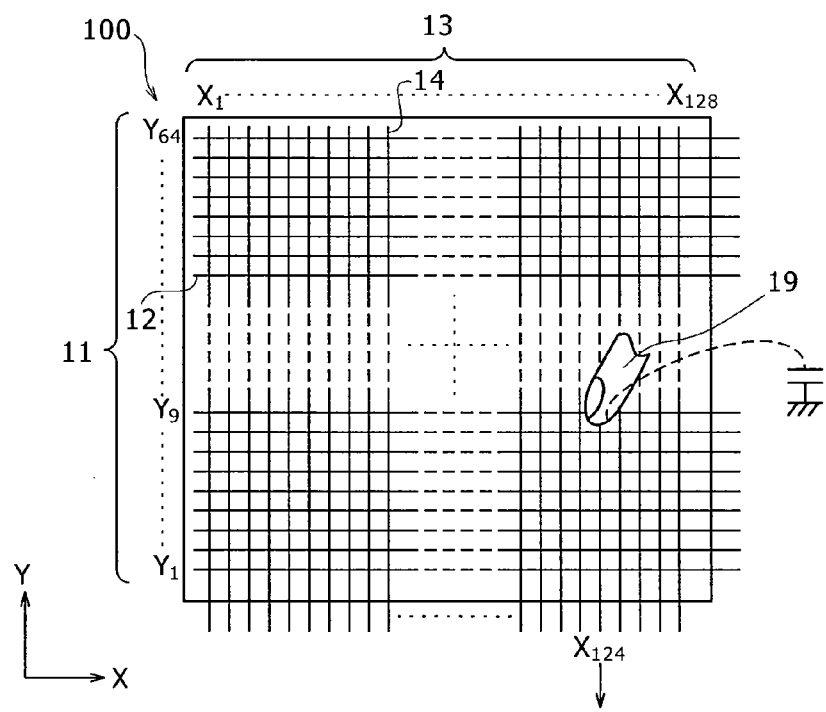
FIG. 14A is a schematic view of the sensor section of the pointer detection apparatus of FIG. 1 where a pointer exists on the sensor section.

On the other hand, where the pointer 19 exists on the cross point, the transmission conductor $Y_9$ is electrostatically coupled to the ground through the pointer 19 as seen in FIG. 12B. Consequently, part of current which should flow to the reception conductor $X_{123}$ is shunted to the ground through the pointer 19 as seen in FIG. 14A. As a result, if correlation calculation of the output signal from the reception conductor $X_{124}$ is carried out, then in terms of the correlation characteristic between the output signal of the correlator and the code number of the spread code, the correlation value obtained with the spread code $C_2$ is lower than the correlation value obtained by correlation calculation with the other spread codes (see FIG. 14B).

Figure 14B:
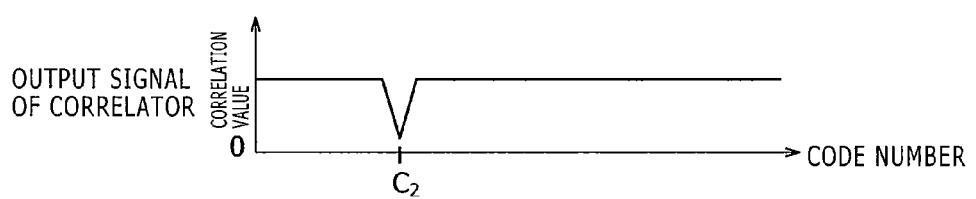
FIG. 14B is a graph illustrating a relationship between an output signal of the correlator of FIG. 10, obtained where a pointer exists on the sensor section, and a code number.

Accordingly, the transmission conductor which forms the cross point at which the pointer 19 is placed can be specified based on the spread code whose correlation value is depressed, as illustrated in FIG. 14B. For example, in the example illustrated in FIGS. 14A and 14B, since a depression region in which the correlation value is relatively low is produced at the spread code $C_2$, it is specified that the transmission conductor $Y_9$ to which the spread code $C_2$ is supplied is the transmission conductor on which the pointer 19 is placed. Then, the position, that is, the coordinate, of the pointer 19 on the sensor section 100 can be detected by specifying the region within which the correlation value is lower than a predetermined threshold value, in the spatial distribution of the correlation values stored in the correlation value storage circuit 34d.

Figure 15:
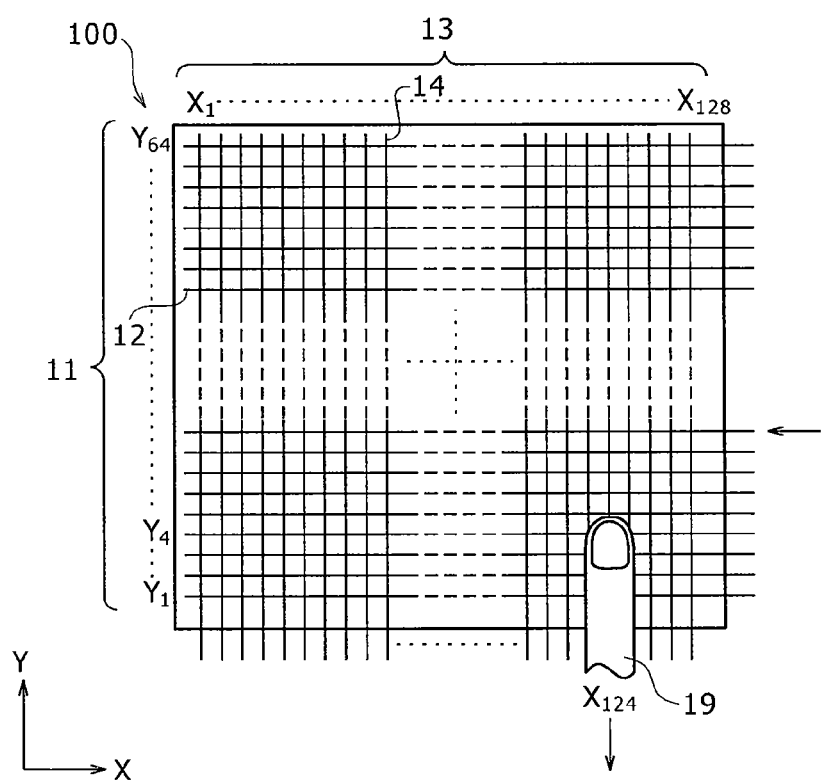
FIG. 15 is a schematic view showing the sensor section of the pointer detection apparatus of FIG. 1 where a pointer is placed along predetermined reception conductors.

Now, the principle of position detection where one finger (the pointer 19) is placed on a plurality of cross points of the sensor section 100 is described with reference to FIGS. 15 to 16B. In the following description, it is assumed that the spread codes $C_1$ to $C_{16}$ are supplied to the transmission conductors $Y_1$ to $Y_{64}$ (see FIG. 4) and one finger (the pointer 19) is placed on a plurality of cross points between the reception conductor $X_{124}$ and the transmission conductors $Y_1$ to $Y_4$ as seen in FIG. 15. It is to be noted that the spread code $C_1$ is supplied to the transmission conductors $Y_1$ to $Y_4$ on which the pointer 19 is placed.

Figure 16A:
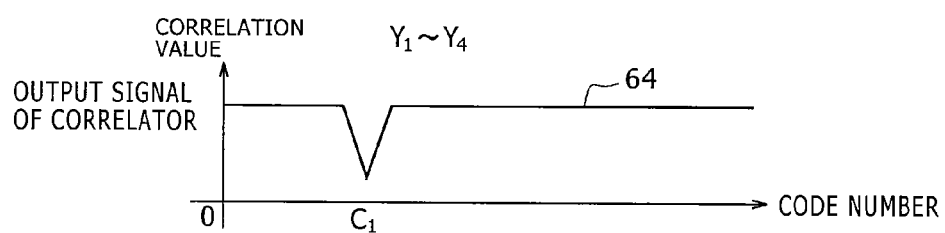
FIG. 16A is a graph illustrating a relationship between an output signal of the reception conductors of the pointer detection apparatus of FIG. 1 and a spread code where the spread code is supplied to transmission conductors shown in FIG. 15 on which the pointer is placed.

In the state illustrated in FIG. 15, current flowing into the reception conductor $X_{124}$ decreases at a plurality of cross points formed between the reception conductor $X_{124}$ and the transmission conductors $Y_1$ to $Y_4$. Accordingly, as seen in FIG. 16A, the correlation characteristic 64 between the output signal of the correlator for the reception conductor $X_{124}$ and the code number of the spread code $C_1$ is lower than the correlation values obtained by correlation calculation with regard to the other spread codes. The characteristic is the same as illustrated in FIG. 16A when the spread code $C_1$ is supplied to the multiple transmission conductors $Y_2$ to $Y_4$.

On the other hand, the pointer 19 does not exist at a plurality of cross points formed between the reception conductor $X_{124}$ and the transmission conductors $Y_5$ to $Y_{64}$. Accordingly, as seen in FIG. 16B, the correlation characteristic 65 for $Y_5$ to $Y_{64}$ becomes constant.

In this manner, with the pointer detection apparatus 1 of the present embodiment, even when a pointer is placed at a plurality cross points, both the presence and position of the pointer can be detected. It is to be noted that, if an interpolation processing circuit is provided in the position detection circuit 35 described hereinabove, then since the presence or absence of the pointer 19 between cross points can be detected, it is also possible to estimate the shape of the pointer 19 placed on the sensor section 100.

[Example of the Hadamard Code]

In the first embodiment described above, the spread codes $C_k$ having a code length of 2n chips are supplied as a signal to be supplied to the sensor section 100. As the spread codes $C_k$, Hadamard codes may be used. An example wherein the Hadamard codes are used is described with reference to FIGS. 17A and 17B.

FIG. 17A illustrates an Hadamard matrix which includes code strings $C_1$ to $C_{16}$ having the length of 16 chips. The value of each of the chips which form the code strings $C_1$ to $C_{16}$ is −1 or +1. The code strings $C_1$ to $C_{16}$ are hereinafter referred to as Hadamard codes.

In the Hadamard matrix, since the 16 Hadamard codes $C_1$ to $C_{16}$ have a fully orthogonal relationship to each other, the Hadamard codes $C_1$ to $C_{16}$ and the correlation value calculation codes $C_1'$ to $C_{16}'$ can be made the same codes, respectively. Further, for the correlator for carrying out correlation calculation, an adder/subtracter can be used in place of the multipliers $34f_1$ to $34f_{16}$ described hereinabove with reference to FIG. 10. Further, where the Hadamard matrix is used, and if it is detected by the correlator that there is a correlation, then the correlation value of an Hadamard code $C_x$ having such correlation drops as seen in FIG. 17C, resulting in detection of presence of a correlation at the corresponding code. However, even where there is a correlation, the level of the correlation value is higher than the 0 level.

Where the Hadamard matrix of FIG. 17A is used in the pointer detection apparatus of the present invention, since all of the Hadamard codes $C_1$ to $C_{16}$ which form the Hadamard matrix exhibit 1 at the first chip, if correlation calculation at this chip position is carried out by the correlator, then the correlation value may become excessively high. Therefore, in the example of FIG. 17B, the Hadamard codes are composed of 15 chips. The 16 different Hadamard codes $C_1$ to $C_{16}$ formed from 15 chips are equivalent, as can be recognized from the comparison with FIG. 17A, to those of FIG. 17A from which the first chip of each of the Hadamard codes of 16 chips is removed.

Where the 16 different Hadamard codes $C_1$ to $C_{16}$ formed from 15 chips illustrated in FIG. 17B are used, the output signal of the correlator has a level lower than the 0 level when a correlation exists whereas, where there is no correlation, the output signal of the correlator exhibits a predetermined level higher than the 0 level as seen in FIG. 17D. Consequently, beat can be reduced.

[Processing Procedure of Position Detection]

Now, operation of the pointer detection apparatus 1 according to the first embodiment is described with reference to FIGS. 1 and 6 as well as a flow chart of FIG. 18.

First, the spread code production circuits 24 of the spread code supplying circuit 21 respectively produce the spread codes $C_1$ to $C_{16}$ at step S1. Then, the reception conductor selection circuit 31 of the reception section 300 connects predetermined ones of the reception conductors 14 in the respective detection blocks 36 and the I/V conversion circuits 32a by means of the switches 31a at step S2.

Then, the transmission conductor selection circuit 22 selects predetermined ones of the transmission conductor 12 to which the spread codes $C_1$ to $C_{16}$ are to be supplied in the respective transmission blocks 25 at step S3. Then at step S4, the spread codes $C_1$ to $C_{16}$ are supplied to the predetermined transmission conductors 12 selected in the transmission blocks 25.

Then at step S5, the reception section 300 simultaneously detects the output signals $S_1$ from the predetermined reception conductors 14 in the detection blocks 36 selected at step S2. In particular, the amplification circuit 32 first converts current signals output from the selected predetermined reception conductors 14 (i.e., total 16 reception conductors 14 in the illustrated embodiment) into voltage signals and amplifies the voltage signals by means of the I/V conversion circuits 32a, and then outputs the amplified signals to the A/D conversion circuit 33. Then, the A/D conversion circuit 33 converts the voltage signals input thereto into digital signals and outputs the digital signals to the correlation value calculation circuit 34.

Then, the correlation value calculation circuit 34 carries out correlation calculation of the input digital signals with regard to the correlation value calculation codes $C_1'$ to $C_{16}'$ and stores resulting values in the correlation value storage circuit 34d at step S6.

Then, the control circuit 40 decides at step S7 whether or not the correlation calculation is completed with regard to all of the transmission conductors 12 on the reception conductor 14 selected at step S4. If the position detection with regard to all of the transmission conductors 12 on the selected reception conductor 14 is not completed, that is, if the result of decision at step S7 is NO, then the processing returns to step S3. At step S3, the switches 22a of the transmission blocks 25 in the transmission conductor selection circuit 22 are switched to select the transmission conductors 12 different from those in the preceding operation cycle and, thereafter the processes at steps S3 through S6 are repeated. Thereafter, the processes at steps S3 through S6 are repeated until the position detection with regard to all of the transmission conductors 12 on the selected reception conductor 14 is completed.

In particular, if it is assumed that the reception conductors $X_1, X_9, \ldots, X_{121}$ are selected first as seen in FIG. 6, then the spread codes $C_1$ to $C_{16}$ are first supplied to the transmission conductors $Y_4, Y_8, \ldots, Y_{64}$, respectively. Then, while the selected reception conductors remain selected, the transmission conductors to which the spread codes $C_1$ to $C_{16}$ are to be supplied are switched to the transmission conductors $Y_3, Y_7, \ldots, Y_{63}$ and the spread codes $C_1$ to $C_{15}$ are supplied to the transmission conductors $Y_3, Y_7, \ldots, Y_{63}$ so that correlation calculation is carried out. If this process is repeated until the spread codes $C_1$ to $C_{16}$ are supplied to the transmission conductors $Y_1, Y_5, \ldots, Y_{61}$ to carry out correlation calculation, then one cycle of the switching of the transmission conductors 12 in each of the transmission blocks 25 is completed and the position detection of all of the transmission conductors 12 with regard to the reception conductors $X_1, X_9, \ldots, X_{121}$ is completed. This is decided as a state of YES at step S7. If the detection of all of the transmission conductors 12 on the selected reception conductor(s) 14 is completed in this manner, then the processing advances to step S8.

Where the correlation calculation with regard to all of the transmission conductors 12 on the reception conductor 14 selected at step S2 is completed, that is, where the result of decision at step S7 is YES, the control circuit 40 decides whether or not the position detection on all of the reception conductors 14 is completed at step S8. If the correlation calculation on all of the reception conductors 14 is not completed, that is, if the result of decision at step S8 is NO, then the processing returns to step S2, at which the switches 31a in the reception conductor selection circuit 31 are switched to select the reception conductors 14. At step s3, the switches 221 in the transmission conductor selection circuit 22 are controlled to select predetermined transmission conductors 12. Then, in step s4, the spread codes $C_1$ to $C_{16}$ are supplied at the same time to the selected plural transmission conductors 12 from the spread code supplying circuit 21. In this manner, the transmission conductors 12 and the reception conductors 14 are selectively switched to continue the correlation calculation. Thereafter, the processes at steps S2 to S7 are repeated until the correlation calculation with regard to all of the transmission conductors 12 on all reception conductors 14 is completed. This is decided as a state of YES at step S8.

In short, the transmission conductors 12 in the transmission blocks 25 are rotated in a state wherein, for example, the reception conductors $X_1, X_9, \ldots, X_{121}$ are selected as seen in FIG. 6 to carry out correlation calculation with regard to all of the transmission conductors 12 on the reception conductors $X_1, X_9, \ldots, X_{121}$. Thereafter, the reception conductors are switched to the reception conductors $X_2, X_{10}, \ldots, X_{122}$ and the transmission conductors 12 in the transmission blocks 25 are again rotated. This process is repeated to successively switch between the reception conductors 14. Then, if the correlation calculation is completed on the last set of the reception conductors $X_8, X_{16}, \ldots, X_{128}$ at the end of the rotation, then the processing advances to step S9, but otherwise, the processing returns to the step S2.

The position detection circuit 35 detects, based on signals at the cross points of the reception conductors 14 stored in the correlation value storage circuit 34d of the correlation value calculation circuit 34, from which reception conductor(s) 14 a reduced-level signal is output and further detects the corresponding spread code. Then at step S9, the position detection circuit 35 calculates the position of the pointer based on the index m (1 to 128) of the reception conductor 14 specified from the signal level and the index n (1 to 64) of the transmission conductor 12 from which the corresponding spread code is supplied. The position detection of the pointer disposed on the sensor section 100 is carried out in this manner.

In the present first embodiment, different spread codes are supplied to predetermined ones of the transmission conductors 12 in the respective groups at the same time, that is, multiplex-transmitted, to detect the position of the pointer simultaneously by means of predetermined plural ones of the reception conductors 14. In other words, a simultaneous detection process is carried out at the same time for a plurality of cross points between the transmission conductors 12 and the reception conductors 14. As a result, the time required for position detection of a plurality of cross points can be reduced, and such position detection of the pointer can be carried out at a higher speed.

In particular, since, in the first embodiment, the transmission conductor array 11 and the reception conductor array 13 are individually divided into 16 groups which are processed in parallel to each other, the detection time of the transmission conductor array 11 and the reception conductor array 13 can be reduced to 1/(16×16) in comparison with the detection time required for successively carrying out a detection process for all cross points as in the prior art. It is to be noted that the number of groups is not limited to the specific number described above. Naturally, detection time reduction can be achieved also where only one of the transmission conductor array 11 and the reception conductor array 13 is divided into groups.

Since the pointer detection apparatus of the present invention makes it possible to detect a pointer at a plurality of cross points simultaneously and at a high speed as described above, it is possible not only to detect a plurality of pointed positions by different pointers of one user at a high speed, but also to detect a plurality of pointed positions by different pointers of a plurality of users at the same time. Since a plurality of pointers can be detected at the same time irrespective of the number of users, the pointer detection apparatus can contribute to development of various applications. It is to be noted that, since it is possible to detect a plurality of pointers at the same time, naturally it is possible to detect pointing by a single pointer.

While the first embodiment described above is configured such that, after detection with regard to all transmission conductors on one reception conductor is completed, the reception conductor for such detection is switched to another (e.g., adjacent) reception conductor to repeat the position detection, the present invention is not limited to this configuration. For example, the reception conductor for detection may be switched to another reception conductor to continue the position detection before the detection with regard to all transmission conductors on one reception conductor is completed, as long as position detection at all cross points of the sensor section 100 is completed finally.

Further, while, in the first embodiment described above, the position of a pointer is detected, the present invention is not limited to this configuration. For example, it is possible to use the pointer detection apparatus according to the first embodiment as an apparatus for detecting only the presence or absence of a pointer from correlation values obtained by the pointer detection apparatus. It is to be noted that, in this case, the position detection circuit 35 does not have to be provided.

2. Second Embodiment

Examples of a Configuration Which Uses a PSK-Modulated Spread Code

While, in the first embodiment described above, the spread codes $C_k$ are supplied directly to the transmission conductor array 11, the present invention is not limited to this configuration. For example, the spread codes $C_k$ may be supplied to the transmission conductor array 11 after predetermined modulation is applied thereto. The second embodiment is directed to an example of a configuration wherein the spread codes $C_k$ to be supplied to the transmission conductor array 11 are PSK (Phase Shift Keying) modulated.

[PSK Modulation]

Figure 19A:
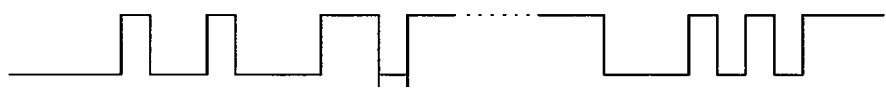
FIG. 19A is a waveform diagram of a spread code before PSK modulation by a pointer detection apparatus according to a second embodiment of the present invention.
Figure 19B:
FIG. 19B is a waveform diagram of the spread code of FIG. 19A after PSK modulation.

FIGS. 19A and 19B illustrate waveforms of spread codes before and after PSK modulation. In particular, FIG. 19A illustrates a waveform of a spread code before PSK modulation and FIG. 19B illustrates a waveform of the spread code after the PSK modulation.

In the present second embodiment, the spread codes $C_k$ are PSK modulated with a signal having a clock period equal to half the clock period of the spread codes $C_k$ (i.e., chip period), for example. It is to be noted that the present invention is not limited to this configuration, and the ratio between the clock period for modulation and the clock period before modulation (i.e., chip period) may be changed suitably in accordance with each application. In the present PSK modulation, for example, when the signal level of the spread codes before modulation illustrated in FIG. 19B is High, the signal is reversed at a timing at which the signal level begins with the Low level, but when the signal level is Low, the signal is reversed at another timing at which the signal level begins with the High level. As a result, the modulation signal illustrated in FIG. 19B is obtained.

[Configuration of the Pointer Detection Apparatus]

Figure 20:
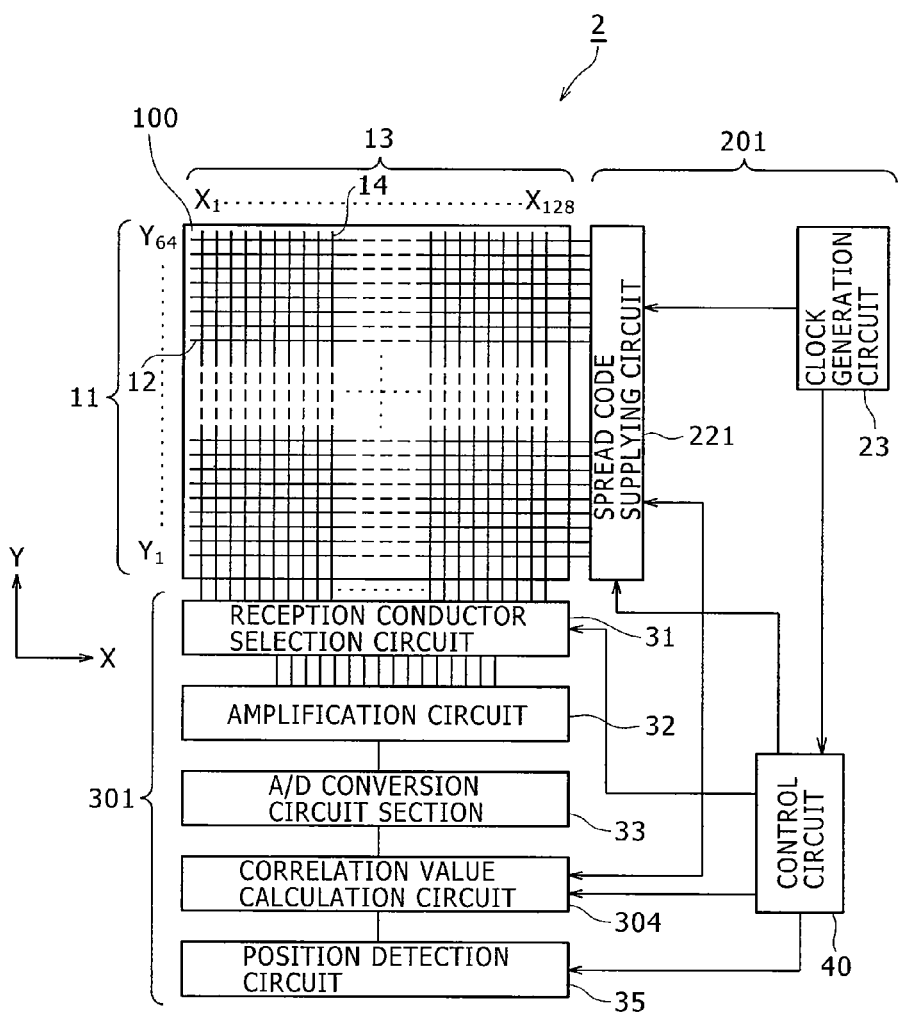
FIG. 20 is a schematic block diagram of the pointer detection apparatus according to the second embodiment.

A pointer detection apparatus 2 according to the second embodiment is described with reference to FIG. 20. The pointer detection apparatus 2 of the second embodiment includes a sensor section 100, a transmission section 201, a reception section 301, and a control circuit 40. The pointer detection apparatus 2 according to the present second embodiment is different from the pointer detection apparatus 1 according to the first embodiment described hereinabove with reference to FIG. 1 in that the transmission section 201 includes a spread code supplying circuit 221, which in turn includes a PSK modulation circuit for applying PSK modulation to the spread codes $C_k$, and that the reception section 301 includes a correlation value calculation circuit 304, which in turn includes a PSK demodulation circuit for demodulating the PSK-modulated spread codes $C_k$. The pointer detection apparatus 2 according to the present second embodiment is similar in configuration of the remaining part to the pointer detection apparatus 1 according to the first embodiment described hereinabove with reference to FIG. 1, and therefore, overlapping description of the remaining part of the pointer detection apparatus 2 is omitted herein to avoid redundancy. It is to be noted that, in the present second embodiment, the spread codes $C_k$ have, for example, a 63-chip length and PSK modulation is applied using a clock signal having half the period of the spread codes $C_k$ (i.e., the chip period) to produce a modulated signal of a 126-clock length.

Now, a configuration of the transmission section 201 in the second embodiment is described with reference to FIG. 21. A spread code supplying circuit 221 includes a plurality of spread code production circuits 24 and a plurality of PSK modulation circuits 26. The PSK modulation circuits 26 are provided at output terminals of the spread code production circuits 24 since they respectively PSK-modulate 16 different spread codes $C_1, C_2, \ldots, C_{16}$ produced in synchronism with each other based on the same clock supplied from the clock generation circuit 23. In particular, the number of PSK modulation circuits 26 is equal to the number of spread code production circuits 24, that is, 16. The PSK modulation circuits 26 PSK-modulate the spread codes $C_1, C_2, \ldots, C_{16}$ to produce 16 different PSK modulation signals $C_{1P}, C_{2P}, \ldots, C_{16P}$. The PSK modulation signals $C_{1P}$ to $C_{16P}$ are supplied to the transmission conductors 12.

Figure 22:
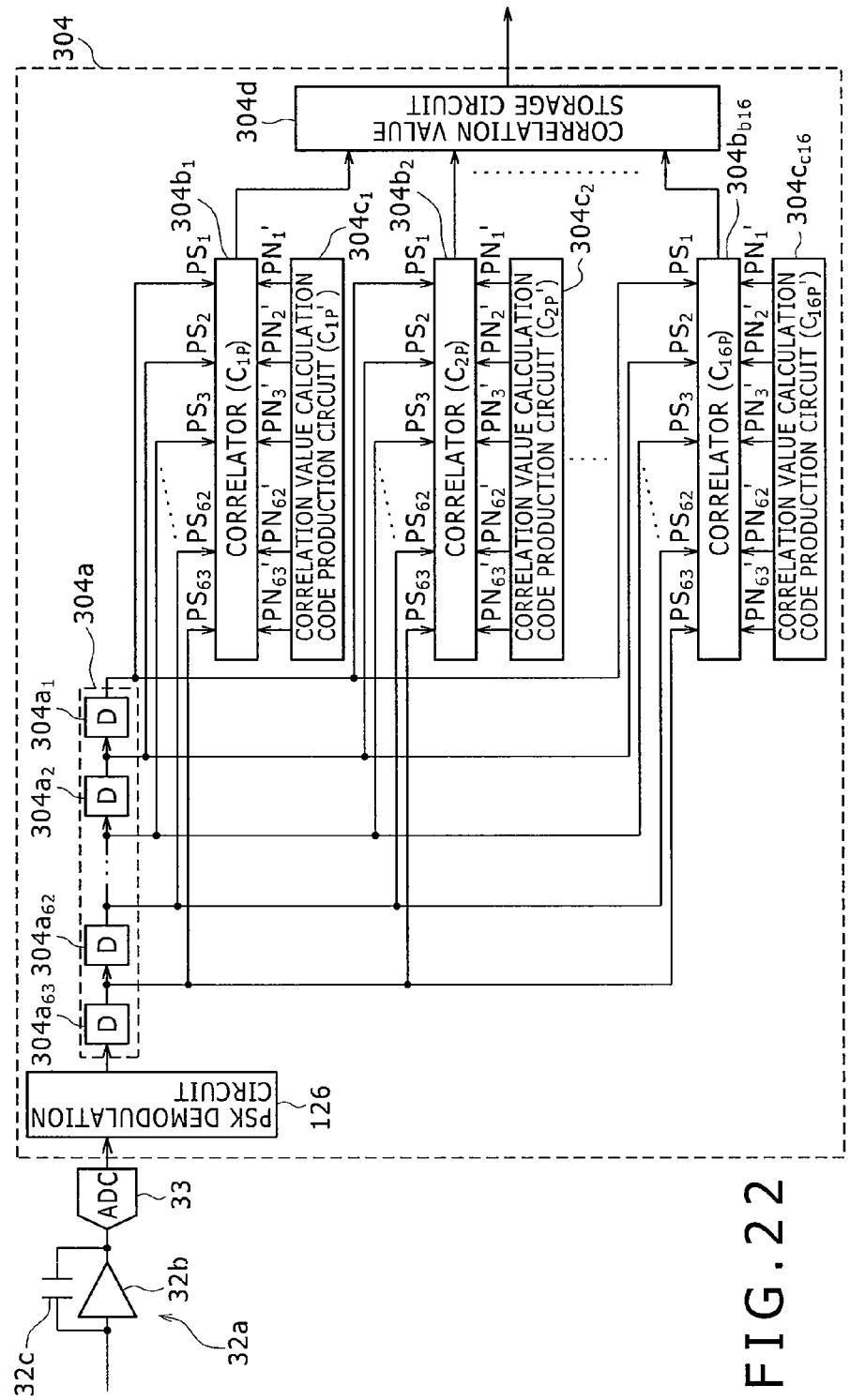
FIG. 22 is a block diagram showing a correlation value calculation circuit shown in FIG. 20.

A configuration of the correlation value calculation circuit 304 in the present second embodiment is described with reference to FIG. 22. FIG. 22 shows a circuit configuration of the correlation value calculation circuit 304 in the second embodiment and a connection scheme of the correlation value calculation circuit 304, the I/V conversion circuit 32a, and the A/D conversion circuit 33.

The correlation value calculation circuit 304 includes a PSK demodulation circuit 126, a signal delay circuit 304a, 16 correlators $304b_1, 304b_2, 304b_3, \ldots, 304b_{16}$, 16 correlation value calculation code production circuits $304c_1$ to $304c_{16}$, and a correlation value storage circuit $304d$.

The signal delay circuit $304a$ temporarily retains digital signals successively input thereto from the A/D conversion circuit 33 and simultaneously supplies the retained data to the correlators $304b_1$ to $304b_{16}$ similarly to the signal delay circuit $34a$ in the first embodiment described above. The signal delay circuit $304a$ includes a number of D-flip-flop circuits $304a_1, 304a_2, 304a_3, \ldots, 304a_{62}, 304a_{63}$ equal to the number of the code length of the spread code, which is 63. The D-flip-flop circuits $304a_{63}, 304a_{62}, 304a_{61}, \ldots, 304a_3, 304a_2, 304a_1$ are connected in series in this order from the A/D conversion circuit 33 side. An output terminal of each of the D-flip-flop circuits $304a_1$ to $304a_{63}$ is connected to a neighboring one of the D-flip-flop circuits $304a_{63}$ to $304a_2$ (for example, the output terminal of the D-flip-flop circuit $304a_{63}$ is connected to the D-flip-flop circuit $304a_{62}$) and also to the correlators $304b_1$ to $304b_{16}$. Output signals from the D-flip-flop circuits $304a_1$ to $304a_{63}$ are input to all of the correlators $304b_1$ to $304b_{16}$.

Figure 21:
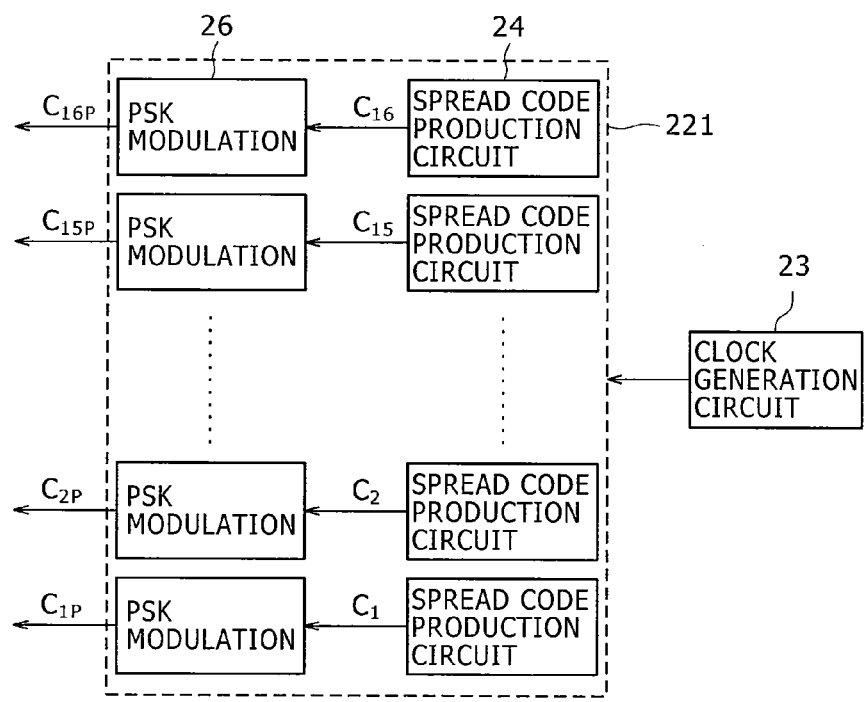
FIG. 21 is a block diagram showing a spread code supplying circuit shown in FIG. 20.

The PSK demodulation circuit 126 demodulates the spread codes that were PSK-modulated by the PSK modulation circuit 26 of the transmission section 201 shown in FIG. 21 back into the original spread codes $C_k$. As seen in FIG. 22, the PSK demodulation circuit 126 is interposed between the A/D conversion circuit 33 and the signal delay circuit $304a$, and PSK-demodulates the output signals digitally converted by the A/D conversion circuit 33 to output the PSK demodulated signals to the signal delay circuit $304a$ at the following stage. In particular, the PSK demodulation circuit 126 demodulates PSK modulation signals into signals prior to the modulation illustrated in FIG. 19A, that is, into the original spread codes $C_k$. It is to be noted that, while, in the present second embodiment, the PSK demodulation circuit 126 is provided in the correlation value calculation circuit 304, that is, the PSK demodulation circuit 126 demodulates the output signals after being converted into digital signals, the present invention is not limited to this configuration. Since PSK demodulation can be applied to any signals after conversion of current signals of the output signals into voltage signals, the PSK demodulation circuit 126 may otherwise be provided between the amplification circuit 32 (I/V conversion circuits $32a$) and the A/D conversion circuit 33.

The output signals demodulated by the PSK demodulation circuit 126 are supplied to the D-flip-flop circuits $304a_1$ to $304a_{63}$ connected in series at a plurality of stages. In the following description, the output signals of 63 chips output from the 63 D-flip-flop circuits $304a_1$ to $304a_{63}$ are referred to as output signals $PS_1, PS_2, PS_3, \ldots, PS_{62}, PS_{63}$.

The output signals $PS_1$ to $PS_{63}$ of 63 chips are supplied at the same time to the 16 correlators $304b_1$ to $304b_{16}$. The correlators $304b_1$ to $304b_{16}$ carry out correlation calculation between the output signals $PS_1$ to $PS_{63}$ of 63 chips and the correlation value calculation codes $C_1'$ to $C_{16}'$ supplied from the correlation value calculation code production circuits $304c_1$ to $304c_{16}$, respectively, to calculate correlation values. In particular, for example, the correlator $304b_1$ is supplied with the correlation value calculation code $C_{1P}'$ ($PN_1'$ to $PN_{63}'$) of 63 chips from the correlation value calculation code production circuit $304c_1$, carries out correlation calculation of the output signal and the correlation value calculation code for each chip and supplies the correlation value between them to the correlation value storage circuit $304d$ to carry out correlation detection of the spread code $C_1$.

Similarly, the correlators $304b_2$ to $304b_{16}$ carry out correlation calculation between the output signals $PS_1$ to $PS_{63}$ and the correlation value calculation codes $C_{2P}'$ to $C_{16P}'$ and supply correlation values that result from the calculation to the correlation value storage circuit $304d$ to be stored therein. In this manner, the correlation calculation is carried out respectively for all of the 16 spread codes and resulting correlation values are stored into the correlation value storage circuit $304d$. It is to be noted that, while the configuration shown in FIG. 22 uses a number of correlators corresponding to the number of different spread codes, the present invention is not limited to this configuration. For example, another configuration may be applied wherein the configuration described hereinabove with reference to FIG. 9 is applied to the correlation value calculation circuit 304 and the correlation value calculation circuit is formed from a single correlator and a correlation value calculation code production circuit which can supply a plurality of correlation value calculation codes such that a plurality of different correlation values are calculated time-divisionally.

As described above, in the present second embodiment, spread codes different from each other are PSK modulated, and the PSK-modulated spread codes are supplied at the same time or multiplex-transmitted to the transmission conductors which form the transmission conductor group such that the position of a pointer is determined at the same time by a plurality of selected reception conductors. As a result, with the present second embodiment, similar effects as of the first embodiment can be achieved.

Further, in the present second embodiment, when spread codes to be supplied to the transmission conductors are to be PSK modulated, a clock signal of a period shorter than the chip period of the spread codes is used. In this instance, when the spread codes are demodulated by the reception section, the frequency of signal transition at a rising edge and a falling edge of the demodulated spread codes can be increased. Therefore, in the present second embodiment, the error in position detection of a pointer can be reduced. Further, by PSK-modulating spread codes, the noise resisting property can be improved.

While, in the present second embodiment, PSK-modulated spread codes are supplied to the transmission conductors, the present invention is not limited to this configuration. In a third embodiment described below, spread codes are modulated in a different manner before they are supplied.

3. Third Embodiment

Examples of a Configuration Which Uses an FSK-Modulated Spread Code

The third embodiment is configured such that the spread codes $C_k$ to be supplied to the transmission conductor array 11 are FSK (Frequency Shift Keying) modulated.

[FSK Modulation]

Figure 23A:
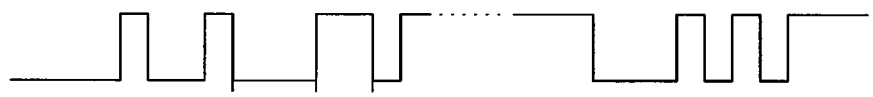
FIG. 23A is a waveform diagram of a spread code before FSK modulation by a pointer detection apparatus according to a third embodiment of the present invention.
Figure 23B:
FIG. 23B is a waveform diagram of the spread code of FIG. 23A after FSK modulation.

FIGS. 23A and 23B illustrate waveforms of spread codes before and after FSK modulation, respectively.

In the third embodiment described below, a signal of a clock frequency equal to, for example, twice or four times the clock frequency of the spread codes $C_k$ before modulation (i.e., the chip rate) is used for FSK modulation. It is to be noted that the present invention is not limited to this configuration and the ratio between the clock frequency for modulation and the chip rate can be changed suitably according to each application or the like. In the FSK modulation in the present third embodiment, a signal of a High level state in the spread codes before modulation illustrated in FIG. 23A corresponds to a signal of a frequency that is four times that of the spread codes before modulation, while a signal in a Low level state corresponds to a signal of a frequency that is twice that of the spread codes before modulation, to obtain a modulation signal illustrated in FIG. 23B. Also in the present third embodiment, spread codes of a 63-chip length are used similarly as in the second embodiment described above, and signals of clock frequencies of twice and four-times are used to apply FSK modulation to the spread codes to produce an FSK modulation signal. It is to be noted that, if the configuration of the pointer detection apparatus according to the present third embodiment is compared with that of the pointer detection apparatus 2 of the second embodiment described hereinabove, then the former is the same as the latter except that the spread code supplying circuit 221 and the correlation value calculation circuit 304 are replaced with the spread code supplying circuit 222 and the correlation value calculation circuit 314, respectively. Therefore, like elements are denoted by like reference characters and overlapping description of them is omitted herein to avoid redundancy.

First, a configuration of a spread code supplying circuit 222 in the present third embodiment is described with reference to FIG. 24. The spread code supplying circuit 222 includes a plurality of spread code production circuits 24 and a plurality of FSK modulation circuits 27. In the present embodiment, in order to FSK-modulate 16 different spread codes $C_1$, $C_2$, ..., $C_{16}$ produced in synchronism with each other based on the same clock, 16 spread code production circuits 24 and 16 FSK modulation circuits 27 are provided. The FSK modulation circuits 27 FSK-modulate the spread codes $C_1$ to $C_{16}$ and supply FSK modulation signals $C_{1F}, C_{2F}, ..., C_{16F}$ to the transmission conductors 12, respectively.

Figure 25:
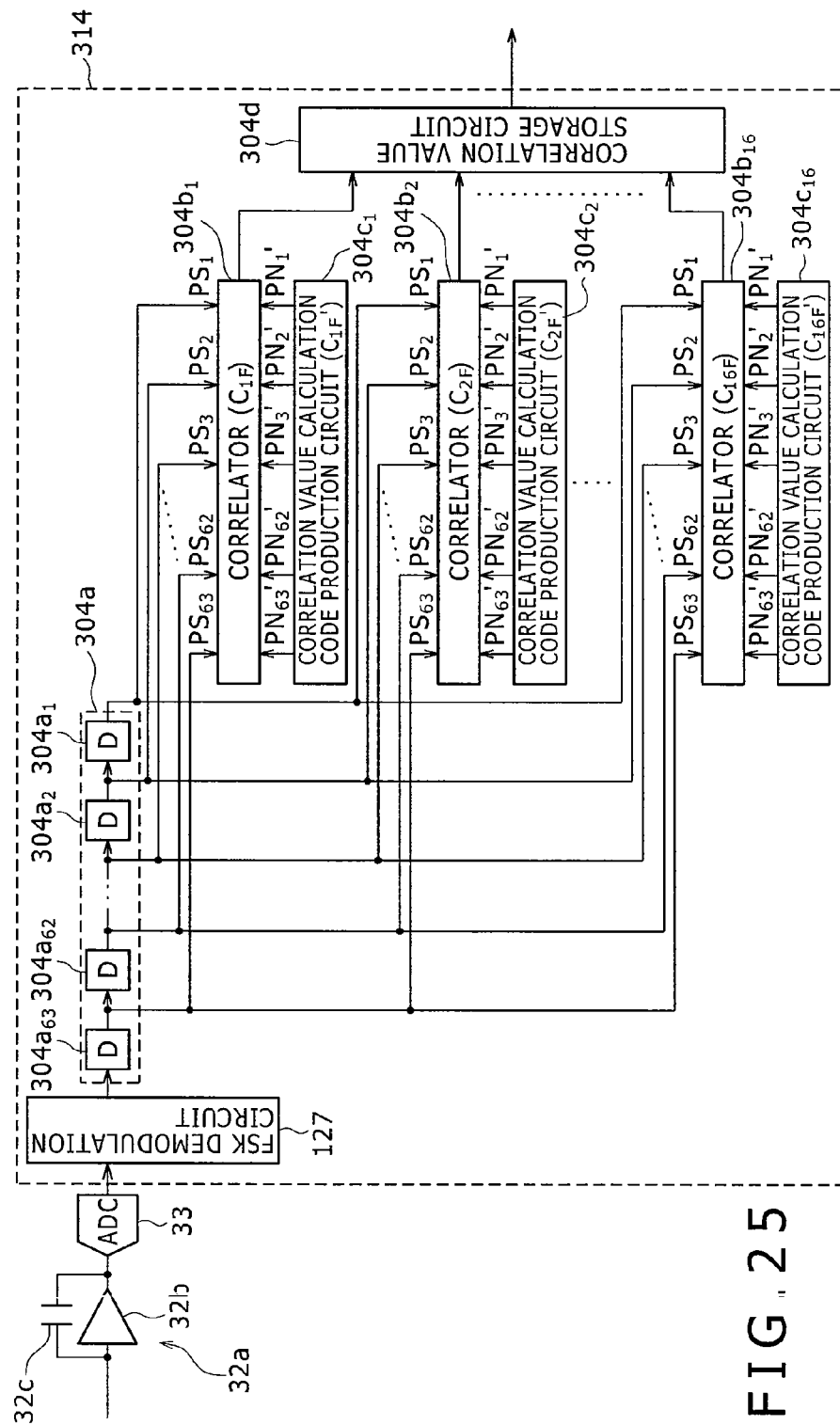
FIG. 25 is a block diagram showing a configuration of a correlation value calculation circuit according to the third embodiment.

A configuration of a correlation value calculation circuit 314 in the present third embodiment is described with reference to FIG. 25. FIG. 25 shows a circuit configuration of the correlation value calculation circuit 314 in the third embodiment and a connection scheme of the correlation value calculation circuit, the I/V conversion circuit 32a, and the A/D conversion circuit 33.

The correlation value calculation circuit 314 includes an FSK demodulation circuit 127, a signal delay circuit 304a, 16 correlators $304b_1, 304b_2, ..., 304b_{16}$, a number of correlation value calculation code production circuits $304c_1, 304C_2, ..., 304c_{16}$ equal to the number of the correlators $304b_1$ to $304b_{16}$, that is, 16 correlation value calculation code production circuits $304c_1, 304C_2, ..., 304c_{16}$, and a correlation value storage circuit 304d.

Figure 24:
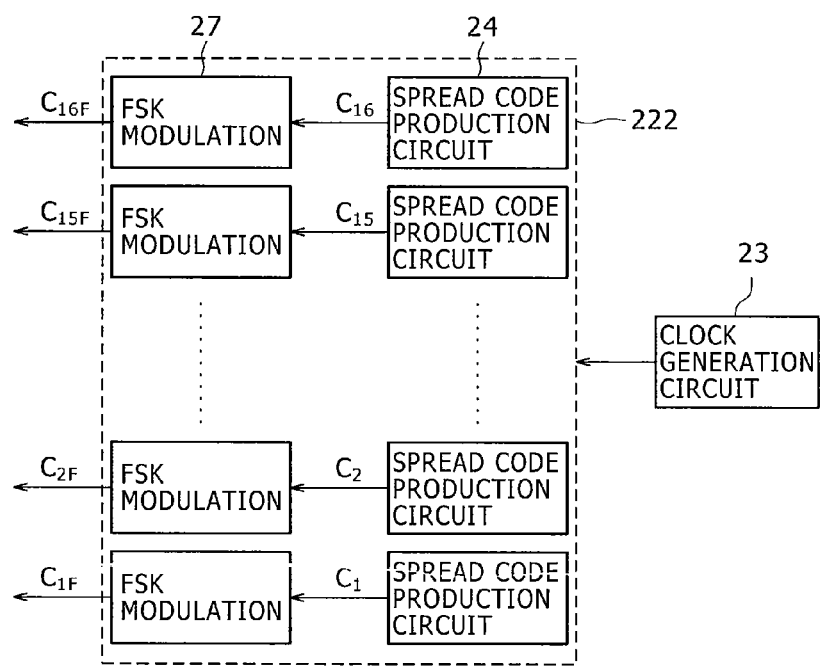
FIG. 24 is a block diagram showing a configuration of a spread code supplying circuit according to the third embodiment of the present invention.

The FSK demodulation circuit 127 demodulates spread codes that were FSK-modulated by the FSK demodulation circuit 27 shown in FIG. 24 back into the original spread codes. The FSK demodulation circuit 127 is interposed between the A/D conversion circuit 33 and the signal delay circuit 304a, and FSK-demodulates the output signals that are digitally converted by the A/D conversion circuit 33. In particular, the FSK demodulation circuit 127 demodulates signals modulated, for example, in the state illustrated in FIG. 23B so that the demodulated signals have the same state as that of the signals before modulation as illustrated in FIG. 23A. It is to be noted that, while, in the present third embodiment, the FSK demodulation circuit 127 is provided in the correlation value calculation circuit 314, that is, the FSK demodulation circuit 127 demodulates the output signals converted into digital signals, the present invention is not limited to this configuration. Since signals obtained by converting current signals into voltage signals can be FSK-demodulated, the FSK demodulation circuit 127 may otherwise be provided between the I/V conversion circuit 32a and the A/D conversion circuit 33.

The output signals demodulated by the FSK demodulation circuit 127 are supplied to the D-flip-flop circuits $304a_1$ to $304a_{63}$ connected in series at a plurality of stages, and the output signals from the D-flip-flop circuits $304a_1$ to $304a_{63}$ are input to all correlators $304b_1$ to $304b_{16}$. It is to be noted that, since the configuration and the process of the other part of the correlation value calculation circuit 314 are the same as those of the second embodiment described hereinabove with reference to FIG. 22, overlapping description of them is omitted herein to avoid redundancy.

In the present embodiment, a plurality of spread codes are FSK modulated, and the FSK-modulated spread codes are supplied at the same time, that is, multiplex-modulated, to a plurality of transmission conductors 12 which form the transmission conductor array 11 such that the position of a pointer is detected at the same time by a plurality of selected reception conductors 14. As a result, in the present third embodiment also, similar effects as in the second embodiment can be achieved.

Further, by FSK-modulating spread codes, the bandwidth of signals to be supplied to the transmission conductor array 11 can be widened, and consequently, the noise resisting property can be improved.

4. Fourth Embodiment

Different Supplying Methods of a Spread Code

The first embodiment described hereinabove with reference to FIG. 4 is configured such that the transmission conductors 12 which form the transmission conductor array 11 are divided into a plurality of transmission blocks 25 each composed of four transmission conductors $Y_n$ to $Y_{n+3}$ positioned adjacent to each other, and the spread codes $C_1$ to $C_{16}$ are supplied respectively to the plural transmission blocks 25 while each of the spread codes $C_1$ to $C_{16}$ is supplied to one of the four transmission conductors $Y_n$ to $Y_{n+3}$ forming each of the transmission blocks 25. However, according to the present invention, the spread codes $C_1$ to $C_{16}$ need not be supplied to predetermined ones of the transmission conductors 12 and may be suitably supplied to arbitrary ones of the transmission conductors 12.

In the following, modifications 1 to 3 to the supplying method of spread codes are described with reference to FIGS. 26 to 29.

[Modification 1]

Figure 26:
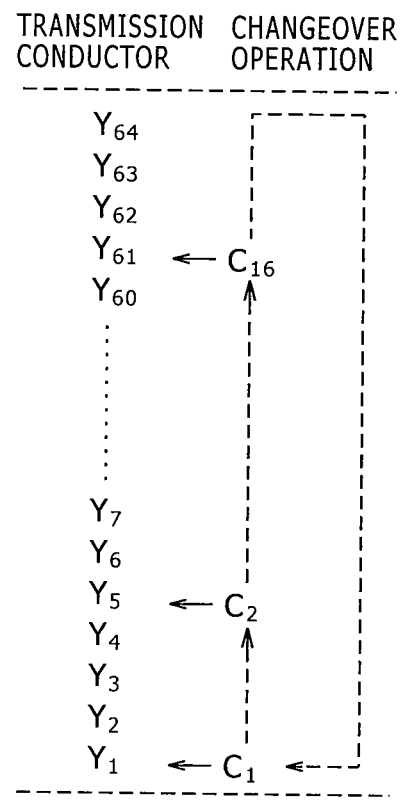
FIG. 26 is a schematic view illustrating switching of transmission conductors by a transmission conductor selection circuit according to a modification 1.

First, the supplying method of spread codes according to the modification 1 is described with reference to FIG. 26. In the present modification 1, though not particularly shown, for example, a switch is provided between the transmission conductor selection circuit 22 and the spread code supplying circuit 21 shown in FIG. 4. The switch is configured such that the spread codes $C_1$ to $C_{16}$ supplied from the spread code supplying circuit 21 are selectively supplied to the transmission conductor selection circuit 22 through the switch (not shown). It is to be noted that the other part of the modification 1 has the same configuration as that of the first embodiment described hereinabove with reference to FIG. 1, and therefore FIG. 1 is referred to where appropriate while description of the common configuration is omitted herein.

The transmission conductor selection circuit 22 selects 16 transmission conductors 12 at intervals of four transmission conductors 12 from among the transmission conductors $Y_1$ to $Y_{63}$. In particular, the transmission conductor selection circuit 22 first selects the transmission conductors $Y_1, Y_5, ..., Y_{57}, Y_{61}$ and supplies the spread codes $C_1$ to $C_{16}$ to the selected transmission conductors 12. Then, in this state, supply of the spread codes can be carried out for a predetermined period of time.

Thereafter, the transmission conductor selection circuit 22 selects the transmission conductors 12 at positions displaced by a one-conductor distance in a direction in which the index n of the transmission conductor 12 increases. In particular, the 16 transmission conductors $Y_1, Y_5, \ldots, Y_{57}, Y_{61}$ selected in the preceding cycle are changed (switched) to the transmission conductors $Y_2, Y_6, \ldots, Y_{58}, Y_{62}$, respectively. Then, the spread codes $C_1$ to $C_{16}$ supplied from the spread code supplying circuit 21 are supplied at the same time to the newly selected transmission conductors $Y_2, Y_6, \ldots, Y_{58}, Y_{62}$, respectively. Thereafter, the switching operation of the transmission conductors 12 described above is successively repeated to carry out supply of the spread codes.

Then, after the spread codes $C_1$ to $C_{16}$ are supplied at the same time to the transmission conductors $Y_4, Y_8, \ldots, Y_{60}, Y_{64}$ by the transmission conductor selection circuit 22, then those transmission blocks 25 shown in FIG. 4 to which the spread codes are to be supplied are changed (switched) by the switch (not shown) and then the operation described above is repeated. For example, if attention is paid to the transmission block 25 which consists of the transmission conductors $Y_1$ to $Y_4$, then the spread code $C_1$ is supplied first to the transmission block 25 and supply of the spread code $C_1$ is carried out to the transmission conductors 12 beginning with the transmission conductor $Y_1$. Then, the transmission conductor selection circuit 22 successively switches the transmission conductor 12 to which the spread code $C_1$ is to be supplied, as described above. Then, after the spread code $C_1$ is supplied to the transmission conductor $Y_4$, the transmission conductor selection circuit 22 switches the transmission conductor 12 to which the spread code is to be supplied to the transmission conductor $Y_1$, and the switch (not shown) changes the spread code to be supplied to the transmission block 25 to the spread code $C_{16}$ and then repeats the switching operation described above. After the spread code is supplied to the transmission conductor $Y_4$ again, the transmission conductor selection circuit 22 again switches the transmission conductor to which the spread code is to be supplied to the transmission conductor $Y_1$ and the switch (not shown) changes the spread code to the spread code $C_{15}$ and, thereafter the operation described above is repeated.

It is to be noted that, although, in the example described above as the modification 1, the transmission conductor selection circuit 22 switches the transmission conductor 12 to be connected in a direction in which the index n of the transmission conductor 12 increases after every predetermined interval of time, the present invention is not limited to this configuration. For example, the transmission conductor 12 to be connected to the spread code supplying circuit 21 may be switched in a direction in which the index n thereof decreases. Further, the transmission conductor 12 may be switched at random in accordance with a predetermined sequence. Further, while the foregoing description is directed to switching of the transmission conductor 12, likewise, the reception conductors 14 may be switched at random in accordance with a predetermined sequence.

[Modification 2]

In the modification 1, the transmission conductor selection circuit 22 selects 16 transmission conductors 12 at four conductor intervals from among the transmission conductors $Y_1$ to $Y_{64}$ after every predetermined interval of time, and switches the selected transmission conductors 12 in a direction in which the index n of the transmission conductor 12 increases to supply the spread codes $C_k$ thereto. However, the selection of the transmission conductors 12 to which the spread codes $C_k$ are to be supplied need not be carried out at intervals of a predetermined number of conductors.

Figure 27:
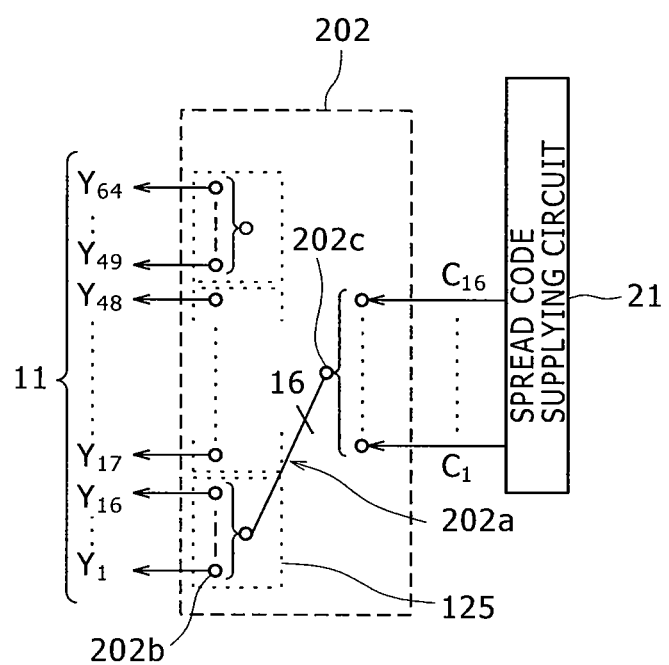
FIG. 27 is a diagrammatic block diagram showing a configuration of a transmission conductor selection circuit according to a modification 2.
Figure 28:
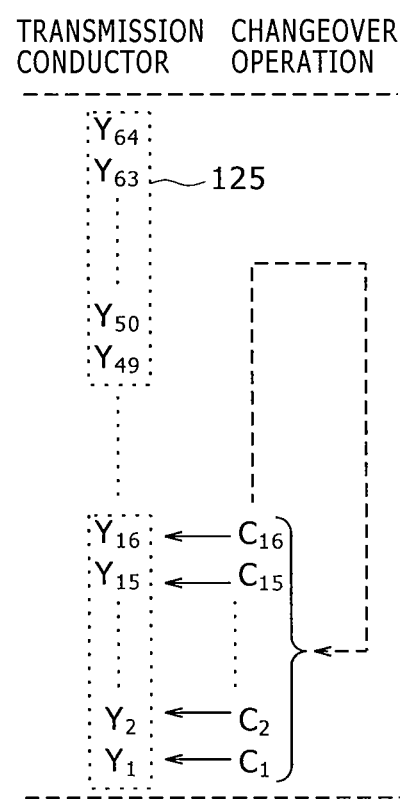
FIG. 28 is a diagrammatic view illustrating switching of transmission conductors by the transmission conductor selection circuit of FIG. 27.

The modification 2 is described with reference to FIGS. 27 and 28. First, a configuration of a transmission conductor selection circuit 202 in the modification 2 is described with reference to FIG. 27. In the present modification 2, the transmission conductor array 11 is divided into a plurality of transmission blocks 125 each including 16 transmission conductors $Y_n$ to $Y_{n+15}$ which are positioned adjacent to each other. In particular, the transmission conductor array 11 including 64 transmission conductors $Y_1$ to $Y_{64}$ is divided into four transmission blocks, which respectively include the transmission conductors $Y_1$ to $Y_{16}$, $Y_{17}$ to $Y_{32}$, $Y_{33}$ to $Y_{48}$, and $Y_{49}$ to $Y_{64}$.

The transmission conductor selection circuit 202 includes a switch 202a for supplying the spread codes $C_1$ to $C_{16}$ output from the spread code supplying circuit 21 to the individual transmission blocks 125.

The switch 202a is formed as a switch group including 16 switches, and output terminals 202b of the 16 switches are connected to corresponding transmission conductors $Y_n$ to $Y_{n+15}$ while input terminals 202c of the 16 switches are connected to the corresponding spread code production circuits 24 of the spread code supplying circuit 21 as shown in FIGS. 1 and 3. Then, the switch 202a time-dependently switches between the transmission blocks 125 to be connected to the spread code production circuits 24 such that the spread codes $C_1$ to $C_{16}$ can be supplied to all transmission conductors 12. It is to be noted that, in FIG. 27, the switch 202a is shown in a simplified form to avoid undue complexity. Further, the configuration of the other part of the transmission conductor selection circuit is the same as that of the first embodiment described hereinabove with reference to FIG. 1 and overlapping description of the same is omitted herein to avoid redundancy.

A supplying method of spread codes in the modification 2 is described with reference to FIG. 28. First, the transmission conductor selection circuit 202 selects the transmission block 125 which includes the transmission conductors $Y_1$ to $Y_{16}$ as seen in FIG. 28. Then, the spread code supplying circuit 21 supplies the spread codes $C_1$ to $C_{16}$ at the same time to the transmission conductors $Y_1$ to $Y_{16}$, respectively, which form the selected transmission block 125. In this state, supply of the spread codes $C_1$ to $C_{16}$ is carried out for a predetermined period of time. Then, the transmission conductor selection circuit 202 switches over to the transmission block 125 which includes the transmission conductors $Y_{17}$ to $Y_{32}$ to be connected to the spread code supplying circuit 21, and supplies the spread codes $C_1$ to $C_{16}$ at the same time to the transmission conductors $Y_{17}$ to $Y_{32}$, respectively. Thereafter, the transmission conductor selection circuit 202 repeats the operation of switching over to the next transmission block 125 and the operation of supplying the spread codes $C_1$ to $C_{16}$ at the same time to the newly selected transmission block. Then, after the transmission conductor selection circuit 202 selects the transmission block 125 which includes the transmission conductors $Y_{49}$ to $Y_{64}$ and completes supplying the spread codes $C_1$ to $C_{16}$ from the spread code supplying circuit 21 to the transmission conductors $Y_{49}$ to $Y_{64}$, the transmission conductor selection circuit 202 returns to the transmission block 125 which includes the transmission conductors $Y_1$ to $Y_{16}$ and repeats the switching operation and the spread code supplying operation.

[Modification 3]

In the modification 2 described above, the transmission blocks 125 are used each including 16 transmission conductors $Y_n$ to $Y_{n+15}$ that are positioned adjacent to each other, and the spread codes $C_1$ to $C_{16}$ are supplied to the selected transmission block 125 at the same time. Then, another transmission block 125 is selected such that the spread codes $C_1$ to $C_{16}$ are supplied to the newly selected transmission block 125 at the same time, and this process is repeated until all of the transmission conductors 12 which form the transmission conductor array 11 are supplied with the spread codes $C_1$ to $C_{16}$. However, the switching of the transmission conductors 12 is not limited to that which uses multiple (fixed) transmission blocks.

Figure 29:
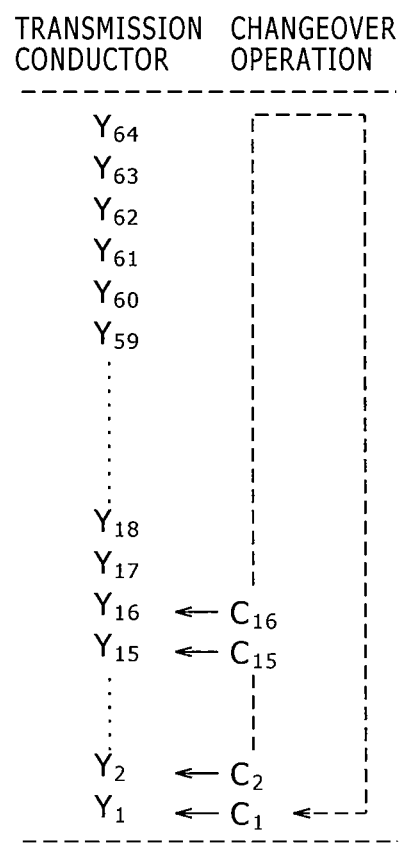
FIG. 29 is a diagrammatic view illustrating switching of transmission conductors by a transmission conductor selection circuit according to a modification 3.

The modification 3 is described with reference to FIG. 29. In the present modification 3, the transmission conductor selection circuit 202 supplies the spread codes $C_1$ to $C_{16}$ to the transmission conductors $Y_n$ to $Y_{n+15}$ which are positioned adjacent to each other from among the transmission conductors 12 which form the transmission conductor array 11. The transmission conductors $Y_n$ to $Y_{n+15}$ to be selected by the transmission conductor selection circuit 202 are shifted (or switched) time-dependently in a direction in which the index n increases. In particular, the transmission conductor selection circuit 202 first selects, for example, the transmission conductors $Y_1$ to $Y_{16}$ as seen in FIG. 29. The spread code supplying circuit 21 then supplies the spread codes $C_1$ to $C_{16}$ to the transmission conductors $Y_1$ to $Y_{16}$ at the same time, respectively.

In this state, the supply of the spread codes $C_1$ to $C_{16}$ is carried out for a predetermined period of time, and then the transmission conductor selection circuit 202 shifts (switches) the transmission conductors 12 to be selected by one conductor in the direction in which the index n of the transmission conductors 12 increases. In particular, the transmission conductor selection circuit 202 switches from the 16 transmission conductors $Y_1$ to $Y_{16}$ selected in the previous operation cycle to the newly selected 16 transmission conductors $Y_2$ to $Y_{17}$. Then, the spread code supplying circuit 21 supplies the spread codes $C_1$ to $C_{16}$ to the newly selected transmission conductors $Y_2$ to $Y_{17}$ at the same time, respectively. Thereafter the transmission conductor selection circuit 202 successively repeats the switching operation described above to carry out supply of the spread codes $C_1$ to $C_{16}$.

It is to be noted that, while, in the modifications 2 and 3, the transmission conductor selection circuit 202 changes (switches) the transmission conductors 12 to be connected to the spread code supplying circuit 21 in a direction in which the index n of the transmission conductors 12 increases after every predetermined interval of time, the present invention is not limited to this configuration. For example, the transmission conductors 12 to be connected to the transmission conductor selection circuit 202 may be switched (shifted) in the direction in which the index n thereof decreases after a predetermined interval of time. Further, the transmission conductors 12 may be selected at random in accordance with a predetermined sequence.

5. Fifth Embodiment

Selection Methods of a Reception Conductor

Although, in the first embodiment described hereinabove, the reception conductor array 13 is divided into a plurality of detection blocks 36, and the reception conductor selection circuit 22 selects one reception conductor 14 in each of the detection blocks 36 after every predetermined interval of time (see FIG. 6), the present invention is not limited to this configuration. For example, correlation calculation may be carried out collectively for one of the detection blocks 36, and after a predetermined interval of time, another detection block is selected for which correlation calculation is carried out collectively.

[Modification 4]

Figure 30:
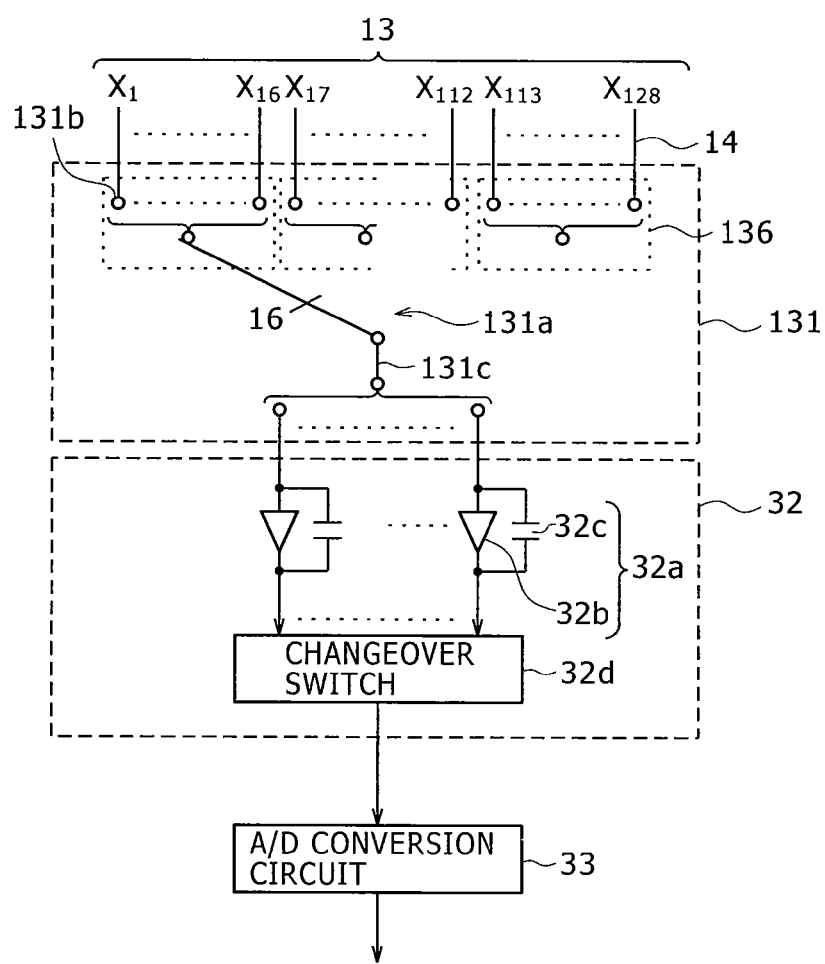
FIG. 30 is a schematic block diagram of a reception conductor selection circuit according to a modification 4.

Details of a modification 4 are described with reference to FIGS. 30 and 31. FIG. 30 shows a circuit configuration of the reception conductor selection circuit 131 and the amplification circuit 32 in the modification 4. Referring first to FIG. 30, in the modification 4, the reception conductor array 13 is divided into a plurality of detection blocks 136 each including 16 reception conductors $X_m$ to $X_{m+15}$ which are positioned adjacent to each other. More particularly, the reception conductor array 13 is divided into eight detection blocks 136 of the reception conductors $X_1$ to $X_{16}$, $X_{17}$ to $X_{32}$, $X_{33}$ to $X_{48}$, ..., $X_{113}$ to $X_{128}$.

A reception conductor selection circuit 131 includes a switch 131a which in turn includes 16 logic switches as seen in FIG. 30. Output terminals 131c of the 16 switches are connected to the I/V conversion circuits 32a which form the amplification circuit 32. Further, the input terminals 131b of the switch 131a are connected to corresponding reception conductors 14. It is to be noted that the configuration of the other part of the reception conductor selection circuit 131 and the amplification circuit 32 is same as that of the first embodiment described hereinabove with reference to FIGS. 1 and 5 and overlapping description of the same is omitted herein to avoid redundancy.

Operation of the reception conductor selection circuit 131 is described with reference to FIG. 31. The reception conductor selection circuit 131 selects a predetermined detection block 136. In particular, the reception conductor selection circuit 131 first selects, for example, the detection block 136 which includes the reception conductors $X_1$ to $X_{16}$ as seen in FIG. 31. Then, the correlation value calculation circuit 34 carries out correlation calculation for output signals output from all of the reception conductors $X_1$ to $X_{16}$ which form the selected detection block 136, and stores a correlation value which is a result of the correlation calculation in the correlation value storage circuit 34d described hereinabove with reference to FIG. 8.

Then, after a predetermined interval of time, the reception conductor selection circuit 131 switches from the currently selected detection block 136 to another detection block 136 which includes the reception conductors $X_{17}$ to $X_{32}$. Then, the correlation value calculation circuit 34 carries out correlation calculation for the output signals output from all of the reception conductors $X_{17}$ to $X_{32}$ which form the newly selected detection block 136, and stores a resulting correlation value in the correlation value storage circuit 34d. Thereafter, the switching operation described above is repeated after every predetermined interval of time. Then, after the correlation calculation for the output signals from the detection block 136 which includes the reception conductors $X_{113}$ to $X_{128}$ and the storage of a resulting correlation value are completed, the reception conductor selection circuit 131 returns to the initially selected detection block 136 which includes the reception conductors $X_1$ to $X_{16}$. Thereafter, similar switching and correlation calculation are carried out.

6. Sixth Embodiment

Different Examples of a Configuration of a Sensor Section

In the first embodiment described hereinabove, the sensor section 100 is configured such that the reception conductors 14 and the transmission conductors 12 are provided in an opposing relationship to each other with the spacer 16 interposed therebetween on one of the surfaces of the first substrate 15 as seen in FIG. 2. However, the present invention is not limited to this configuration. For example, the reception conductors 14 and the transmission conductors 12 may individually be formed on the opposite surfaces of a single glass substrate. In the following, a different example of a configuration of the sensor section is described with reference to FIG. 32.

[Modification 5]

Figure 32:
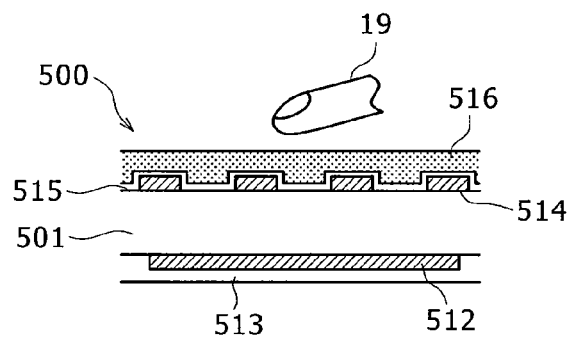
FIG. 32 is a cross sectional view of a sensor section according to a modification 5.

FIG. 32 schematically shows a cross section of a sensor section 500 according to the modification 5. Referring to FIG. 32, the sensor section 500 includes a substrate 501 formed, for example, substantially as a flat plate and made of, for example, glass. A plurality of reception conductors 514 are formed on one of the surfaces of the substrate 501, that is, on the surface of the substrate 501 to be pointed to by a pointer 19 such as a finger. A plurality of transmission conductors 512 are formed on the other surface of the substrate 501, that is, on the lower side surface of the substrate 501 in FIG. 32.

The transmission conductors 512 are covered at the surface thereof with a first protective layer 513 formed so as to cover the overall area of the one surface of the substrate 501. Similarly, the reception conductors 514 are covered with a second protective layer 515 formed so as to cover the overall area of the other surface of the substrate 501. The second protective layer 515 is further covered with a protective sheet 516 substantially in the form of a flat plate. The protective sheet 516 protects the reception conductors 514 so that the pointer 19 may not directly touch the reception conductors 514.

It is to be noted that, in the present modification 5, the substrate 501, transmission conductors 512, and reception conductors 514 can be made of materials similar to those used in the first embodiment described hereinabove. In particular, in the present modification 5, a known glass substrate or a sheet-like or film-like substrate formed from a synthetic resin may be used for the substrate 501 similarly as in the first embodiment. The first protective layer 513 and the second protective layer 515 may be formed, for example, from a $SiO_2$ film or a synthetic resin film, and the protective sheet 516, for example, may be formed of a sheet material formed of a synthetic resin. Further, while, in the present modification 5, the first protective layer 513, second protective layer 515 and protective sheet 516 are formed so as to cover the overall area of the opposite surfaces of the substrate 501, the present invention is not limited to this configuration. For example, since the intended function of the protective sheet 516 is achieved if the protective sheet 516 is formed such that the pointer 19 does not touch directly with the reception conductors 514, the second protective layer 515 may be formed in a shape that is substantially the same as that of the reception conductors 514.

Since the sensor section 500 according to the present modification 5 makes it possible to decrease the number of substrates in comparison with the sensor section 100 of the first embodiment described hereinabove with reference to FIG. 2, the thickness of the sensor section 500 can be further reduced. Further, since the sensor section 500 of the modification 5 reduces the number of required substrates, it can be provided at a reduced cost.

[Modification 6]

Figure 33A:
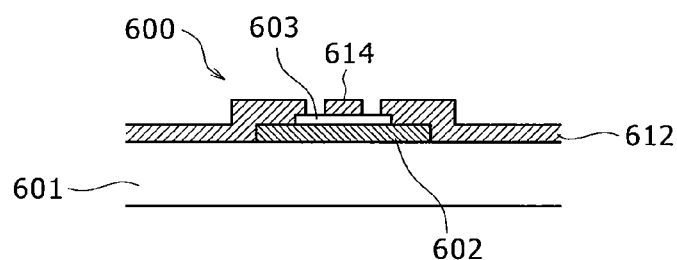
FIGS. 33A and 33B are a cross sectional view and a perspective view, respectively, of a sensor section according to a modification 6.
Figure 33B:
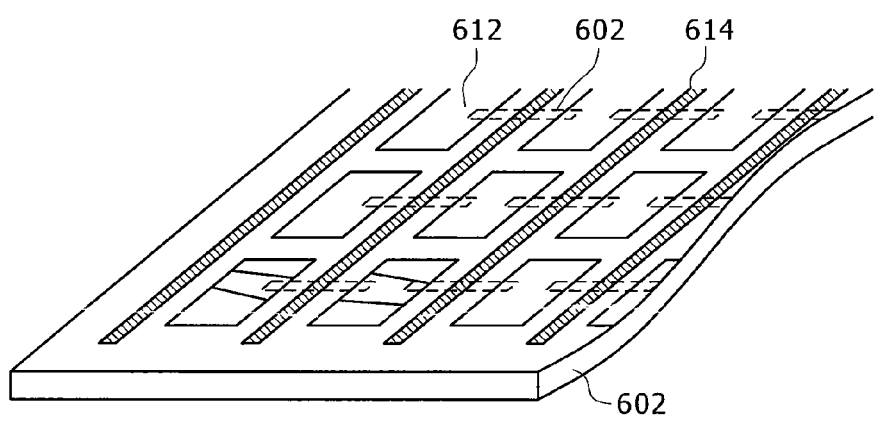

Another modification to the sensor section is described with reference to FIGS. 33A and 33B. In the present modification 6, the sensor section is configured such that the transmission conductors and the reception conductors are formed, for example, on one of the opposite surfaces of a substrate. FIG. 33A shows a cross section of the sensor section of the modification 6 and FIG. 33B shows a perspective view of the sensor section of the modification 6. It is to be noted that, in FIGS. 33A and 33B, a protective layer and a protective sheet are not shown for simplified illustration.

Referring first to FIG. 33A, the sensor section 600 of the present modification 6 includes a substrate 601, a metal layer 602 formed in a predetermined pattern on one of the opposite surfaces of the substrate 601 and having conductivity, an insulating layer 603 formed on the metal layer 602, and a plurality of transmission conductors 612 and a plurality of reception conductors 614. In the modification 6, the sensor section 600 is structured such that the transmission conductors 612 and the reception conductors 614 cross each other on one of the surfaces of the substrate 601, and the insulating layer 603 is interposed between the transmission conductors 612 and the reception conductors 614 at locations at which the transmission conductors 612 and the reception conductors 614 cross each other, to electrically isolate the transmission conductors 612 from the reception conductors 614.

Referring now to FIG. 33B, the metal layer 602 is a substantially linear (or elongated) metal member formed, for example, so as to extend in a direction perpendicular to the direction in which the reception conductors 614 extend. The insulating layer 603 is formed so as to cover part of the metal layer 602. A pair of transmission conductors 612 are provided at the opposite ends of the metal layer 602 in the extending direction of the metal layer 602 such that they are electrically connected to each other by the metal layer 602. The reception conductors 614 are formed on the insulating layer 603 and are electrically isolated from the metal layer 602 and the transmission conductors 612. It is to be noted that the disposition of the transmission conductors 612 and the reception conductors 614 may be reversed. Further, while, in the present modification 6, the transmission conductors 612, reception conductors 614 and so forth are disposed on one of the opposite surfaces of the substrate 601 to be approached by the pointer 19 for position pointing, the transmission conductors 612, reception conductors 614 and so forth may otherwise be disposed on the opposite surface of the substrate 601.

In the present modification 6, the substrate 601, transmission conductors 612 and reception conductors 614 can be formed from materials similar to those used in the first embodiment described hereinabove. In particular, the substrate 601 may be formed from a known transparent glass substrate similarly as in the first embodiment or from a sheet-formed or film-formed substrate made of a synthetic resin.

The metal layer 602 may be formed from a metal material having a high electric conductivity such as, for example, Mo (molybdenum). Since the contact area between the metal layer 602 and the transmission conductors 612 is small, in order to minimize the electric resistance of the metal layer 602 and the transmission conductors 612, preferably a metal material having a high electric conductivity is used for the metal layer 602. The insulating layer 603 can be formed using, for example, a resist or the like.

In the sensor section 600 of the present modification 6, since the number of glass substrates can be reduced in comparison with the sensor section 100 of the first embodiment described hereinabove with reference to FIG. 2, the thickness of the sensor section 600 can be further reduced. Further, since the sensor section 600 of the present modification 6 reduces the number of substrates, the transmission conductors 612 and the reception conductors 614 can be formed substantially in one layer, and therefore, the sensor section 600 can be provided at a further reduced cost.

Where the sensor section 600 of the present modification 6 is configured such that the transmission conductors 612, reception conductors 614 and so forth are disposed on the other surface of the substrate 601 opposite to the surface to be approached by the pointer 19 for position pointing, the substrate 601 is interposed between the pointer and these transmission and reception conductors. Therefore, the distance between the pointer and the conductors becomes greater than that in the sensor section 500 of the modification 5, to thereby reduce the influence of noise from the pointer.

[Modification 7]

While, in the first to third embodiments and the modifications 1 to 6 described hereinabove, the transmission conductors are formed from liner conductors extending in a predetermined direction, in the modification 7, the transmission conductors have a different form.

Figure 34A:
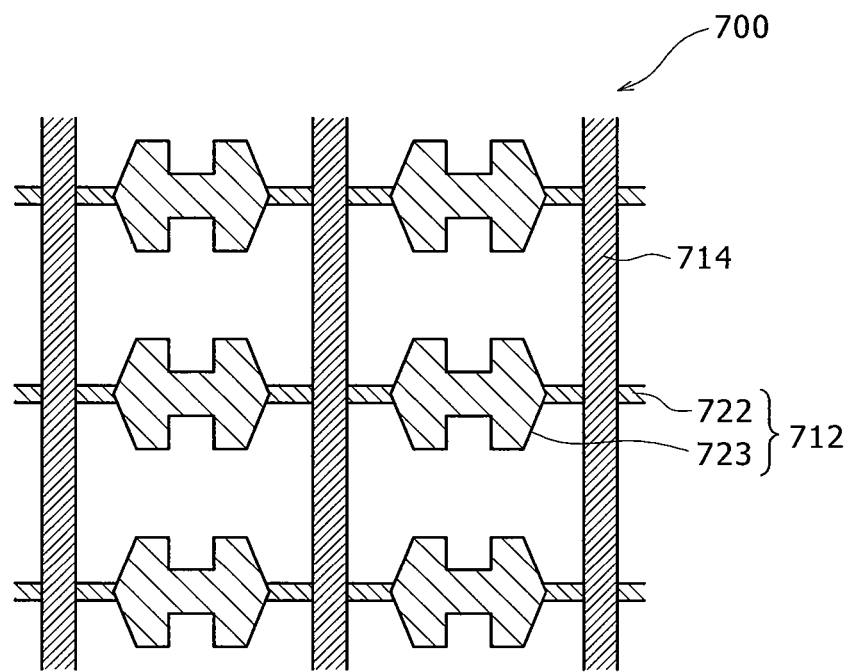
FIG. 34A is a schematic view showing a general configuration of a sensor section according to a modification 7.

The modification 7 is described with reference to FIGS. 34A and 34B. FIG. 34A schematically shows a configuration of the transmission conductors and the reception conductors in the sensor section of the present modification 7, and FIG. 34B shows a land conductor portion of the transmission conductors.

Referring first to FIG. 34A, in the present modification 7, the reception conductors 714 are formed from a linear conductor of a fixed width. Meanwhile, the transmission conductors 712 are formed from a linear conductor portion 722 formed so as to extend in a direction perpendicular to the direction in which the reception conductors 714 extend and land conductor portions 723 having a width greater than that of the linear conductor portion 722 and being electrically connected to the linear conductor portion 722. The reception conductors 714 and the linear conductor portions 722 are electrically isolated from each other at least at cross points therebetween by an insulating layer (not shown) interposed therebetween.

Figure 34B:
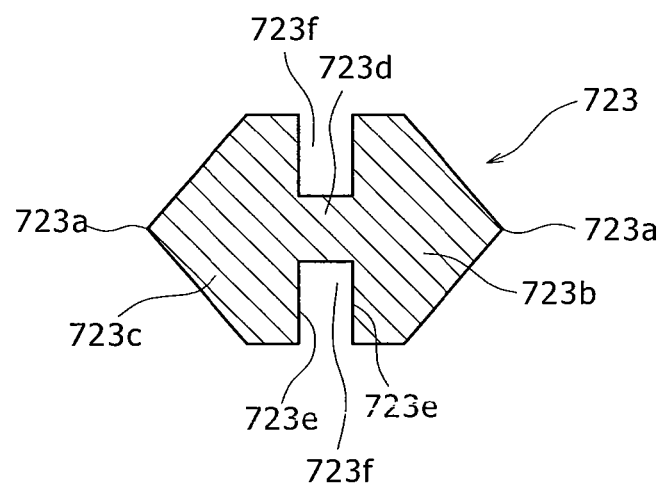
FIG. 34B is an enlarged view of a land conductor portion shown in FIG. 34A.

Referring to FIG. 34B, each land conductor portion 723 includes first and second land portions 723b and 723c formed in a substantially same shape and a substantially linear connecting portion 723d for electrically connecting the first and second land portions 723b and 723c to each other. The first and second land portions 723b and 723c are formed in a substantially triangular shape having an apex 723a, at which the land conductor portion 723 is connected to the linear conductor portion 722. The first land portion 723b and the second land portion 723c are electrically connected to each other at bottom portions 723e thereof opposite to the apex 723a by the connecting portion 723d.

It is to be noted that, while, in FIGS. 34A and 34B, the extension direction of the reception conductors 714 and the extension direction of the transmission conductors 712 are orthogonal to each other, the present invention is not limited to this configuration. The extension directions of both conductors need not be perpendicular to each other, and it is only necessary for the extension direction of the transmission conductors 712 and the extension direction of the reception conductors 714 to cross each other so as to form cross points therebetween for position detection purposes.

Where the land conductor portion 723 is configured in such a manner as described above, a pair of recessed portions 723f are formed on the land conductor portion 723 so as to extend along the extension direction of the reception conductors 714.

Where the transmission conductors 712 are formed in such a shape as described above, the area of the transmission conductors 712 near (i.e., in the proximity of) a cross point can be increased. As a result, when a pointer approaches the sensor section 700, an increased amount of electric field emerging from the transmission conductors 712 converges to the pointer, and consequently, the detection sensitivity can be improved.

Further, if a pointer detection apparatus to which the present invention is applied and another pointer detection apparatus which adopts the electromagnetic resonance (EMR) system are both placed, one on the other, to form an inputting apparatus having a common pointer detection region for both of the two pointer detection apparatus, then eddy current may be generated in the land conductor portion 723 by an electric field generated from the position detection apparatus of the electromagnetic resistance type. This may cause the so-called eddy current loss, which may negatively impact the position detection by the electromagnetic resonance system. To solve this problem, in the pointer detection apparatus to which the present invention is applied, the recessed portions 723f are formed on the land conductor portion 723 positioned in the proximity of a cross point as in the present modification 7. Where another pointer detection apparatus which adopts the electromagnetic resonance system is additionally provided, one on the other, generation of eddy current can be suppressed by the land conductor portion 723 having the recessed portions 723f. Consequently, the problem as described above can be reduced.

It is to be noted that the application of the configuration of the present modification 7 is not limited to the sensor section of a pointer detection apparatus of the cross point electrostatic coupling type. The configuration of the modification 7 may be applied also to the sensor section of a pointer detection apparatus of the projected capacitive type electrostatic coupling type, which includes a conductor pattern similar to that of the cross point electrostatic coupling type. In particular, the configuration of the modification 7 can be applied also to the sensor section of a pointer detection apparatus of the projected capacitive type electrostatic coupling system or the like, which includes a conductor pattern formed from a plurality of first conductors disposed in a first direction and a plurality of second conductors disposed in a direction crossing the first direction and wherein, based on detection signals obtained from the conductors disposed in these different directions, those conductors which correspond to a pointed position are specified and the position pointed to by the pointer is determined from the position at which the specified conductors cross each other.

The configuration of the transmission conductors 712 and the reception conductors 714 in the present modification 7 can be applied also to the sensor sections described hereinabove in connection with the first embodiment in FIG. 2, the modification 5 in FIG. 32, and the modification 6 in FIGS. 33A and 33B. Further, where the pointer detection apparatus and a display apparatus such as a liquid crystal panel are formed as a unitary member, in order to suppress the influence of a signal arising from pixel scanning of the liquid crystal panel, the reception conductors 714 are preferably disposed to extend in a direction that crosses the pixel scanning direction of the liquid crystal panel.

[Modification 8]

Figure 35:
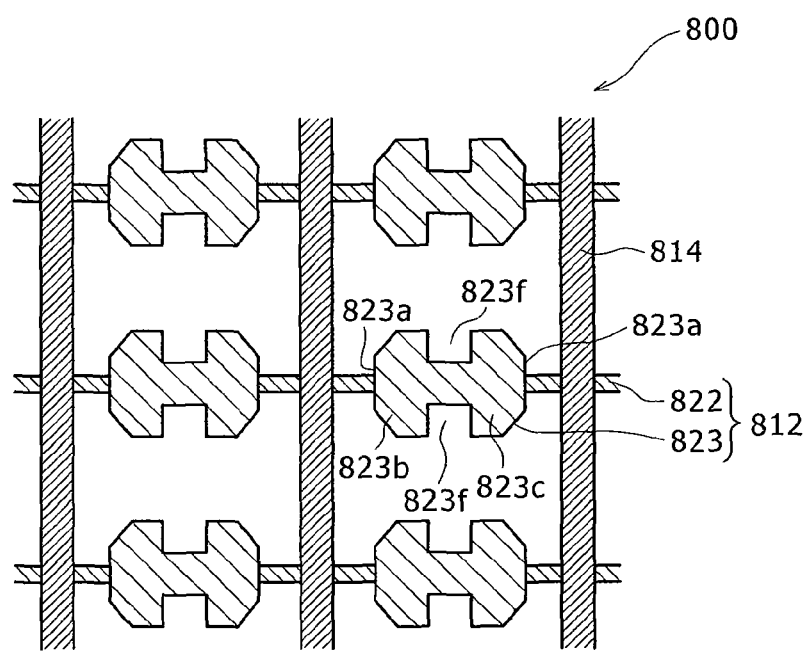
FIG. 35 is a schematic view showing a general configuration of a sensor section according to a modification 8.

The shape of the land conductor portion of the transmission conductors is not limited to the example described hereinabove with reference to FIGS. 34A and 34B. FIG. 35 shows another example of a configuration of the shape of the land conductor portion as a modification 8. Referring to FIG. 35, a transmission conductor 812 of the sensor section 800 according to the modification 8 includes a linear conductor portion 822 and a land conductor portion 823 similarly as in the modification 7. The modification 8 is different from the modification 7 in that, while the land conductor portion 723 in the modification 7 has the first and second land portions 723b and 723c of a substantially triangular shape, in the present modification 8, the land conductor portion 823 has first and second land portions 823b and 823c having a substantially trapezoidal shape. In the present modification 8, the transmission conductor 812 is electrically connected at smaller parallel sides 823a thereof, which correspond to the apexes 723a of the first and second land portions 723b and 723c in the modification 7, to the linear conductor portion 822. The remaining part of the sensor section 800 is similar to that of the sensor section 700 described above with reference to FIGS. 34A and 34B, and overlapping description of the common configuration is omitted herein to avoid redundancy. It is to be noted, however, that corresponding elements in FIGS. 34A and 34B and 35 are denoted by reference numbers having different first digits. Particularly, the first digit of the numbers used in the modification 7 of FIGS. 34A and 34B is "7" while the first digit of the numbers used in the modification 8 of FIG. 35 is "8."

Comparing the present modification 8 with the modification 7, it is noted that the land conductor portion 823 of the transmission conductor 812 in the modification 8 is shaped such that it has no apex portion 723a, that is, no acute angle portion. Consequently, the flow path of electric current is wider through the land conductor portion 832 than through the linear conductor portion 822.

As a result, concentration of current at the connecting portion between the land conductor portion 823 and the linear conductor portion 822 is less likely to occur, and the current readily disperses. In particular, since current flows in a spread fashion between the smaller parallel sides 823a, which define the opposite ends of the land conductor portion 823, the resistance value between the smaller parallel sides 823a does not increase. Since such a structure as just described is provided, with the present modification 8, a wide flow path for current can be assured between the land conductor portion 823 and the linear conductor portion 822 in comparison with the modification 7. As a result, the electric conduction characteristic can be further improved in comparison with that of the modification 7. It is to be noted that the shape of the smaller parallel side 823a preferably has no acute angle portion and the smaller parallel side 823a may have, for example, a curved shape different from the shape described above. Further, while the transmission conductor 812 of the sensor section 800 in the present modification 8 is configured such that the two recesses 823f are formed in the land conductor portions 823, the number of such recesses is not limited to two and, for example, only one or three or more recesses may be formed.

It is to be noted that the application of the configuration of the present modification 8 is not limited to the sensor section of a pointer detection apparatus of the cross point electrostatic coupling type. The configuration of the modification 8 may be applied also to the sensor section of a pointer detection apparatus of the projected capacitive type electrostatic coupling system. Further, while, in the present modification 8, only the transmission conductor is formed from a linear conductor portion and a land conductor portion having a recessed portion provided at a central portion of the conductor portion, likewise the reception conductor may have a configuration similar to that of the transmission conductor.

Further, the configuration of the transmission conductors 812 and the reception conductors 814 in the present modification 8 can be applied also to the sensor sections described hereinabove in connection with the first embodiment in FIG. 2, the modification 5 in FIG. 32, and the modification 6 in FIG. 33. Further, where the pointer detection apparatus and a display apparatus such as a liquid crystal panel are formed as a unitary member, in order to suppress an influence of a signal arising from pixel scanning of the liquid crystal panel, the reception conductors 814 are preferably disposed to extend in a direction that crosses the pixel scanning direction of the liquid crystal panel.

[Modification 9]

In a pointer detection apparatus which adopts the cross point electrostatic coupling system, when the surface thereof on which a pointer is to be operated, that is, the sensor section thereof, is viewed from above, it has a region in which a conductor pattern consisting of a plurality of reception conductors and a plurality of transmission conductors exists and another region in which no such conductor pattern exists. Although each conductor is formed from a transparent electrode film such as an ITO film, the transmission factor of the region in which a conductor pattern exists is lower than that of the region in which no conductor pattern exists. As a result, non-uniformity in transmission factor appears on the sensor section. Such non-uniformity in transmission factor sometimes irritates a user of the pointer detection apparatus. Therefore, a modification 9 is configured so as to eliminate such non-uniformity in transmission factor on the sensor section.

Figure 36:
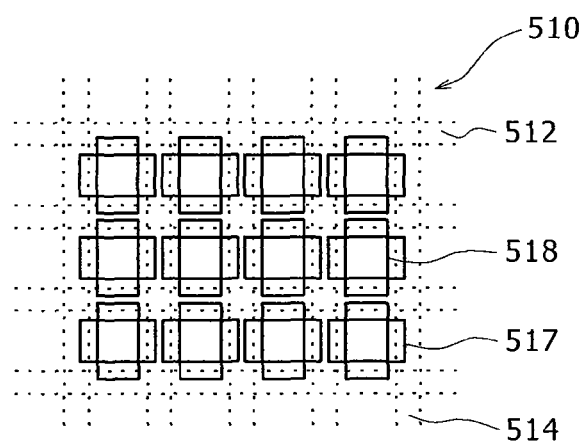
FIG. 36 is a schematic view showing a general configuration of a sensor section according to a modification 9.

FIG. 36 shows a general configuration of the sensor section of the modification 9. It is to be noted that the configuration of the present modification 9 is applied to the sensor section 500 of the modification 5 described hereinabove with reference to FIG. 32. Referring to FIG. 36, in the sensor section 510 of the modification 9, in a region in which none of transmission conductors 512 and reception conductors 514 exists, first transparent electrode films 517 and second transparent electrode films 518 made of, for example, the same material as that of the conductors are provided. The other part of the sensor section 510 has the same configuration as that of the sensor section 500 of the modification 5 described hereinabove with reference to FIG. 32, and overlapping description of the same is omitted herein to avoid redundancy.

Figure 37A:
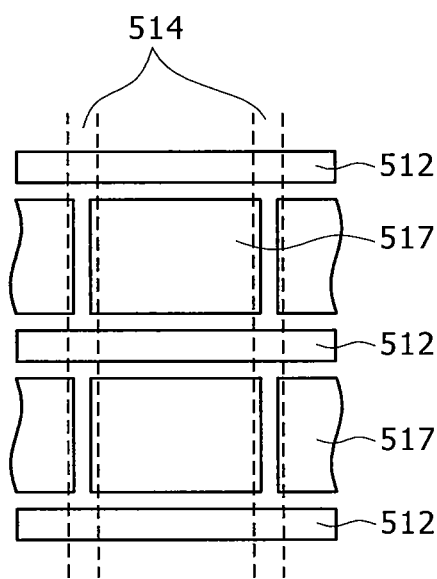
FIG. 37A is a schematic view showing a shape of transmission conductors in the sensor section of FIG. 36.

FIG. 37A shows a configuration of a transmission conductor 512 and a first transparent electrode film 517 formed on one surface, that is, on the lower surface, of a substrate of the sensor section 510. In the present modification 9, the first transparent electrode film 517 of a rectangular shape is disposed on the surface of the substrate on which the transmission conductor 512 is provided. Each of the first transparent electrode film 517 is provided between two transmission conductors 512 disposed adjacent to each other. The first transparent electrode film 517 has a dimension a little smaller than the dimension of the distance between the transmission conductors 512 and is spaced from each transmission conductor 512 with a small gap therebetween so that it does not contact any of the transmission conductors 512. The dimension of the first transparent electrode film 517 in the lengthwise dimension of the transmission conductors 512 is a little smaller than the dimension of the sum of the distance between the reception conductors 514 disposed adjacent to each other and the conductor width of one reception conductor 514. The first transparent electrode film 517 is disposed between the two reception conductors 514 positioned adjacent to each other, such that lateral edges of the first transparent electrode film 517 respectively extend to cover approximately ½ the conductor width of the reception conductors 514, as illustrated in FIG. 37A.

Figure 37B:
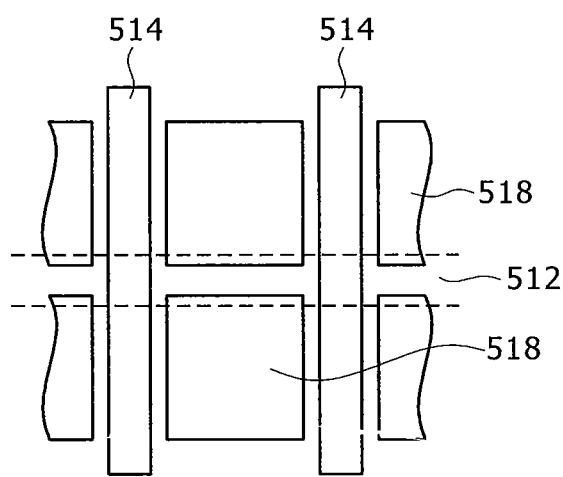
FIG. 37B is an enlarged a schematic view showing arrangement of a transparent electrode film of reception conductors in the sensor section.

FIG. 37B shows a configuration of a reception conductor 514 and a second transparent electrode film 518 formed on the other surface, that is, on the upper surface, of the substrate of the sensor section 510. In the present modification 9, the second transparent electrode film 518 is disposed on the surface of the substrate on which the reception conductor 514 is disposed. Regarding the dimension of the second transparent electrode film 518, an approach similar to that used with the dimension of the first transparent electrode film 517 is applied. In particular, the second transparent electrode film 518 has a dimension a little smaller than the distance between the reception conductors 514 so that it does not contact the reception conductors 514, and is spaced apart from each of the reception conductors 514 with some gap left therebetween. Regarding the dimension of the second transparent electrode film 518 in the lengthwise dimension of the reception conductor 514, it is set such that the second transparent electrode film 518 partly covers the width of any adjacent transmission conductor 512. Regarding the dimension and disposition of the first transparent electrode film 517 and the second transparent electrode film 518, they should be disposed such that, when the sensor section 510 is viewed, for example, from the surface side of the sensor section 510 on which a pointer is to be operated, that is, from the upper surface side, the overlapping relationship of the transmission conductor 512, reception conductor 514, first transparent electrode film 517, and second transparent electrode film 518 is made as uniform as possible while the electric isolation from each other is maintained, so that non-uniformity of the transmission factor can be suppressed across the overall sensor section 510 and a uniform optical characteristic can be maintained.

If the conductors and the transparent electrode films formed on the surfaces of the glass substrate of the sensor section 510 are disposed as seen in FIGS. 37A and 37B, then when the sensor section 510 is viewed from above, the first transparent electrode films 517 and the second transparent electrode films 518 made of the same material as that of the conductors are formed in a region in which no conductor pattern exists as seen in FIG. 36. As a result, non-uniformity of the transmission factor on the sensor section 510 is suppressed.

It is to be noted that the shape of the first transparent electrode film 517 and the second transparent electrode film 518 for suppressing the non-uniformity of the transmission factor is not limited to a rectangular shape. It is only necessary that the overlapping relationship between the conductor pattern formed from the transmission conductors 512 and the reception conductors 514 and the first transparent electrode films 517 and second transparent electrode films 518, when the sensor section 510 is viewed from above, be optically uniform. As such, the shape of the first transparent electrode films 517 and the second transparent electrode films 518 may be suitably set in relation to the shape of the conductor pattern formed from the transmission conductors 512 and the reception conductors 514. For example, while, in the present modification 9, a plurality of transparent electrode films of a rectangular shape are disposed in a spaced-apart relationship from each other and extend along a direction in which the transmission conductors 512 or the reception conductors 514 extend, the plural transparent electrode films may be alternatively formed as a single electrode film.

The configuration of the present modification 9 can be applied also to the sensor sections described hereinabove in connection with the first embodiment in FIG. 2 and the modifications 6 to 8 in FIGS. 33A to 35. Furthermore, a substrate having a predetermined region in which, for example, a transparent electrode film for prevention of the non-uniformity in transmission factor is formed may be prepared separately and additionally provided on the sensor section. Further, a substrate in the form of a film may be used as described hereinabove.

[Modification 10]

While, in the first to third embodiments, both of the transmission conductors and the reception conductors are formed linearly, the present invention is not limited to this configuration. For example, at least the transmission conductors or the reception conductors may be formed in a curved form or in a concentric relationship.

Figure 38:
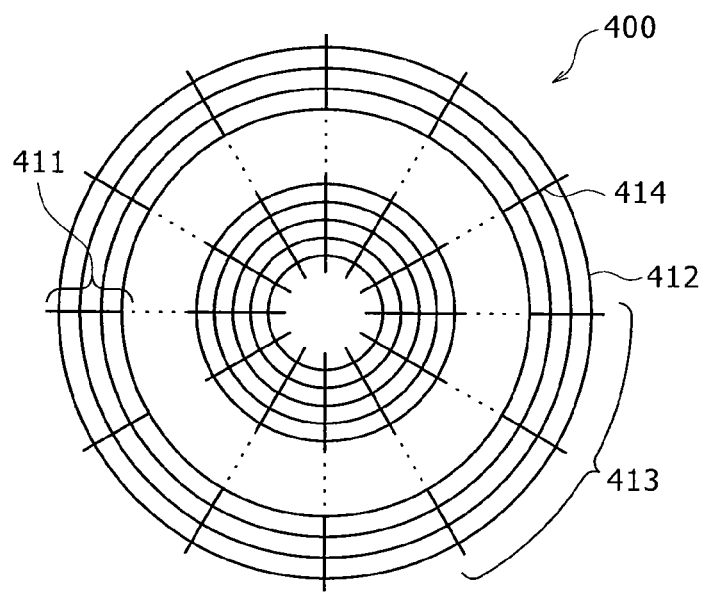
FIG. 38 is a schematic view showing a general configuration of a sensor section wherein reception conductors are formed concentrically according to a modification 10.

In the following, a configuration wherein a plurality of transmission conductors are formed in circular shapes having different diameters from each other and disposed in a concentric relationship with each other is described with reference to FIG. 38. FIG. 38 shows an arrangement pattern of a transmission conductor array 411 and a reception conductor array 413 of a sensor section 400 according to a modification 10. In the present modification 10, the transmission conductor array 411 includes a plurality of transmission conductors 412 respectively having different diameters from each other and disposed in a concentric relationship from each other. The concentrically disposed transmission conductors 412 are disposed such that the distances between adjacent ones of the transmission conductors 412 in a radius direction are equal to each other.

The reception conductor array 413 includes, for example, a plurality of linear reception conductors 414 formed so as to extend radially from the center of the transmission conductor array 411. The reception conductors 414 are disposed in an equidistantly spaced relationship from each other in a circumferential direction of the concentric circles formed by the transmission conductor array 411. With such configuration described above, the circumferential directions of the transmission conductors 412 and the extension directions of the reception conductors 414 cross each other to form a plurality of cross points.

The sensor section 400 of the modification 10 shown in FIG. 38 is suitable where the position detection region of the sensor section 400 has a circular shape. It is to be noted that, while, in the modification 10, the plural transmission conductors 412 which form the transmission conductor array 411 are disposed in an equidistantly spaced relationship from each other in a radial direction, the present invention is not limited to this configuration and the distances between the transmission conductors 412 may be suitably set to desired distances. Similarly, while, in the present modification 10 described above, the plural reception conductors 414 which form the reception conductor array 413 are disposed in an equidistantly spaced relationship from each other in a circumferential direction of the transmission conductors 412, the distances between the reception conductors 414 may be suitably set to desired distances.

Further, while, in the modification 10 described above, the transmission conductors 412 are formed substantially circularly and the reception conductors 414 are formed substantially linearly, the present invention is not limited to this configuration. For example, at least the transmission conductors 412 or the reception conductors 414 may be formed in a meandering (serpentine) shape with respect to the extension direction thereof.

7. Seventh Embodiment

Different Examples of a Configuration of an Amplification Circuit

While, in the first to third embodiments described hereinabove, a one-input one-output amplifier is used for the amplifier used in the amplification circuit 32 described hereinabove with reference to FIG. 1, the present invention is not limited to this configuration. For example, a differential amplifier may be used for the amplifier. Specifically, a 2-input 1-output differential amplifier or a 4-input 1-output differential amplifier may be used according to modifications 11 to 18, as will be described with reference to FIGS. 39 to 55. In some of the following examples where a differential amplification circuit is used, the reception conductor array 13 includes 129 reception conductors 14. It is to be noted that the configuration of the other part of the amplification circuit is the same as that of the first embodiment described hereinabove with reference to FIG. 1 and overlapping description of the same is omitted herein to avoid redundancy.

[Modification 11]

Figure 39:
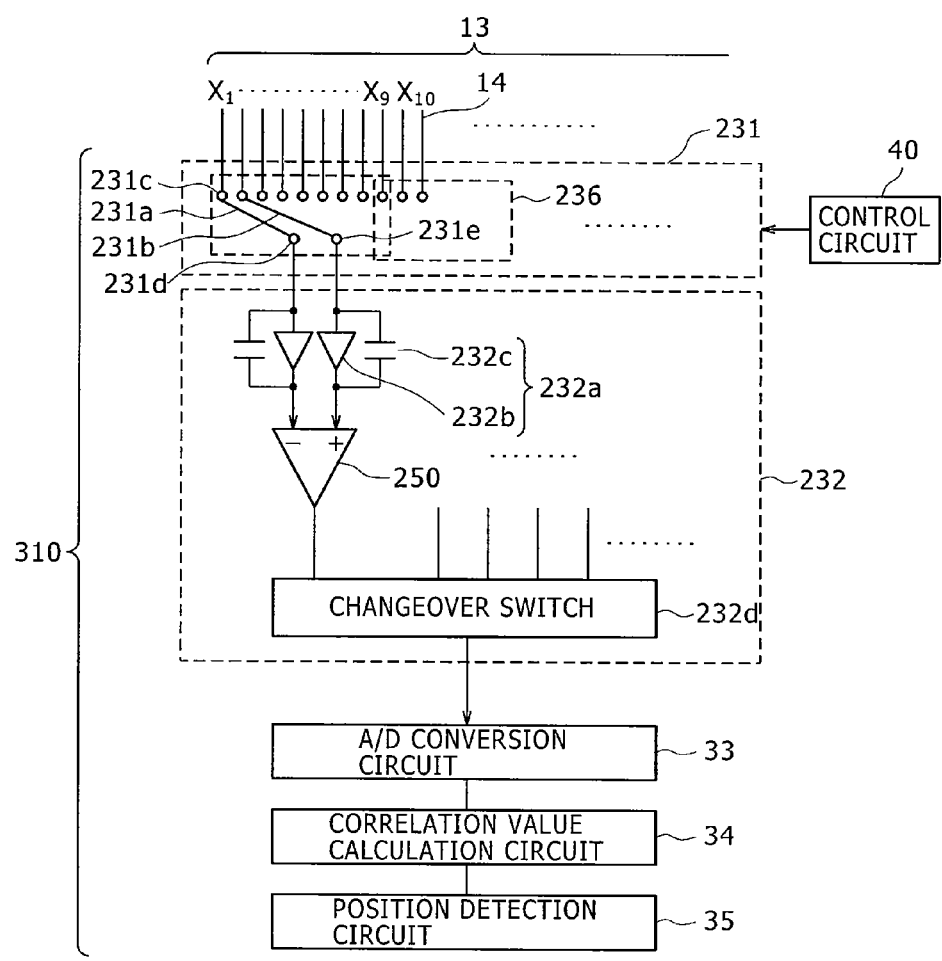
FIG. 39 is a block diagram showing a general configuration of a reception section according to a modification 11.

The configuration of the modification 11 is described with reference to FIG. 39. FIG. 39 shows a general configuration of the reception section 310 where a 2-input 1-output differential amplifier 250 is used for the amplification circuit.

The reception conductor array 13 is divided into 16 detection blocks 236. Each of the detection blocks 236 is composed of nine reception conductors $X_m$ to $X_{m+8}$ which are positioned adjacent to each other, that is, whose indexes m are consecutive. From among the nine reception conductors $X_m$ to $X_{m+8}$ which form each of the detection blocks 236, the reception conductor $X_{m+8}$ which has the highest index m is used commonly by another detection block 236 which is positioned adjacent to the detection block 236. In particular, in the present modification 11, the reception conductor array 13 is divided into detection blocks $\{X_1$ to $X_9\}$, $\{X_9$ to $X_{17}\}$, ..., $\{X_{113}$ to $X_{121}\}$ and $\{X_{121}$ to $X_{129}\}$.

The reception conductor selection circuit 231 includes a number of pairs of switches 231a and 231b equal to the number of detection blocks 236. One pair of switches 231a and 231b include nine input terminals 231c which are common to both of the switches 231a and 231b. The input terminals 231c are connected to corresponding reception conductors $X_m$. Output terminals 231d and 231e of the paired switches 231a and 231b are connected to input terminals of different I/V conversion circuits 232a hereinafter described. The paired switches 231a and 231b successively switch the reception conductors 14 to be connected to the I/V conversion circuits 232a at predetermined intervals of time. In particular, if it is assumed that the switch 231a is first connected to the reception conductor $X_1$ and the switch 231b is connected to the reception conductor $X_2$ as seen in FIG. 39, then the switch 231a and the switch 231b are switched such that the switch 231a is connected to the reception conductor $X_2$ and the switch 231b is connected to the reception conductor $X_3$ after the predetermined interval of time. Thereafter, the reception conductor $X_m$ to be connected to the I/V conversion circuit 232a is successively switched at the predetermined intervals of time. Then, after the switch 231a is connected to the reception conductor $X_8$ and the switch 231b is connected to the reception conductor $X_9$, the switch 231a and the switch 231b are switched such that the switch 231a is again connected to the reception conductor $X_1$ and the switch 231b is again connected to the reception conductor $X_2$.

The reception section 310 includes the reception conductor selection circuit 231, an amplification circuit 232, an A/D conversion circuit 33, a correlation value calculation circuit 34 and a position detection circuit 35, as seen in FIG. 39.

The amplification circuit 232 includes a plurality of I/V conversion circuits 232a, a plurality of differential amplifiers 250, and a changeover switch 232d. The number of I/V conversion circuits 232a is equal to the total number of the switches 231a and 231b, that is, 32 (2×16), and the input terminals 231c of the paired switches 231a and 231b are connected to corresponding reception conductors 14, while the output terminals 231d and 231e of the paired switches 231a and 231b are respectively connected to the corresponding I/V conversion circuits 232a. The I/V conversion circuit 232a connected to the switch 231a from between the paired switches 231a and 231b is connected to the negated input terminal, which has the negative polarity (−), of the corresponding differential amplifier 250 while the output terminal of the other I/V conversion circuit 232a connected to the switch 231b is connected to the non-negated input terminal, which has the positive polarity (+), of the differential amplifier 250.

Each differential amplifier 250 is a 2-input 1-output differential amplifier. The differential amplifier 250 differentially amplifies output signals from the I/V conversion circuits 232a connected to the two input terminals thereof and outputs a resulting amplified signal. The output signal output from the differential amplifier 250 is amplified to a signal level by an amplifier not shown and then received by the A/D conversion circuit 33 through the changeover switch 232d.

Since the modification 11 is configured in such a manner as described above, noise superposed in output signals from the reception conductors 14 is removed by the differential amplification by the differential amplifiers 250 of the amplification circuit 232. Consequently, the noise resisting property of the pointer detection apparatus can be improved.

[Modification 12]

While, in the modification 11 described above, a single reception conductor 14 is connected to each input terminal of the differential amplifiers 250 through an I/V conversion circuit 232a, the number of reception conductors 14 to be connected to each of the input terminals of a differential amplifier may be a plural number. An example of the form just described is shown in FIG. 40.

Figure 40:
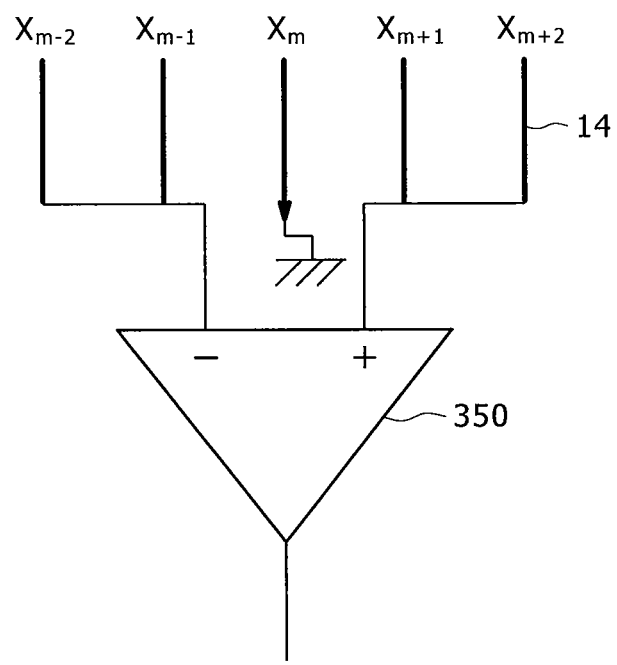
FIG. 40 is a diagrammatic view of an amplification section wherein a differential amplifier is used according to a modification 12.

FIG. 40 shows a general configuration of the amplification circuit of the present modification 12. While the reception conductor selection circuit 231 in the modification 11 is formed from a plurality of pairs of switches 231a and 231b for selecting two reception conductors 14 as seen in FIG. 39, in the present modification 12, though not particularly shown in FIG. 40, five switches are provided in place of the paired switches 231a and 231b such that five reception conductors $X_{m-2}$ to $X_{m+2}$ which are positioned adjacent to each other are connected to input terminals of a differential amplifier 350 through the five switches.

The reception conductor selection circuit 231 shown in FIG. 39 connects, for example, four reception conductors $X_{m-2}$, $X_{m-1}$ and $X_{m+1}$, $X_{m+2}$ of five arbitrary reception conductors $X_{m-2}$ to $X_{m+2}$ which are positioned on the opposite sides to the input terminals of the differential amplifier 350. It is to be noted that, also in the present modification 12, output signals of the reception conductors $X_{m-2}$ to $X_{m+2}$ selected by the reception conductor selection circuit 231 are first converted into voltage signals by the I/V conversion circuit 232a and supplied to the input terminals of the differential amplifier 350. However, since the configuration of the modification 12 in this regard is the same as that of the modification 11 described hereinabove with reference to FIG. 39, for ease of illustration, the reception conductor selection circuit 231 and the I/V conversion circuit 232a are omitted in FIG. 40.

In the illustrated example, of the five reception conductors $X_{m-2}$ to $X_{m+2}$ selected by the reception conductor selection circuit 231, the reception conductors $X_{m-2}$ and $X_{m-1}$ are connected to the negated input terminals of the differential amplifier 350 which have the negative or (−) polarity, and the reception conductors $X_{m+2}$ and $X_{m+1}$ are connected to the non-negated input terminals of the differential amplifier 350 which have the positive or (+) polarity. The centrally positioned reception conductor $X_m$ is connected to the ground. It is to be noted that the centrally positioned reception conductor $X_m$ may be connected to the ground or to an input terminal of the differential amplifier 350 which is set to a predetermined reference voltage level such as, for example, a reference level or a supply voltage level Vcc inside the differential amplifier 350.

Where such a configuration as just described is adopted, output signals from the plural reception conductors $X_{m-2}$ to $X_{m+2}$ are input at the same time to the differential amplifier 350. As a result, since the level of the differential signal output from the differential amplifier 350 increases, the detection sensitivity can be improved. Further, since the number of reception conductors 14 connected to the differential amplifier 350 increases, the detection range for a pointer can also be expanded. Further, in the present modification 12, since the differential amplifier 350 is used in the amplification circuit 232 shown in FIG. 39, the noise resisting property can be improved similarly as in the modification 11.

The reason why the centrally positioned reception conductor $X_m$ is set to the ground or the predetermined reference voltage level in the present modification 12 is as follows. As described hereinabove in connection with the first embodiment, in the pointer detection apparatus of the cross point electrostatic coupling system, the variation of the current at a cross point at which current is shunted to the ground through the pointer 19 is detected (see FIG. 12B). However, if the pointer 19 is not grounded sufficiently, then the shunting of current at the cross point becomes insufficient. In this instance, the current variation at the cross point becomes small, and the sensitivity in position detection deteriorates.

In contrast, if the voltage level of the reception conductor $X_m$ which is positioned at the center from among the plurality of reception conductors $X_{m-2}$ to $X_{m+2}$ connected to the differential amplifier 350 is set to the ground or a reference voltage level such as, for example, a power supply voltage level or the ground voltage level as in the present modification 12, then even if the pointer 19 is not grounded sufficiently, as long as the pointer 19 touches the reception conductor $X_m$, part of the current can be surely shunted through the pointer 19 and the reception conductor $X_m$. As a result, deterioration of the sensitivity described above can be suppressed.

In the modifications 11 and 12, a differential amplifier is used in the amplification circuit to improve the detection sensitivity. The detection sensitivity can be further improved by supplying the same spread code to a plurality of transmission conductors, as will be described below.

[Modification 13]

Figure 41:
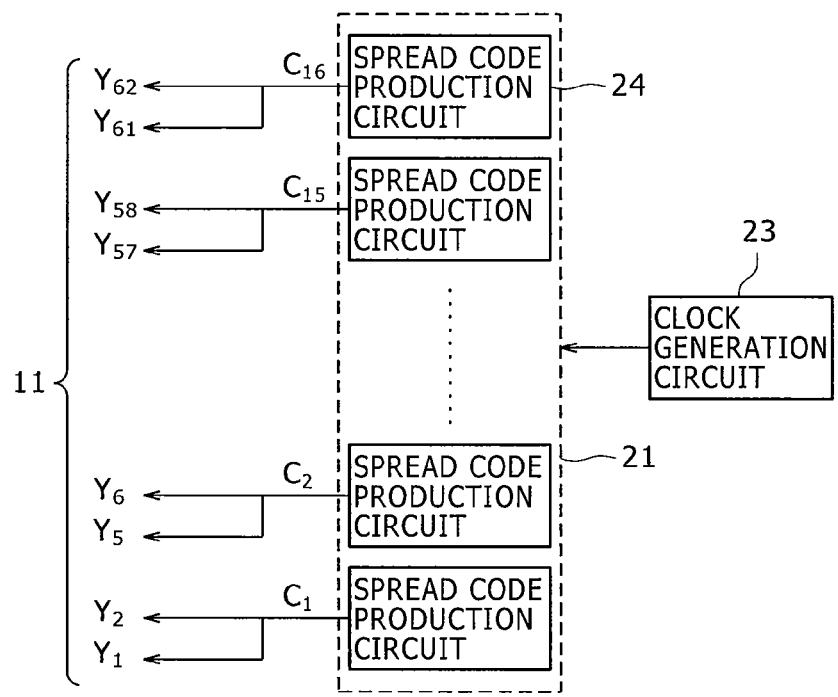
FIG. 41 is a block diagram illustrating that the same spread code is supplied to two transmission conductors positioned adjacent to each other according to a modification 13.

A modification 13 is described with reference to FIG. 41. In the present modification 13, the same spread code is supplied to two transmission conductors which are positioned adjacent to each other as seen in FIG. 41. It is to be noted that the configuration of the other part is the same as that of the modification 11 described hereinabove with reference to FIGS. 1, 39 and so forth, and therefore, overlapping description of the same is omitted herein to avoid redundancy.

As seen in FIG. 41, each of 16 different spread codes $C_1$ to $C_{16}$ produced by a plurality of spread code production circuits 24 which form the spread code supplying circuit 21 is supplied to two transmission conductors 12 positioned adjacent to each other. In particular, the spread code $C_1$ is supplied to the transmission conductors $Y_1$ and $Y_2$, the spread code $C_2$ to the transmission conductors $Y_5$ and $Y_6$, . . . , the spread code $C_{15}$ to the transmission conductors $Y_{57}$ and $Y_{58}$, and the spread code $C_{16}$ to the transmission conductors $Y_{61}$ and $Y_{62}$. Though not particularly shown, the transmission conductor selection circuit 22 (FIG. 1) time-dependently switches the transmission conductors 12 to be connected to the spread code production circuits 24 such that the spread codes $C_1$ to $C_{16}$ are supplied, eventually, to all transmission conductors 12 which form the transmission conductor array 11.

For example, referring to an arbitrary one of the reception conductors 14 (not shown), if the same spread code is supplied to two transmission conductors, then since twice the spread code is supplied to the reception conductor 14 as compared to the reception conductor 14 in the first embodiment, the output signal from the arbitrary reception conductor 14 is also doubled. Accordingly, the detection sensitivity can be improved. Further, if the same spread code is supplied at the same time to three or more transmission conductors 12, then the detection sensitivity in regard to an arbitrary one of the reception conductors 14 can be further improved by an amount corresponding to the number of transmission conductors to which the same spread code is supplied at the same time.

[Modification 14]

Where the same spread code is supplied to a plurality of transmission conductors 12 positioned adjacent to each other as in the case of the modification 13 described hereinabove with reference to FIG. 41, preferably output signals of a number of reception conductors 14 equal to the number of transmission conductors 12 to which the same spread code is supplied are amplified.

Figure 42:
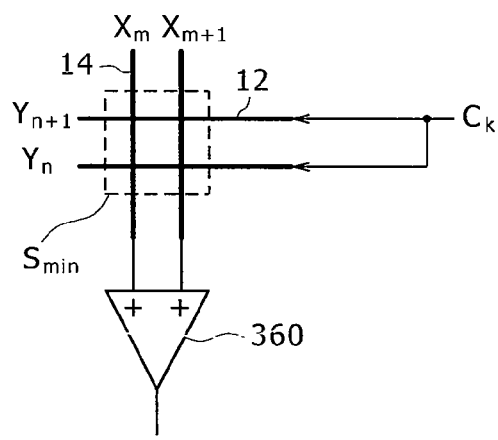
FIG. 42 is a diagrammatic view illustrating detection carried out using a 2-input 1-output amplifier where the same spread code is applied to two transmission conductors positioned adjacent to each other according to a modification 14.

A general configuration of the modification 14 is described with reference to FIG. 42. FIG. 42 shows a general configuration of an amplification circuit where the same spread code $C_k$ is supplied to two transmission conductors $Y_n$ and $Y_{n+1}$ positioned adjacent to each other. It is to be noted that the configuration of the other part than that shown in FIG. 42 is the same as that of the modification 11, and illustration in the drawings and description in the specification of the same are omitted for ease of illustration and description.

Where the same spread code $C_k$ is supplied to the two transmission conductors $Y_n$ and $Y_{n+1}$ positioned adjacent to each other as in the case of the modification 13 described hereinabove, an amplifier which has a number of input terminals equal to the number of transmission conductors 12 to which the same spread code $C_k$ is supplied is used. Also, in the illustrated example, the input terminals have the same polarity and, for example, a 2-input 1-output amplifier 360 having two non-negated ("+") terminals is used as the amplification circuit 232 of the reception section 310. To the two input terminals of the amplifier 360 of the reception section 310, two reception conductors $X_m$ and $X_{m+1}$ which are positioned adjacent to each other are connected.

Where the same spread code $C_k$ is supplied to the two transmission conductors $Y_n$ and $Y_{n+1}$ positioned adjacent to each other and the output signals from two reception conductors $X_m$ and $X_{m+1}$ positioned adjacent to each other are amplified as described above, not only the signal level of the output signal from the amplifier 360 is increased, but also the detection range for a pointer can be expanded. As a result, since the time required for detection of the entire sensor section 100 described hereinabove with reference to FIG. 1 can be reduced, the present modification 14 is suitably applied to a sensor section which has a large position detection region. It is to be noted that, while, in the modification 14, the number of reception conductors 14 to be connected at the same time to the amplifier 360 is two, the present invention is not limited to this configuration. For example, three or more reception conductors 14 may be connected. In this instance, it is possible to further reduce the time required for detection of the entire sensor section 100 and increase the signal level of the output signal to be output from the amplification circuit.

Figure 43:
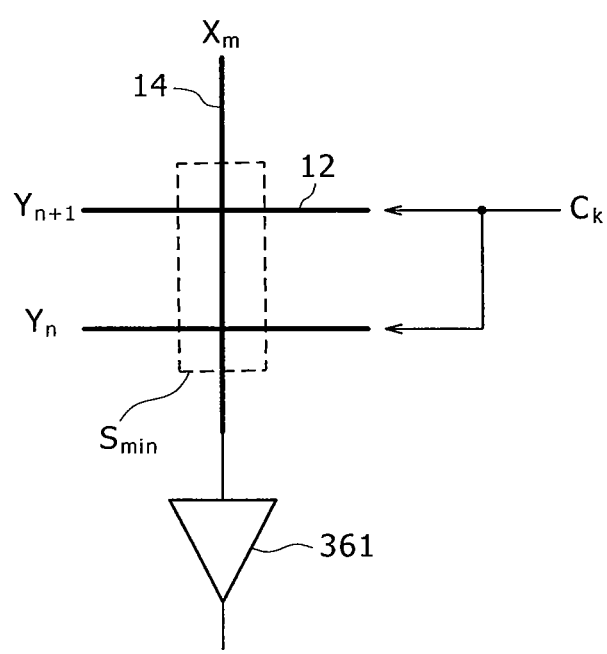
FIG. 43 is a diagrammatic view illustrating detection carried out using an amplifier where the same spread code is supplied to two transmission conductors positioned adjacent to each other according to the modification 14.

If the number of transmission conductors 12 to which the same spread code $C_k$ is supplied is set equal to the number of reception conductors 14 to be selected at the same time as described above, the following advantages are achieved. In the following, such advantages are described with reference to FIGS. 42 and 43 for comparison. FIG. 43 illustrates a concept of a minimum detection area $S_{min}'$ where the same spread code $C_k$ is supplied to two transmission conductors $Y_n$ and $Y_{n+1}$ and an output signal from an arbitrary one reception conductor $X_m$ is amplified.

Where the number of transmission conductors 12 to which the same spread code $C_k$ is to be supplied and the number of reception conductors 14 to be selected at the same time by the reception conductor selection circuit, that is, the number of reception conductors 14 to be connected to an amplifier 361, are different from each other, the minimum detection area $S_{min}'$ on the sensor section has a rectangular shape as seen in FIG. 43, and anisotropy occurs with the sensitivity distribution. In this instance, for example, if a pointer has a circular-shape surface that opposes the sensor section (such surface is hereinafter referred to as an opposing surface), then the opposing surface of the pointer is sometimes detected not as a circular shape but as a distorted shape such as an elliptic shape. In contrast, where the number of transmission conductors 12 to which the same spread code $C_k$ is to be supplied and the number of reception conductors 14 to be connected to the amplifier 361 are equal to each other as in the modification 14, the minimum detection area $S_{min}$ on the sensor section has a square shape as seen in FIG. 42 and an isotropic sensitivity distribution is achieved. In this instance, even if a pointer having a circular opposing surface is placed on the sensor section, the opposing surface of the pointer can be detected as a circular shape.

It is to be noted that, while, in the present modification 14, both of the number of transmission conductors 12 to which the same spread code $C_k$ is supplied and the number of reception conductors 14 to be connected to the amplifier 360 are two, the present invention is not limited to this configuration. Both of the number of transmission conductors 12 to which the same spread code $C_k$ is supplied and the number of reception conductors 14 to be connected to the amplifier 361 may alternatively be three or more.

Switching of two transmission conductors, to which the same spread code is to be supplied in the modification 14 described above, is described with reference to FIGS. 44A to 45C. It is to be noted that the following description is given suitably with reference to FIG. 1.

Figures 44A, 44B, 45A, 45B, 45C, 46:
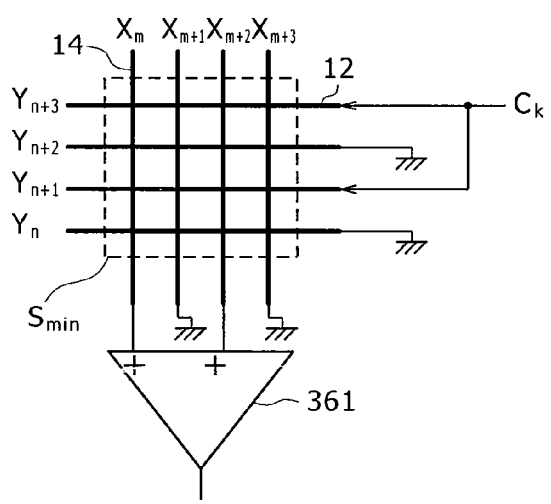
FIGS. 44A and 44B are diagrammatic views illustrating switching of a spread code to be supplied to transmission conductors according to the modification 14.
FIGS. 45A to 45C are diagrammatic views illustrating different switching of a spread code to be supplied to transmission conductors according to the modification 14.
FIG. 46 is a diagrammatic view illustrating a relationship between supply of the same spread code to a plurality of transmission conductors disposed at intervals and reception of signals at a plurality of reception conductors according to a modification 15.

FIGS. 44A and 44B illustrate an example of switching of two transmission conductors to which the spread code $C_k$ is supplied at the same time. It is assumed that, in the switching example illustrated in FIGS. 44A and 44B, the spread code $C_k$ is supplied to the transmission conductors $Y_n$ and $Y_{n+1}$ at a certain point of time as seen in FIG. 44A. Then, after lapse of a predetermined interval of time, the spread code $C_k$ is supplied to the transmission conductors $Y_{n+2}$ and $Y_{n+3}$ as seen in FIG. 44B. Thereafter, though not shown, the transmission conductors 12 to which the spread code $C_k$ is supplied are switched to the transmission conductors $Y_{n+4}$ and $Y_{n+5}$, the transmission conductors $Y_{n+6}$ and $Y_{n+7}$, and so forth. After the spread code $C_k$ is supplied to the last pair of predetermined conductors, the two transmission conductors to which the spread code $C_k$ is to be supplied at the same time are switched back to the first transmission conductors $Y_n$ and $Y_{n+1}$. Thereafter, the switching sequence described above is repeated.

Another example wherein the transmission conductors 12 are successively switched (shifted) by one transmission conductor is described with reference to FIGS. 45A to 45C. In particular, the spread code $C_k$ is supplied to the transmission conductors $Y_n$ and $Y_{n+1}$ first at a certain point of time as seen in FIG. 45A. Then, after lapse of a predetermined interval of time, the spread code $C_k$ is supplied to the transmission conductors $Y_{n+1}$ and $Y_{n+2}$ as seen in FIG. 45B. Further, after another lapse of a predetermined interval of time, the spread code $C_k$ is supplied to the transmission conductors $Y_{n+2}$ and $Y_{n+3}$ as seen in FIG. 45C. Thereafter, though not particularly shown, the transmission conductors 12 to which the spread code $C_k$ is to be supplied are successively switched to the transmission conductors $Y_{n+3}$ and $Y_{n+4}$, the transmission conductors $Y_{n+4}$ and $Y_{n+5}$, and so forth. Then, after the spread code $C_k$ is supplied to the last pair of predetermined conductors, the transmission conductors 12 to which the spread code $C_k$ is to be supplied are switched back to the first transmission conductors $Y_n$ and $Y_{n+1}$, whereafter the switching sequence described above is repeated. In particular, in the switching example illustrated in FIGS. 45A to 45C, the transmission conductors 12 to which the same spread code $C_k$ is supplied are selected in a unit of a predetermined number (two in the example described) after every predetermined interval of time. Then, the switching operation is controlled such that some of the plural transmission conductors 12 selected by a preceding selection operation (one in the example described) is or are again selected as part of a plurality of transmission conductors 12 in the next selection operation.

[Modification 15]

While, in the modifications 13 and 14 described above, the same spread code is supplied to two transmission conductors positioned adjacent to each other and output signals of two reception conductors positioned adjacent to each other are amplified by a simple amplifier, the present invention is not limited to this configuration. For example, the transmission section may supply the same spread code to a plurality of transmission conductors disposed at a predetermined number of intervals, and similarly the reception section may be configured such that output signals output from a plurality of reception conductors disposed at a predetermined number of intervals are amplified by an amplifier. An example thereof will be shown in FIG. 46 as modification 15.

In the present modification 15, in place of each of the differential amplifiers 250 provided in the amplification circuit 232 described hereinabove with reference to FIG. 39, an amplifier 361 having a number of input terminals of the same polarity equal to the number of transmission conductors 12 to which the same spread code $C_k$ is supplied, for example, a 2-input 1-output amplifier 361 having, for example, two non-negated ("+") terminals, may be used in the amplification circuit 232 of the reception section 310. It is to be noted that, since the configuration of the part other than that described above is the same as that of the modification 14, description of the same is described suitably with reference to FIGS. 1 and 39 and overlapping description of the same is omitted.

FIG. 46 schematically shows a configuration where a transmission conductor connected to the ground is positioned between two transmission conductors to which the same spread code $C_k$ is supplied and the reception section amplifies output signals from two reception conductors by means of an amplifier while a reception conductor connected to the ground is positioned between the two reception conductors. In particular, as seen in FIG. 46, the transmission conductor selection circuit 22 (shown in FIG. 1) selects two arbitrary transmission conductors $Y_{n+1}$ and $Y_{n+3}$. Then, the spread code supplying circuit 21 of the transmission section 200 supplies the same spread code $C_k$ to the two selected transmission conductors $Y_{n+1}$ and $Y_{n+3}$. Simultaneously, the transmission conductor selection circuit 22 connects the transmission conductors 12 other than the two transmission conductors $Y_{n+1}$ and $Y_{n+3}$ to which the spread code $C_k$ is to be supplied, that is, the transmission conductors $Y_n$ and $Y_{n+2}$ and any other remaining transmission conductors 12, to the ground.

Simultaneously, the reception conductor selection circuit 231 of the reception section 310 shown in FIG. 39 connects the two reception conductors $X_m$ and $X_{m+2}$ to input terminals of one amplifier 361, and the amplifier 361 amplifies the output signals from the reception conductors $X_m$ and $X_{m+2}$ connected thereto. Simultaneously, the reception conductors 14 other than the reception conductors $X_m$ and $X_{m+2}$ connected to the amplifier 361, in particular, the reception conductors $X_{m+1}$ and $X_{m+3}$ and any other remaining reception conductors 14, are connected to the ground. It is to be noted that switching of the transmission conductors 12 and the reception conductors 14 by the transmission conductor selection circuit 22 and the reception conductor selection circuit 231, respectively, is carried out similarly to the switching described hereinabove, for example, in connection with the modification 14 with reference to FIGS. 44A to 45C.

In this manner, since, in the modification 15, the same spread code is supplied to a plurality of transmission conductors 12 and output signals from the plurality of reception conductors 14 are added by an amplifier 361 similarly as in the modification 13, the detection range can be expanded and the signal level to be detected can be increased, while the detection sensitivity is also improved. The present modification 15 is particularly suitable where the position detection range on the sensor section is large because the minimum detection area $S_{min}$ can be expanded.

In the present modification 15, where the number of transmission conductors to which the same spread code is to be supplied and the number of reception conductors to be selected simultaneously are set equal to each other similarly as in the modification 13 described hereinabove, the minimum detection area $S_{min}$ on the sensor section can be set to a square shape. As a result, in the minimum detection area on the sensor section, an isotropic sensitivity distribution can be achieved similarly as in the modification 13. In this instance, even if, for example, a pointer having a circular opposing surface is disposed on the sensor section, the opposing surface of the pointer can be detected as a circular shape.

[Modification 16]

The current carrying the spread codes $C_k$ to be supplied to the transmission conductor array 11 is much greater than the variation amount of an output signal caused by current flowing to the ground through a pointer 19 when the pointer 19 is placed at a cross point. Although raising the signal level of the output signal as in the modifications 11 to 15 improves the detection sensitivity, raising the output signal level may decrease the accuracy in detecting the variation amount of the output signal. In order to maintain the detection accuracy, it may be necessary to enhance the resolution of the A/D conversion circuit 33 of the reception section 300 (see FIG. 1).

However, if the resolution of the A/D conversion circuit 33 is enhanced, then this may cause another problem that the scale of the A/D conversion circuit 33 increases and designing such A/D conversion circuit 33 may be difficult. This problem may be exacerbated where the same spread code is supplied to a plurality of transmission conductors 12.

Figure 49:
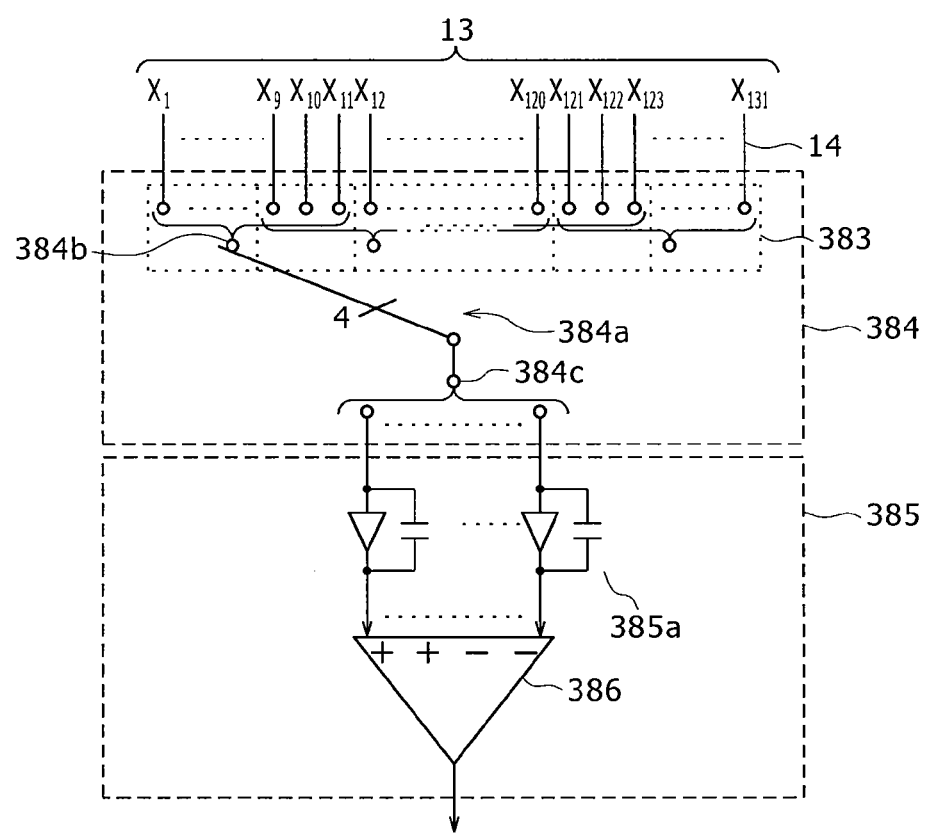
FIG. 49 is a circuit diagram showing a configuration of a reception section in the modification 16.

Thus, a modification 16 which solves this problem is described with reference to FIGS. 47A to 49. FIG. 47A shows a general configuration of the modification 16 and FIG. 47B illustrates a waveform of an output signal of a differential amplifier in the modification 16. Further, FIG. 48 illustrates an example of an internal configuration of a transmission conductor selection circuit in the modification 16, and FIG. 49 illustrates a configuration of a reception conductor selection circuit in the modification 16. It is to be noted that the modification 16 is described in connection with a variation of an output signal where a pointer 19 is placed at a cross point between the transmission conductor $Y_{n+2}$ and the reception conductor $X_{m+1}$ as indicated by a solid line in FIG. 47A.

First, a general configuration of the modification 16 is described with reference to FIG. 47A. The modification 16 is different from the modification 11 in that two inverters 381 are provided between the spread code supplying circuit 21 for supplying the spread code $C_k$ and the transmission conductor selection circuit 382 for selectively supplying the spread code $C_k$ to the transmission conductor array 11, and that a 4-input 1-output differential amplifier 380 is used as the amplification circuit to differentially amplifies outputs from four reception conductors 14. Since the configuration of the other part of the modification 16 is the same as that of the modification 11 described hereinabove with reference to FIGS. 1 and 39, overlapping description of the same is omitted herein to avoid redundancy.

The two inverters 381 invert the spread code $C_k$ supplied thereto from the spread code supplying circuit 21 and output the inverted spread code. The spread code $C_k$ supplied from the spread code supplying circuit 21 and the reversed code $\overline{C_k}$ output from the inverters 381 are supplied to four transmission conductors $Y_n$ to $Y_{n+3}$ positioned adjacent to each other by the transmission conductor selection circuit 382. In particular, the spread code $C_k$ supplied from the spread code supplying circuit 21 is supplied to the two transmission conductors $Y_{n+2}$ and $Y_{n+3}$ through the transmission conductor selection circuit 382. Further, the spread code $C_k$ is inverted into the reversed codes $\overline{C_k}$ by the inverters 381 and then supplied to the transmission conductors $Y_n$ and $Y_{n+1}$ through the transmission conductor selection circuit 382. It is to be noted that, in the following description of the supplying form (hereinafter referred to as a supply pattern) of the spread codes illustrated in FIG. 47A, each transmission conductor to which the spread code $C_k$ is supplied is represented by "+" and each transmission conductor to which the reversed code $\overline{C_k}$ is supplied is represented by "−." In particular, such signal supply pattern as illustrated in FIG. 47A is represented as "−−++."

Next, details of the transmission conductor selection circuit 382 are described with reference to FIG. 48.

The transmission conductor array 11 is divided into 16 transmission blocks 383 each including seven transmission conductors $Y_n$ to $Y_{n+6}$ positioned adjacent to each other. The transmission conductor selection circuit 382 is, for example, a known logic circuit and includes a number of switch groups 382a equal to the number of transmission blocks 383, that is, 16 switch groups 382a. Each of the transmission blocks 383 uses those three transmission conductors 12 which have the highest indexes n from among the seven transmission conductors $Y_n$ to $Y_{n+6}$ commonly with an adjacent transmission block. In particular, as seen in FIG. 48, the first transmission block 383 uses the three transmission conductors $Y_{n+4}$ to $Y_{n+6}$ having the highest indexes n from among the transmission conductors $Y_n$ to $Y_{n+6}$ commonly with an adjacent, second transmission block 383.

Each of the switch groups 382a includes four switches $382a_1$, $382a_2$, $382a_3$ and $382a_4$. Seven terminals 382b on the output side of each of the switch groups 382a are connected to corresponding transmission conductors $Y_n$ to $Y_{n+6}$, respectively. Input terminals 382c of the switches $382a_1$ and $382a_2$ from among the four switches $382a_1$, $382a_2$, $382a_3$ and $382a_4$ are connected to the spread code production circuits 24 of the spread code supplying circuit 21 shown in FIGS. 1 and 3 through inverters 381. The input terminals 382c of the switches $382a_3$ and $382a_4$ are connected to the spread code production circuits 24 of the spread code supplying circuit 21.

As seen in FIG. 48, for example, the switch group $382a$, to which the spread code $C_k$ and the reversed code $\overline{C_k}$ of the spread code $C_k$ are supplied, supplies the spread code $C_k$ to the transmission conductors $Y_{n+2}$ and $Y_{n+3}$ and supplies the reversed code $\overline{C_k}$ to the transmission conductors $Y_n$ and $Y_{n+1}$. Then, after the spread code $C_k$ and the reversed code $\overline{C_k}$ are supplied for a predetermined period of time, the switch group $382a$ switches the transmission conductors 12 to be connected to the spread code supplying circuit 21 such that the spread code $C_k$ is supplied to the transmission conductors $Y_{n+3}$ and $Y_{n+4}$ and the reversed code $\overline{C_k}$ is supplied to the transmission conductors $Y_{n+1}$ and $Y_{n+2}$. Thereafter, the switch $382a$ successively and time-dependently switches the transmission conductors to be connected to the spread code supplying circuit 21. Then, after the spread code $C_k$ is supplied to the transmission conductors $Y_{n+5}$ and $Y_{n+6}$ and the reversed code $\overline{C_k}$ is supplied to the transmission conductors $Y_{n+3}$ and $Y_{n+4}$, the spread code $C_k$ is again supplied to the transmission conductors $Y_{n+2}$ and $Y_{n+3}$ and the reversed code $\overline{C_k}$ is again supplied to the transmission conductors $Y_n$ and $Y_{n+1}$, and thereafter the sequence of operations described above is repeated. The spread code $C_k$ and the reversed code $\overline{C_k}$ of the spread code $C_k$ supplied from the spread code supplying circuit 21 are supplied to all of the transmission conductors 12 which form the transmission conductor array 11 in the manner described above.

Next, details of a reception conductor selection circuit 384 in the modification 16 are described with reference to FIGS. 47A and 49.

As seen in FIG. 49, the reception conductor selection circuit 384 includes a switch group $384a$ which includes four switches. Input terminals $384b$ of the switch group $384a$ are respectively connected to corresponding reception conductors 14. Output terminals $384c$ of the switches of the switch group $384a$ are connected to input terminals of an I/V conversion circuit $385a$ of an amplification circuit 385. The switch group $384a$ switches the reception conductors 14 to be connected to the I/V conversion circuit $385a$ at predetermined intervals of time. Output signals from the reception conductors 14 are converted into voltage signals by the I/V conversion circuit $385a$ and input to a differential amplifier 386 hereinafter described. It is to be noted that, in FIG. 49, a plurality of I/V conversion circuits $385a$ and a plurality of switch groups $384a$ are omitted for simplicity of illustration.

The amplification circuit 385 includes four I/V conversion circuits $385a$ and a differential amplifier 386. As seen in FIG. 49, the I/V conversion circuits $385a$ are connected at an input terminal thereof to output terminals $384c$ of the switches which form the switch group $384a$ and are connected at output terminals thereof to input terminals of the differential amplifier 386 hereinafter described.

The differential amplifier 386 is a 4-input 1-output differential amplifier. The differential amplifier 386 is provided between the I/V conversion circuits $385a$ and the A/D conversion circuit 33 (shown in FIG. 1), and of the four input terminals thereof, the two input terminals on the left side in FIG. 49 have the polarity of "+" while the two input terminals on the right side in FIG. 49 have the polarity of "−." In particular, the polarity of the input terminals of the differential amplifier 386, to which the two reception conductors $X_m$ and $X_{m+1}$ having relatively low indexes m from among the four reception conductors $X_m$ to $X_{m+3}$ which are selected by the reception conductor selection circuit 384 are connected, is set to "+." The polarity of the other two input terminals of the differential amplifier 386, to which the two reception conductors $X_{m+2}$ and $X_{m+3}$ having relatively high indexes m are connected, is set to "−." The differential amplifier 386 differentially amplifies output signals converted into voltage signals by the I/V conversion circuits $385a$ and outputs the resulting amplified signal.

The reception conductor selection circuit 384 carries out selection switching similar to that in the modification 4 described hereinabove with reference to FIG. 31. In particular, the switch group $384a$ of the reception conductor selection circuit 384 connects the reception conductors $X_m$ to $X_{m+3}$ to the "+" terminals and the "−" terminals of the differential amplifier 386 as seen in FIG. 49 in the order beginning with the reception conductor having the lowest index (e.g., $X_1$ to $X_4$). In particular, the two "+" terminals of the differential amplifier 386 are connected to the reception conductors $X_1$ and $X_2$ and the two "−" terminals of the differential amplifier 386 are connected to the reception conductors $X_3$ and $X_4$. Then, after a predetermined interval of time elapses, the switch group $384a$ of the reception conductor selection circuit 384 connects reception conductors positioned in the direction in which the index m increases, that is, the reception conductors $X_2$ and $X_3$, to the "+" terminals of the differential amplifier 386, and connects the reception conductors $X_4$ and $X_5$ to the "−" terminals of the differential amplifier 386. After the switching, new output signals are obtained from the reception conductors $X_2$ to $X_5$ now connected to the switch group $384a$. Thereafter, the switch group $384a$ of the reception conductor selection circuit 384 successively switches the reception conductors 14 to be connected to the differential amplifier 386 at predetermined intervals of time. Then, after the last four reception conductors $X_{128}$ to $X_{131}$ are connected to the differential amplifier 386, the initial state, that is, the state illustrated in FIG. 49, is restored, and then the sequence of operations described above is repeated.

Then, every time such switching as described above is carried out, the differential amplifier 386 differentially amplifies the output signals input thereto from the reception conductors 14 and outputs the resulting signal to the A/D conversion circuit 33 at the succeeding stage shown in FIG. 1. Thereafter, the output signals digitally converted by the A/D conversion circuit 33 are subjected to correlation calculation by the correlation value calculation circuit 34, and a correlation value which is a result of the correlation calculation is stored in the correlation value storage circuit $34d$ as seen in FIG. 8. It is to be noted that, in the following description of the reception form (hereinafter referred to as a detection pattern) of the differential amplifier 386 illustrated in FIG. 49, each reception conductor connected to a "+" terminal of a differential amplification circuit is represented by "+" and each reception conductor connected to a "−" terminal of a differential amplification circuit is represented by "−." In particular, such signal detection pattern as illustrated in FIG. 49 is represented as "++−−."

Next, displacement of output signals when the reception conductors to be connected to the four input terminals of the differential amplifier 386 are switched as described above is described with reference to FIG. 47B. A curve 380 indicated by a broken line in FIG. 47B represents a waveform of an output signal output from the differential amplifier 386 when the reception conductors to be connected to the four input terminals of the differential amplifier 386 are successively switched beginning with the reception conductors having the lowest indexes m, and a curve 380X indicates a waveform after the output signal from the differential amplifier 386 is integrated. It is to be noted that, for the convenience of description, the four input terminals of the differential amplifier 386 are referred to as input terminals $386a$ to $386d$ in the order beginning with the input terminal connected to the reception conductor having the highest index m.

If the reception conductor selection circuit 384 successively switches the reception conductors 14 to be connected to the input terminals 386a to 386d of the differential amplifier 386 in such a manner as described above, then when the reception conductors 14 connected to the input terminals 386a to 386d of the differential amplifier 386 are positioned so as not to be influenced by the pointer 19 (i.e., the pointer 19 is not adjacent to any of the four reception conductors 14), then the output signal from the differential amplifier 386 is zero (see 380a of FIG. 47B).

Then, when the reception conductors 14 are approached by the pointer 19, the first to approach the pointer 19 is the right-most reception conductor 14 connected to the input terminal 386a of the differential amplifier 386. Thus, the signal input to the "−" terminal of the differential amplifier 386 gradually decreases. As a result, the output signal from the differential amplifier 386 is deflected to the positive side (see 380b of FIG. 47B). Thereafter, when the reception conductor selection circuit 384 switches the reception conductors 14 to be connected to the differential amplifier 386 (to the right), both of the reception conductors 14 connected to the input terminals 386a and 386b of the differential amplifier 386 now approach the pointer 19. Consequently, the output signal from the differential amplifier 386 is further deflected to the positive side. The signal level of the output signal from the differential amplifier 386 becomes highest when the position at which the pointer 19 is placed is between the reception conductors 14 connected to the input terminals 386a and 386b of the differential amplifier 386 (see 380c of FIG. 47B).

As the reception conductor selection circuit 384 successively switches the reception conductors 14 to be connected to the input terminals 386a to 386d of the differential amplifier 386, the reception conductors 14 previously connected to the input terminals 386a and 386b of the differential amplifier 386 are gradually moved away from the pointer 19, and the reception conductor 14 connected to the input terminal 386c of the differential amplifier 386 now closely approaches the pointer 19 instead. Consequently, the signal input to the "+" terminals of the differential amplifier 386 gradually decreases while the signal input to the "−" terminals of the differential amplifier 386 gradually increases. As a result, the output signal from the differential amplifier 386 is deflected to the negative side (see 380d of FIG. 47B).

Then, when the pointer 19 is positioned between the reception conductor 14 connected to the input terminal 386c and the reception conductor 14 connected to the input terminal 386d, the signal input to the "+" terminal of the differential amplifier 386 becomes the lowest. As a result, the output signal from the differential amplifier 386 decreases most (see 380e of FIG. 47B).

Then, if the reception conductor selection circuit 384 further switches the reception conductors 14 connected to the input terminals 386a to 386d of the differential amplifier 386, then since all of the reception conductors 14 connected to the input terminals 386a to 386d of the differential amplifier 386 will be moved away from the pointer 19, the signals input to the "+" terminals of the differential amplifier 386 gradually increase. Consequently, the output signal from the differential amplifier 386 gradually increases also (see 380f of FIG. 47B). Thereafter, when the reception conductors 14 connected to the input terminals 386a to 386d of the differential amplifier 386 are switched to those reception conductors 14 which are so positioned as to be not influenced by the pointer 19, then the output signal from the differential amplifier 386 becomes zero again (see 380g of FIG. 47B).

The output signal from the differential amplifier 386 thus exhibits such a level variation as indicated by the curve 380 of a broken line in FIG. 47B. If the output signal from the differential amplifier 386 is integrated, then the curve 380X indicated by a solid line in FIG. 47B is obtained. Then, the center of gravity of a convexed portion of the curve 380X is calculated to determine (detect) the position of the pointer 19.

The output signal from the differential amplifier 386 and the value obtained by integration of the output signal illustrated in FIG. 47B represent an output characteristic where the pointer 19 is placed at the cross point between the transmission conductor 12 to which the spread code $C_k$ is supplied and the reception conductor 14. Where the pointer 19 is placed at the cross point between the transmission conductor 12 to which the reversed code $\overline{C_k}$ is supplied and the reception conductor 14 (for example, at the cross point between the transmission conductor $Y_n$ and the reception conductor $X_{m+1}$ at which the pointer 19 indicated by a broken line in FIG. 47A is placed), the output signal from the differential amplifier 386 exhibits a characteristic opposite to the output characteristic described above.

Where the configuration example described above in connection with the present modification 16 is used, the detection accuracy can be maintained without increasing the circuit scale, and the differential signal to be output from the differential amplifier 386 can be increased. Furthermore, the range within which simultaneous detection can be carried out can be expanded. Consequently, the detection sensitivity can be improved. Still further, since the present modification 16 is configured such that the spread codes $C_k$ and the reversed codes $\overline{C_k}$ of the spread codes $C_k$ are supplied to the transmission conductors 12, in a situation in which the pointer 19 does not exist, the spread codes $C_k$ and the reversed code $\overline{C_k}$ cancel each other. Consequently, the dynamic range of the output signal of the differential amplifier 386 and the input signal to the A/D conversion circuit can be suppressed. Additionally, since noise is canceled out, the noise withstanding property can be improved.

In the present modification 16, the total number of the transmission conductors 12 to which the same spread code $C_k$ is supplied and the transmission conductors 12 to which the reversed code $\overline{C_k}$ having the sign reversed from the spread code $C_k$ is supplied, is made equal to the number of reception conductors 14 to be connected to the differential amplifier 386 similarly as in the modification 14. As a result, in the configuration of the present modification 16 also, the minimum detection area $S_{min}$ on the sensor section becomes a square shape. Consequently, in the minimum detection area $S_{min}$ on the sensor section, an isotropic sensitivity distribution can be achieved similarly as in the modification 14. In this instance, for example, even if a pointer having a circular opposing surface is disposed on the sensor section, the opposing surface of the pointer can be detected as a circular shape.

It is to be noted that, while, in the modification 16 described above, the number of reception conductors to be connected to the differential amplifier 386 is four, which is an even number, the number of reception conductors to be connected is not limited to four or any even number. For example, the unit number of reception conductors to be connected may be three or five, which are odd numbers. In this instance, the centrally disposed reception conductor from among the selected odd reception conductors is preferably connected to the ground or to a reference voltage similarly as in the case of the modification 12 described hereinabove. This is because, as previously described, where the pointer is not grounded sufficiently, part of current can be shunted through the centrally disposed reception conductor to thereby prevent deterioration of the detection sensitivity.

While, in the modification 16 described above, the reversed code $\overline{C_k}$ is supplied to the transmission conductors 12 having low indexes n while the spread code $C_k$ is supplied to the transmission conductors 12 having high indexes n, the present invention is not limited to this configuration. For example, the spread code $C_k$ may be supplied to the transmission conductors 12 having low indexes n while the reversed code $\overline{C_k}$ is supplied to the transmission conductors 12 having high indexes n. Similarly, while the reception conductors 14 having low indexes m are connected to the "+" terminals of the differential amplifier 386 and the reception conductors 14 having high indexes m are connected to the "−" terminals to carry out differential amplification, alternatively the reception conductors 14 having low indexes m may be connected to the "−" terminals while the reception conductors 14 having high indexes m are connected to the "+" terminals.

[Modification 17]

While, in the modification 16 described above, the spread codes $C_k$ supplied from the spread code supplying circuit 21 and the reversed codes $\overline{C_k}$ which are reversed codes of the spread codes $C_k$ are supplied to four adjacent transmission conductors such that the same signs are positioned adjacent to each other, the present invention is not limited to this configuration. For example, the spread code $C_k$ or the reversed code $\overline{C_k}$ may be supplied to the transmission conductors $Y_n$ and $Y_{n+3}$ which are positioned at the opposite ends of the four transmission conductors $Y_n$ to $Y_{n+3}$ positioned adjacent to each other while the reversed code $\overline{C_k}$ or the spread code $C_k$ is supplied to the transmission conductors $Y_{n+1}$ and $Y_{n+2}$ which are centrally positioned.

A configuration and operation of the modification 17 are described with reference to FIGS. 50A and 50B. FIG. 50A shows a general configuration of the present modification 17 and FIG. 50B illustrates a waveform of an output signal output from a differential amplifier in the modification 17.

The modification 17 is different from the modification 16 described above in that the supply pattern of the spread codes $C_k$ and the reversed codes $\overline{C_k}$ is "−++−" and that the detection pattern of the reception conductors 14 of 4-input 1-output differential amplifier 396 is "−++−" disposed in the order from the smaller side of the index m of the reception conductors 14. Of the four reception conductors $X_m$ to $X_{m+3}$ positioned adjacent to each other, the reception conductors $X_{m+1}$ to $X_{m+2}$ are connected to the "+" terminals of the differential amplifier 396 while the reception conductors $X_m$ and $X_{m+3}$ are connected to the "−" terminals of the differential amplifier 396. Since the configuration and operation of the other part of the modification 17 are the same as those of the modification 16 described hereinabove with reference to FIGS. 1 and 47A to 49, overlapping description of the same is omitted herein to avoid redundancy.

In the present modification 17, the spread codes $C_k$ supplied from the spread code supplying circuit 21 shown in FIG. 1 are supplied to the transmission conductors $Y_{n+1}$ and $Y_{n+2}$ positioned centrally among the four transmission conductors $Y_n$ to $Y_{n+3}$ selected by the transmission conductor selection circuit 382, while the reversed codes $\overline{C_k}$ obtained by reversing the sign of the spread codes $C_k$ are supplied to the transmission conductors $Y_n$ and $Y_{n+3}$ positioned on the opposite ends.

Next, displacement of output signals where reception conductors to be connected to the four input terminals of the differential amplifier 396 are switched is described with reference to FIG. 50B. It is to be noted that, for the convenience of description, the four input terminals of the differential amplifier 396 are referred to as input terminals 396*a* to 396*d* in the order beginning with the input terminal connected to the reception conductor having the highest index m.

Where the reception conductor selection circuit 384 successively switches the reception conductors 14 to be connected to the input terminals 396*a* to 396*d* of the differential amplifier 396 in such a manner as described above, when the reception conductors connected to the input terminals 396*a* to 396*d* of the differential amplifier 396 are positioned so as to be not influenced by the pointer at all, the output signal from the differential amplifier 396 is 0 (see 390*a* of FIG. 50B).

Then, since the reception conductors 14 connected to the differential amplifier 396 are approached by the pointer 19 beginning with the right-most reception conductor 14 connected to the input terminal 396*a* of the differential amplifier 396, the signal input to the "−" terminal of the differential amplifier 396 gradually decreases. As a result, the output signal from the differential amplifier 396 is deflected to the positive side (see 390*b* of FIG. 50B). Thereafter, when the reception conductor selection circuit 384 further switches the reception conductors 14 to be connected to the differential amplifier 396, the reception conductors 14 connected to both of the input terminals 396*a* ("−") and 396*b* ("+") of the differential amplifier 396 are approached by the pointer 19. Consequently, the signal input to the "−" terminals gradually increases while the signal input to the "+" terminals gradually decreases, and therefore, the output signal from the differential amplifier 396 is deflected to the negative side (see 390*c* of FIG. 50B).

Then, as the reception conductor selection circuit 384 successively switches the reception conductors 14 to be connected to the input terminals 396*a* to 396*d* of the differential amplifier 396, the reception conductors 14 connected to the input terminals 396*a* and 396*b* of the differential amplifier 396 are gradually moved away from the pointer 19 and the reception conductor 14 connected to the input terminal 396*c* of the differential amplifier 396 is gradually approached by the pointer 19 instead. As a result, the signal input to the "+" terminals of the differential amplifier 396 gradually decreases while the signal input to the "−" terminals of the differential amplifier 396 gradually increases. Consequently, the output signal from the differential amplifier 396 further decreases. Then, when the pointer 19 is positioned between the reception conductors 14 connected to the input terminals 396*b* and 396*c*, the signal level of the signal output from the differential amplifier 396 becomes the lowest (see 390*d* of FIG. 50B).

Then, when the reception conductor selection circuit 384 further switches the reception conductors 14 to be connected to the input terminals 396*a* to 396*d* of the differential amplifier 396, the reception conductors 14 connected to the input terminals 396*a*, 396*b* and 396*c* of the differential amplifier 396 are gradually moved away from the pointer 19 while the reception conductor 14 connected to the input terminal 396*d* of the differential amplifier 396 is approached by the pointer 19. Consequently, the signal input to the "+" terminals of the differential amplifier gradually increases. As a result, the output signal from the differential amplifier 396 is deflected to the positive side (see 390*e* of FIG. 50B). Then, when the reception conductor 14 connected to the input terminal 396*d* of the differential amplifier 396 comes closest to the pointer 19, the output signal from the differential amplifier 396 exhibits the highest level (see 390*f* of FIG. 50B).

Thereafter, when the reception conductor selection circuit 384 further carries out switching of the reception conductors to be connected to the input terminals 396*a* to 396*d* of the differential amplifier 396, since all of the reception conductors connected to the input terminals 396*a* to 396*d* of the differential amplifier 396 are now moved away from the pointer 19, the signal input to the input terminals of the differential amplifier 396 gradually increases. Then, when the reception conductors connected to the input terminals 396a to 396d of the differential amplifier 396 are switched to those reception conductors which are positioned so as not to be influenced by the pointer 19, the output signal from the differential amplifier 396 decreases to zero (see 390g of FIG. 50B).

The output signal from the differential amplifier 396 thus exhibits such a level variation as indicated by the curve 390 illustrated in FIG. 50B. It is to be noted that the output signal from the differential amplifier 396 and the value obtained by integration of the output signal illustrated in FIG. 50B represent an output characteristic where the pointer 19 is placed at the cross point between the transmission conductor 12 to which the spread code $C_k$ is supplied and the reception conductor 14. Where the pointer 19 is placed at the cross point between the transmission conductor 12 to which the reversed code $\overline{C_k}$ is supplied and the reception conductor 14 (for example, at the cross point between the transmission conductor $Y_n$ and the reception conductor $X_{m+1}$), the output signal from the differential amplifier 396 exhibits a characteristic opposite to the output characteristic described above.

In the illustrated example, the spread code $C_k$ supplied from the spread code supplying circuit is supplied to the transmission conductors $Y_{n+1}$ and $Y_{n+2}$ positioned centrally among the four transmission conductors $Y_n$ to $Y_{n+3}$ selected by the transmission conductor selection circuit 382, while the reversed code $\overline{C_k}$ obtained by reversing the sign of the spread code $C_k$ is supplied to the transmission conductors $Y_n$ and $Y_{n+3}$ positioned at the opposite ends. The reception conductors $X_{m+1}$ and $X_{m+2}$ centrally positioned among the four reception conductors positioned adjacent to each other are connected to the "+" terminals of the 4-input 1-output differential amplifier 396, while the reception conductors $X_m$ and $X_{m+3}$ are connected to the "−" terminals of the differential amplifier 396. Thus, an output signal similar to that obtained by carrying out an integration process is obtained as an output signal from the differential amplifier 396. Therefore, if the detection pattern of the present modification 17 is adopted, then there is no necessity to carry out an integration process, and consequently, accumulation of noise which may possibly occur when an integration process is carried out is eliminated. Further, since the differential amplification process is carried out, the noise resisting property can be further improved.

Since the present modification 17 is configured such that the number of output signals from a number of reception conductors 14 equals the total number of the transmission conductors 12 to which the same spread code or the reversed code having the sign reversed from the spread code is supplied, similarly to the modification 14, the minimum detection area $S_{min}$ on the sensor section becomes a square shape. As a result, an isotropic sensitivity distribution can be achieved in the minimum detection area on the sensor section. In this instance, for example, even if a pointer having a circular opposing surface is disposed on the sensor section, the opposing surface of the pointer can be detected as a circular shape.

While, in the foregoing description, the number of reception conductors to be connected to the differential amplifier is four, which is an even number, the present invention is not limited to this configuration. For example, the number of reception conductors 14 to be connected to the differential amplifier may be set to three or five, which are odd numbers.

[Modification 18]

While, in the modification 17 described above, the supply pattern of the spread codes and the reversed codes of the spread codes and the detection pattern of signals from the reception conductors are set to "−++−," the supply pattern of the spread codes and the reversed codes of the spread codes and the detection pattern of signals from the reception conductors may be set alternatively to "+−−+." In the following, the modification 18 is described in reference to FIG. 51, wherein the spread codes and the reversed codes of the spread codes are set to and supplied in the "+−−+" supply pattern, and the detection pattern is also set to "+−−+" such that the reception signals are differentially amplified by a differential amplifier.

If the present modification 18 is compared with the modification 17, then it is different in that the inverter 381 which reverses the sign of the spread code $C_k$ to be supplied from the spread code supplying circuit 21 to the transmission conductors is disposed such that the reversed signal is supplied to the two centrally located transmission conductors $Y_{n+1}$ and $Y_{n+2}$ among the four transmission conductors $Y_n$ to $Y_{n+3}$ to be selected by the transmission conductor selection circuit 382. Another difference is that the polarities of the four input terminals of a differential amplifier 397 are set to "+−−+" beginning with the reception conductor 14 having the highest index m. The other part of the modification 18 is the same as that of the modification 17 described hereinabove with reference to FIG. 50.

With the configuration of the modification 18, similar effects to those of the modification 17 are achieved. In particular, since there is no necessity to provide an integration process, accumulation of noise which is likely to occur when an integration process is carried out is eliminated. Also, since a differential amplification process is carried out, the noise resisting property can be further improved. Furthermore, since the total number of transmission conductors 12 to which the same spread code or the reversed code obtained by reversing the sign of the spread code is supplied equals the number of output signals from a number of reception conductors, the minimum detection area $S_{min}$ on the sensor section becomes a square shape. As a result, an isotropic sensitivity distribution can be achieved in the minimum detection area on the sensor section. In this instance, for example, even if a pointer having a circular opposing surface is disposed on the sensor section, the opposing surface of the pointer can be detected as a circular shape.

Figure 52:
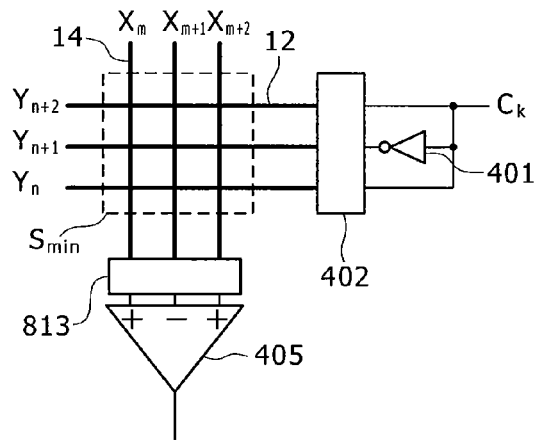
FIG. 52 is a diagrammatic view illustrating a general configuration for supply of a spread code and a reversed code to three transmission conductors positioned adjacent to each other according to a modification 19.
Figure 53:
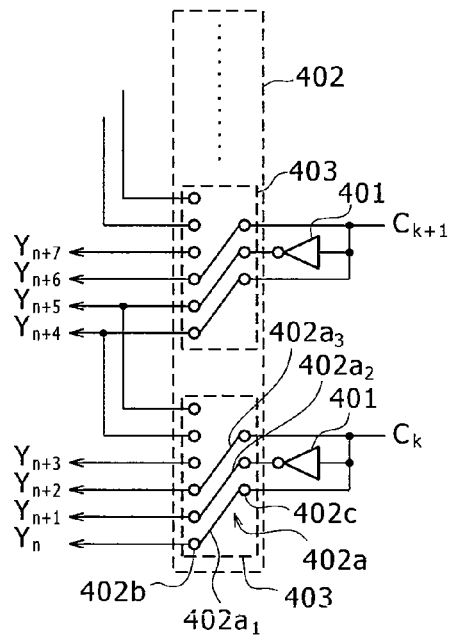
FIG. 53 is a schematic circuit diagram showing a general configuration of a transmission conductor selection circuit where a spread code and a reversed code are supplied to three transmission conductors positioned adjacent to each other in the modification 19.
Figure 54:
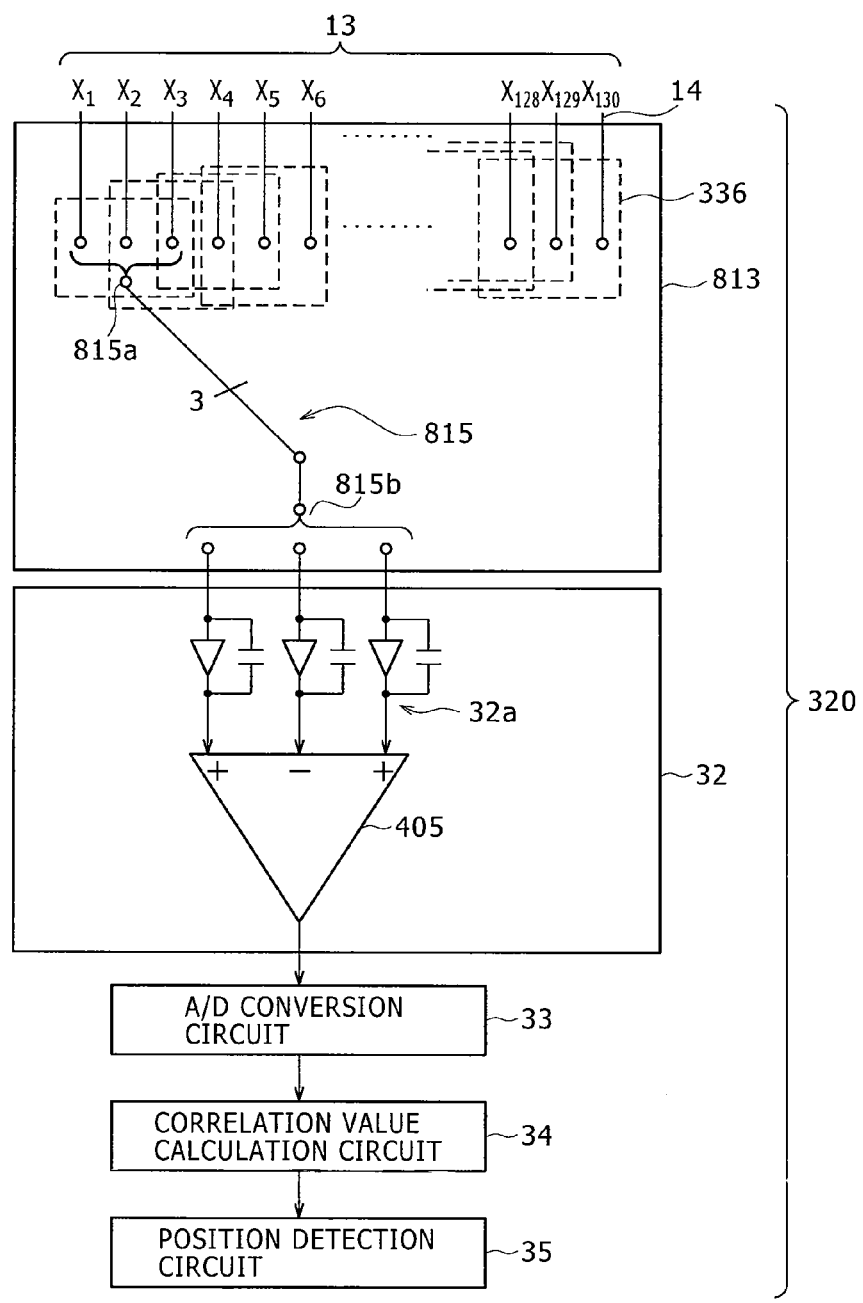
FIG. 54 is a block diagram showing a configuration of a reception section where a spread code and a reversed code are supplied to three transmission conductors positioned adjacent to each other in the modification 19.

In the modifications 16 to 18 described hereinabove with reference to FIGS. 47A to 51, the number of transmission conductors and the number of reception conductors to be selected by the transmission conductor selection circuit and the reception conductor selection circuit, respectively, are set to an even number. In a modification 19 described below, the number of transmission conductors and reception conductors to be selected is set to an odd number as shown in FIGS. 52 to 54. It is to be noted that, in the modifications 19 and 20 described below, the reception conductor array 13 includes 130 reception conductors 14.

[Modification 19]

First, a configuration of a modification 19 is described with reference to FIG. 52. FIG. 52 schematically shows a general configuration of a pointer detection apparatus wherein a 3-input 1-output differential amplifier is used for the amplification circuit 32 (shown in FIG. 1).

First, a general configuration of the modification 19 is described with reference to FIGS. 1 and 52. The transmission section 200 shown in FIG. 1 includes a spread code supplying circuit 21 for supplying spread codes $C_k$, a transmission conductor selection circuit 402 for selectively supplying the spread codes $C_k$ supplied from the spread code supplying circuit 21 to the transmission conductors 12, and an inverter 401 provided between the spread code supplying circuit 21 and the transmission conductor selection circuit 402 for inverting the spread code $C_k$ supplied from the spread code supplying circuit 21 to produce and output a reversed code $\overline{C_k}$. The spread code $C_k$ and the reversed code $\overline{C_k}$ are supplied to three transmission conductors $Y_n$ to $Y_{n+2}$ positioned adjacent to each other by the transmission conductor selection circuit 402. In particular, a spread code $C_k$ supplied from the spread code supplying circuit 21 is supplied to the two transmission conductors $Y_n$ and $Y_{n+2}$ through the transmission conductor selection circuit 402. Further, the spread code $C_k$ is inverted into the reversed code $\overline{C_k}$ by the inverter 401 and then supplied to the transmission conductor $Y_{n+1}$ through the transmission conductor selection circuit 402. In particular, in FIG. 52, the spread code supply pattern is "+−+." It is to be noted that the configuration of the other part of the transmission section 200 in the present modification 19 is the same as that in the first embodiment described hereinabove with reference to FIG. 1, and overlapping description of the same is omitted herein to avoid redundancy.

Next, details of the transmission conductor selection circuit 402 are described with reference to FIG. 53.

The transmission conductor array 11 is divided into 16 transmission blocks 403 each including six transmission conductors positioned adjacent to each other, and includes a number of switch groups 402a equal to the number of transmission blocks 403, that is, 16 switch groups 402a. In each of the transmission blocks 403, those two transmission conductors 12 which have relatively high indexes n among the six transmission conductors 12 which form the transmission block 403 are used commonly by another adjacent transmission block 403. In particular, as seen in FIG. 53, from among the transmission conductors $Y_n$ to $Y_{n+5}$ which form the transmission block 403, those two transmission conductors $Y_{n+4}$ and $Y_{n+5}$ having relatively high indexes are used commonly by an adjacent transmission block.

Each of the switch groups 402a includes three switches $402a_1$, $402a_2$ and $402a_3$. Six terminals 402b of each of the switch groups 402a on the output side are connected respectively to the corresponding transmission conductors $Y_n$ to $Y_{n+5}$. Further, input terminals 402c of the switches $402a_1$ and $402a_3$ among the three switches $402a_1$, $402a_2$ and $402a_3$ are connected to the spread code production circuit 24 shown in FIGS. 1 and 3, which provide spread codes $C_1$ to $C_{16}$. The input terminal 402c of the switch $402a_2$ is connected to the spread code production circuit 24, which provides the spread codes $C_1$ to $C_{16}$, through the inverter 401.

As seen in FIG. 53, for example, the switch group 402a, to which the spread code $C_k$ and the reversed code $\overline{C_k}$ of the spread code $C_k$ are supplied, supplies the spread code $C_k$ to the transmission conductors $Y_n$ and $Y_{n+2}$ and supplies the reversed code $\overline{C_k}$ to the transmission conductor $Y_{n+1}$. Then, after the spread code $C_k$ and the reversed code $\overline{C_k}$ are supplied for a predetermined period of time, the switch group 402a switches the transmission conductors 12 to be connected to the spread code production circuit 24 so that the spread code $C_k$ is supplied to the transmission conductors $Y_{n+1}$ and $Y_{n+3}$ and the reversed code $\overline{C_k}$ is supplied to the transmission conductor $Y_{n+2}$. Thereafter, the switch group 402a successively and time-dependently switches the transmission conductors to be connected to the spread code production circuit 24. Then, after the spread code $C_k$ is supplied to the transmission conductors $Y_{n+5}$ and $Y_{n+3}$ and the reversed code $\overline{C_k}$ is supplied to the transmission conductor $Y_{n+4}$, the switch group 402a supplies the spread code $C_k$ again to the transmission conductors $Y_n$ and $Y_{n+1}$ and supplies the reversed code $\overline{C_k}$ again to the transmission conductor $Y_{n+1}$. Thereafter, the sequence of operations described above is repeated. In this manner, the spread code $C_k$ supplied from the spread code supplying circuit 21 and the reversed code $\overline{C_k}$ of the spread code $C_k$ are supplied to all of the transmission conductors 12 which form the transmission conductor array 11.

Next, details of a reception conductor selection circuit 813 in the modification 19 are described with reference to FIGS. 1, 52 and 54. As seen in FIG. 54, the reception section 320 in the present modification 19 includes a reception conductor selection circuit 813, an amplification circuit 32, an A/D conversion circuit 33, a correlation value calculation circuit 34 and a position detection circuit 35.

The reception conductor array 13 is divided into 43 detection blocks 336. Each of the detection blocks 336 includes three reception conductors $X_m$ to $X_{m+2}$ positioned adjacent to each other, that is, having consecutive indexes m. The reception conductors $X_m$ to $X_{m+2}$ which form each of the detection blocks 336 are used commonly by another adjacent detection block 336. In particular, in the present modification 19, the reception conductor array 13 is divided into detection blocks $\{X_1$ to $X_3\}$, $\{X_2$ to $X_4\}$, . . . , $\{X_{127}$ to $X_{129}\}$ and $\{X_{128}$ to $X_{130}\}$.

The reception conductor selection circuit 813 includes a switch group 815 including three switches. The switch group 815 has input terminals 815a respectively connected to corresponding reception conductors 14. The switch group 815 has output terminals 815b connected to input terminals of I/V conversion circuits 32a. The switch group 815 successively switches the detection block 336 to be connected to the I/V conversion circuits 32a at predetermined intervals of time. In particular, if it is assumed that the detection block $\{X_1$ to $X_3\}$ are first connected to the I/V conversion circuits 32a at the succeeding stage, then the detection block $\{X_2$ to $X_4\}$ are next connected to the I/V conversion circuits 32a at a next interval of time. Thereafter, the reception conductor selection circuit 813 successively switches the detection block 336 at predetermined intervals of time, and then, after the last detection block $\{X_{128}$ to $X_{130}\}$ is connected to the I/V conversion circuits 32a, the reception conductor selection circuit 813 again connects the first detection block $\{X_1$ to $X_3\}$ to the I/V conversion circuits 32a. Thereafter, the sequence of operation described above is repeated. Then, output signals from the reception conductors 14 are converted into voltage signals by the I/V conversion circuits 32a and input to a differential amplifier 405.

The amplification circuit 32 is formed of three I/V conversion circuits 32a and a differential amplifier 405. Output terminals of the I/V conversion circuits 32a are respectively connected to different input terminals of the differential amplifier 405. Here, the I/V conversion circuits 32a are connected in the following manner. In particular, the I/V conversion circuit 32a connected to the reception conductor $X_m$ having the lowest index m and the I/V conversion circuit 32a connected to the reception conductor $X_{m+2}$ having the highest index m are connected to non-negated (+) input terminals of the differential amplifier 405, while the remaining I/V conversion circuit 32a is connected to a negated (−) input terminal of the differential amplifier 405.

The differential amplifier 405 is a 3-input 1-output differential amplifier. The three input terminals of the differential amplifier 405 are set such that the polarity of those input terminals, to which the reception conductor $X_m$ having the lowest index m and the reception conductor $X_{m+2}$ having the highest index m among the three reception conductors $X_m$ to $X_{m+2}$ selected by the reception conductor selection circuit 813 are connected, is "+." The polarity of the remaining input terminal, to which the remaining reception conductor $X_{m+1}$ is connected, is "−." The differential amplifier 405 is configured such that the amount of amplification it applies to a signal input from the "−" input terminal is twice as much as the amount of amplification it applies to a signal input to the "+" input terminal. This way, since a single reception conductor 14 is connected to the "−" terminal of the differential amplifier 405 in the present modification 19 while two reception conductors 14 are connected to the "+" terminals of the differential amplifier 405, the levels of the differentially-amplified signals become equal to each other, or in other words, the output signal of the differential amplifier becomes zero (canceled out). The differential amplifier 405 differentially amplifies output signals from the reception conductors 14 and outputs a resulting signal to the A/D conversion circuit 33 at the succeeding stage. It is to be noted that, in FIG. 54, a plurality of I/V conversion circuits 32a and a plurality of switch groups 815 are omitted in order to simplify the illustration. Further, since the configuration of the other part of the reception section 320 is the same as that of the first embodiment described hereinabove with reference to FIG. 1, overlapping description of the same is omitted herein to avoid redundancy.

Figure 31:
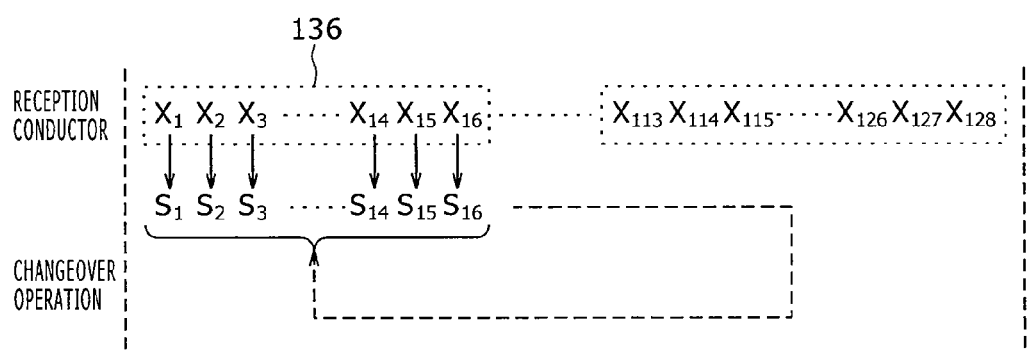
FIG. 31 is a diagrammatic view illustrating switching of reception conductors by the reception conductor selection circuit shown in FIG. 30.

The reception conductor selection circuit 813 carries out selective switching similar to those in the modification 4 illustrated in FIG. 31 and the modification 16 illustrated in FIG. 49. In particular, the switch group 815 of the reception conductor selection circuit 813 connects the reception conductors $X_m$ and $X_{m+2}$ to the "+" terminals of the differential amplifier 405, and connects the reception conductor $X_{m+1}$ to the "−" terminal of the differential amplifier 405 in the order beginning with the reception conductors $X_1$ to $X_3$ having the lowest indexes as seen in FIG. 54. In short, the two "+" terminals of the differential amplifier 405 are connected to the reception conductors $X_1$ and $X_3$ and the "−" terminal of the differential amplifier 405 is connected to the reception conductor $X_2$. Then, after a predetermined interval of time elapses, the switch group 815 of the reception conductor selection circuit 813 switches to the reception conductors positioned in the direction in which the index m increases, from the reception conductors 14 previously connected to the differential amplifier 405, that is, the reception conductors $X_2$ and $X_4$ are newly connected to the "+" terminals of the differential amplifier 405 and the reception conductor $X_3$ is newly connected to the "−" terminal of the differential amplifier 405. Then, after the switching, new output signals are obtained from the reception conductors $X_2$ to $X_4$ connected to the switch group 815. Thereafter, the switch group 815 of the reception conductor selection circuit 813 successively switches the reception conductors 14 to be connected to the differential amplifier 405 at predetermined intervals of time. Then, after the last group of reception conductors $X_{128}$ to $X_{130}$ to be connected to the differential amplifier 405 are so connected, the switch group 815 of the reception conductor selection circuit 813 returns to the initial state, that is, the state illustrated in FIG. 54. Thereafter, the sequence of operations described above is repeated.

Then, upon such switching as described above, the differential amplifier 405 differentially amplifies an output signal input thereto from the reception conductors $X_m$ and outputs a resulting signal to the A/D conversion circuit 33 at the succeeding stage (see FIG. 1). Thereafter, the output signal digitally converted by the A/D conversion circuit 33 is subjected to correlation calculation by the correlation value calculation circuit 34, and a correlation value which results from the correlation calculation is stored in the correlation value storage circuit 34d (see FIG. 8).

Where the detection pattern of output signals is set to "+−+" as in the present modification 19, the polarity of the three input terminals of the differential amplifier 405 is leftwardly and rightwardly symmetrical with respect to the polarity of the central input terminal. Therefore, similarly as in the modification 17, a result similar to the result obtained by carrying out an integration process upon position detection can be obtained, as illustrated in FIG. 50B. Accordingly, in the present modification 19, similar effects to those achieved by the modification 17 can be achieved. In particular, since there is no necessity to provide an integration circuit at the succeeding stage, accumulation of noise which is likely to occur where an integration process is carried out is eliminated. Additionally, since a differential signal process is involved, the noise resisting property can be further improved.

In the present modification 19, the number of signals from a number of reception conductors 14 equals the total number of the transmission conductors 12 to which the same spread code $C_k$ or the reversed code $\overline{C_k}$ having the sign reversed from the spread code $C_k$ is supplied, similarly as in the modifications 14 and 17. Thus, an isotropic sensitivity distribution can be obtained in the minimum detection area on the sensor section 100. In this instance, for example, even if a pointer having a circular opposing surface is disposed on the sensor section, the opposing surface of the pointer can be detected as a circular shape.

[Modification 20]

While, in the modification 19, the supply pattern and the detection pattern of spread codes are "+−+," they may alternatively be "−+−." In the following, a modification 20 wherein the detection pattern is set to "−+−" is described.

Figure 55:
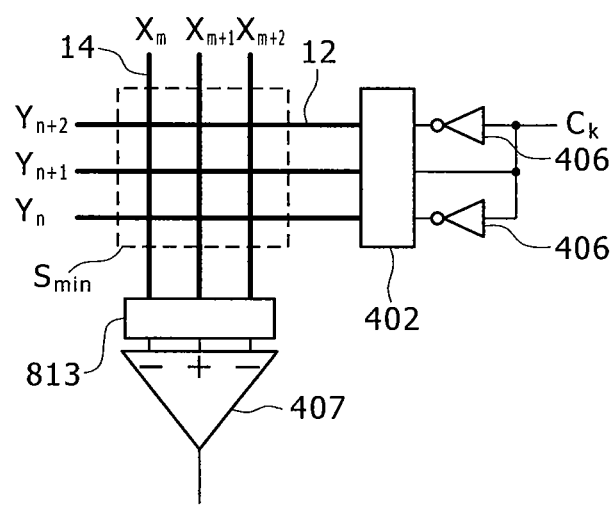
FIG. 55 is a diagrammatic view illustrating a general configuration for supply of a spread code and a reversed code to three transmission conductors positioned adjacent to each other according to a modification 20.

A general configuration of the present modification 20 is described with reference to FIG. 55. If the present modification 20 is compared with the modification 19 described hereinabove with reference to FIG. 52, then it has the following differences. In particular, two inverters 406 for inverting the spread code $C_k$ supplied from the spread code supplying circuit 21 and outputting a resulting reversed code $\overline{C_k}$ are interposed between the spread code supplying circuit 21 and the transmission conductor selection circuit 402. The reversed code $\overline{C_k}$ is supplied to the transmission conductors $Y_n$ and $Y_{n+2}$ positioned on the opposite ends among the three transmission conductors $Y_n$ to $Y_{n+2}$ selected by the transmission conductor selection circuit 402. The polarity of the three input terminals of a 3-input 1-output differential amplifier 407 is set such that the polarity of those input terminals connected to the reception conductor $X_m$ having the lowest index m and the reception conductor $X_{m+2}$ having the highest index m among the three reception conductors $X_m$ to $X_{m+2}$ selected by a reception conductor selection circuit 813 is "−," and the polarity of the input terminal to which the remaining one reception conductor $X_{m+1}$ is connected is "+." Since the configuration of the other part of the present modification 20 is the same as that of the modification 19 described hereinabove, overlapping description of the same configuration is omitted herein to avoid redundancy.

In the modification 20, the polarity of the three input terminals of the differential amplifier 407 is leftwardly and rightwardly symmetrical with respect to the polarity of the central input terminal. Accordingly, in the present modification 20 also, a result similar to the result obtained by carrying out an integration process upon position detection as illustrated in FIG. 50B can be obtained. Accordingly, in the present modification 20 also, similar effects to those achieved by the modifications 17 and 19 can be achieved. In particular, since there is no necessity to provide an integration process, accumulation of noise which is likely to occur where an integration process is carried out is eliminated. Additionally, since a differential signal process is involved, the noise resisting property can be further improved.

8. Eighth Embodiment

Detection of Hovering

The pointer detection apparatus to which the present invention is applied not only may be incorporated in a liquid crystal display apparatus, but also may be formed as a stand-alone pointer detection apparatus separate from a liquid crystal display apparatus. The stand-alone application is similar to an existing position detection apparatus that incorporates an electromagnetic induction system, for example.

A liquid crystal display apparatus which incorporates an existing pointer detection apparatus is usually formed such that the detection area of the pointer detection apparatus and the display area of the liquid crystal display apparatus overlap with each other. Therefore, a user can point to a desired position by pointing, by means of a pointer such as a finger, to a position at which an object such as an icon or a tool bar which the user wants to point to or select is displayed.

On the other hand, a pointer detection apparatus and a liquid crystal display apparatus may also be formed as two separate devices, for example, in the case of a touch pad or a digitizer of the electromagnetic induction type, which is incorporated into an existing personal computer as the computer's input device. In such cases, it is difficult for the user to intuitively grasp a relation between the position pointed to on the input device and the position on the liquid crystal display apparatus. Therefore, to allow a user to visually recognize the correspondence between the position on the input device that the user is pointing to and the position on the liquid crystal display apparatus, some of these existing input devices allow detection of a pointer that is positioned merely in the proximity of the input device, that is, the pointer that is not in direct contact with the detection section of the input device but is "hovering" over the detection section (this state is hereinafter referred to as a "hovering state").

However, where the pointer is in a hovering state, that is, where the pointer is positioned a little above the surface of the sensor section 100 (e.g., the second substrate 17 in FIG. 12A or 12B), the detection sensitivity is rather low and, also, the influence of noise becomes more significant. Therefore, it is difficult to carry out an accurate position detection of a pointer in a hovering state.

[Modification 21]

A modification 21 is directed to a discrimination technique suitable for discriminating (determining) with a higher degree of accuracy whether or not a pointer is in a hovering state, and is described with reference to FIGS. 56A to 58. FIGS. 56A and 56B illustrate a state wherein a finger 19 as a pointer touches the sensor section 100 as illustrated in FIG. 12B and a level curve of a detection signal (correlation value) obtained in this state, respectively. FIGS. 57A and 57B illustrate another state wherein the finger 19 is spaced above the sensor section 100, that is, in a hovering state, and a level curve of a detection signal (correlation value) obtained in this state, respectively. FIG. 58 illustrates a map showing a distribution of level values of the detection signals (correlation values) obtained, at a certain point of time, over a region in the proximity of a cross point that is in the state illustrated in FIG. 57A. In the following, a state wherein the finger 19 touches is compared with another state wherein the finger 19 does not touch, that is, wherein the finger 19 is in a hovering state.

First, in the state wherein the finger 19 touches the surface of the sensor section 100 as seen in FIG. 56A, part of an electric field emerging from a transmission conductor 12 converges to the finger 19 and part of the current flowing from the transmission conductor 12 to a reception conductor 14 is shunted to the ground through the finger 19, as described hereinabove in the description of the first embodiment with reference to FIGS. 12A and 12B. As a result, since the current flowing into the reception conductor 14 decreases, the signal level indicated by a level curve 420 increases steeply in the region contacted by the finger 19, in comparison to the other region that is not contacted by the finger 19, and the signal level exhibits a peak 420a in the region contacted by the finger 19 as seen in FIG. 56B.

In contrast, in the state wherein the finger 19 does not touch the surface of the sensor section 100 (in a hovering state) as seen in FIG. 57A, very small part of an electric field emerging from the transmission conductor 12 converges to the finger 19, so that only a portion of the current flowing from the transmission conductor 12 to the reception conductor 14 is shunted to the ground through the finger 19. As a result, the current flowing into the reception conductor 14 decreases by a small amount. Therefore, a level curve 421 still exhibits the highest signal level in a region where the finger 19 is positioned most closely to the surface of the sensor section 100, shown as a peak 421a in FIG. 57B, but the value of the peak 421a is lower than that of the peak 420a exhibited when the finger 19 is touching the sensor section 100 (FIG. 56B). Consequently, the level curve 421 indicates a broadened (flattened) form as seen in FIG. 57B.

In the hovering state discrimination technique in the present modification 21, a ratio between a gradient of an edge and a peak value of the level curve is determined and is compared with a predetermined threshold value to determine whether or not the finger 19 is in a hovering state.

FIG. 58 is a distribution map of level values of the detection signal (correlation values) obtained at a certain point of time in a region in the proximity of a cross point over which the finger 19 is positioned. It is to be noted that FIG. 58 illustrates level values obtained at 3×3 cross points and the values are in a normalized form. The ratio between the peak value and the gradient of the edge is calculated, and the resulting ratio is compared with a predetermined threshold value, for example, 0.7.

In the example illustrated in FIG. 58, a maximum value "100" of the level is obtained at the central cross point, and another level value "50" is obtained at cross points at the positions leftwardly, rightwardly, upwardly and downwardly of the central cross point. The gradient of the edge of the level curve 421 of the detection signal (correlation value) can be obtained by determining the difference between the peak value, which is indicated by the length of a double-sided arrow mark in FIG. 57B (i.e., the level value "100" in the central grid of FIG. 58), and the level value at a cross point adjacent to the cross point at which the peak value is obtained (e.g., the level value "50" adjacent to the central grid of "100" in FIG. 57B). For example, in the case of FIGS. 57A and 57B, since the peak value of the level curve is "100" at the central grid of FIG. 58, the gradient of the edge can be calculated as 100−50=50. Accordingly, the ratio between the gradient of the edge and the peak value of the level curve is (gradient of the edge/peak value)=50/100=0.5. Thus, in this example based on the level values illustrated in FIG. 58, it is determined that the pointer 19 is in a hovering state. On the other hand, if the ratio between the gradient of the edge and the peak value of the level curve 421 is higher than a predetermined threshold value (for example, 0.9), it is determined that the pointer 19 is in a state wherein it is touching the surface of the sensor section 100.

While, in the description of the example illustrated in FIG. 58, one predetermined threshold value is used for determining the presence or absence of a hovering state, the present invention is not limited to this configuration. For example, it is possible to provide a second threshold value lower than the predetermined threshold value such that the ratio between the gradient of the edge and the peak value of the level curve is compared additionally with the second threshold value to more precisely determine the degree of the hovering state, such as the distance between the sensor section and the pointer.

It is to be noted that, in the discrimination technique described above, though not shown in the figure, the calculation may be carried out, for example, by the position detection circuit 35 provided in the reception section 300 shown in FIG. 1 or by an external computer.

While, in the modification 21 described hereinabove, the discrimination of a hovering state is carried out directly based on the level curve of the detection signal, that is, based on the mapping data of the level values, the present invention is not limited to this configuration. The level curve of the detection signal may be subjected to a suitable nonlinear process such that a hovering state can be determined based on the characteristic obtained by the nonlinear process.

For example, logarithmic conversion may be carried out as a nonlinear process for the level curve of the detection signal (correlation value). Where nonlinear process is not carried out, the level of the detection signal obtained when the pointer 19 is touching the surface of the sensor section 100 can be extremely high at a location at which the pointer 19 touches the sensor section 100, while the level of the detection signal can be extremely low at another portion at which the pointer 19 is spaced away from the surface of the sensor section 100. Therefore, since the level of the detection signal exhibits an extreme difference between the two cases described above (and is extremely low where the pointer 19 is spaced away from the sensor section), it is difficult to accurately recognize a state wherein the pointer 19 is spaced only slightly from the surface of the sensor section 100.

If a predetermined signal conversion such as, for example, a logarithmic conversion is carried out for the level curve of the detection signals (correlation values), then it is possible to make a signal portion of a relatively low level in the detection signal more conspicuous while suppressing a signal portion having a relatively high level. In other words, the shape of the peak portion of the level curve after the logarithmic conversion is broadened (flattened) and the maximum value thereof is suppressed. This way, the transition of the level value near the boundary between the touched state and the non-touched (hovering) state of the pointer becomes continuous, and a hovering state can be readily recognized even if the hovering state is such that the pointer 19 is spaced only slightly from the sensor section 100. Consequently, the recognition characteristic of the pointer detection apparatus can be improved.

[Modification 22]

Next, an example of a configuration wherein position detection of a pointer can be carried out with certainty even where the pointer is in a hovering state is described with reference to FIGS. 59 and 60.

Figure 59:
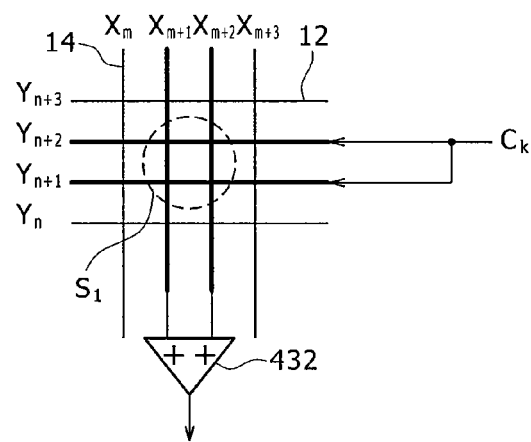
FIGS. 59 and 60 are diagrammatic views illustrating different adjustment methods of the aperture ratio of a detection level distribution on a detection surface upon position detection according to a modification 22.
Figure 60:
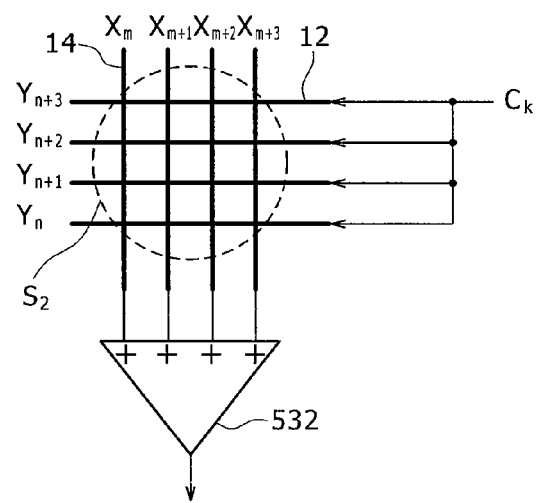

FIG. 59 illustrates a concept of a relationship between a supply pattern of a spread code $C_k$ and a detection pattern of an output signal in a minimum detection area $S_1$ where a pointer 19 is positioned in the proximity of the sensor section 100 (see FIG. 1). FIG. 60 illustrates a concept of another relationship between a supply pattern of a spread code $C_k$ and a detection pattern of an output signal in a minimum detection area $S_2$ where the pointer 19 is positioned relatively farther away from the sensor section 100.

First, a switching operation regarding how many conductors are to be selected, i.e., a switching operation of the "selection number" of transmission conductors 12 and reception conductors 14 is described. The switching of the selection number is carried out based on a decision regarding whether or not the pointer 19 is in a hovering state, as described, for example, in the foregoing description of the modification 21. In particular, the ratio between the gradient of the edge and the peak value of a level curve is determined, and the determined ratio is compared to a predetermined threshold value to determine whether or not the pointer 19 is in a hovering state. If it is determined that the pointer 19 is in a hovering state, then the transmission conductor selection circuit and the reception conductor selection circuit shown in FIG. 1 are controlled so that a plurality of transmission conductors 12 and a plurality of reception conductors 14 are selected. The determination of a hovering state is carried out, for example, by the position detection circuit 35 described hereinabove with reference to FIGS. 1, 39 and so forth, and when it is determined that the pointer 19 is in a hovering state, the position detection circuit 35 outputs a predetermined signal to the control circuit 40 described hereinabove with reference to FIG. 1 and so forth. Then, when a predetermined signal is input from the position detection circuit 35, the control circuit 40 controls the transmission conductor selection circuit 22 and the reception conductor selection circuit 31 so that a predetermined spread code $C_k$ is supplied to a plurality of transmission conductors 12 and a correlation value is calculated based on output signals from a plurality of reception conductors 14.

Next, details of the switching operation described above are described. In the following description, it is assumed that a spread code $C_k$ can be supplied to a plurality of transmission conductors $Y_n$ and an amplifier (432/532) having a plurality of input terminals whose polarity is "+" is used for the amplification circuit 32 of the reception section 300, such that an output signal of an arbitrary reception conductor $X_m$ is detected by the amplifier 432/532.

First, as seen in FIG. 59, when the pointer 19 touches the surface of the sensor section 100, the spread code $C_k$ is supplied to two transmission conductors $Y_{n+1}$ and $Y_{n+2}$, and the amplifier 432 provided in the amplification circuit 32 of the reception section 300 amplifies and outputs output signals from two reception conductors $X_{m+1}$ and $X_{m+2}$.

Then, if the pointer 19 such as a finger is spaced from the surface of the sensor section 100, then since the ratio between the gradient of the edge and the peak value of the level curve becomes lower than a predetermined threshold value, it is determined that the pointer 19 is in a hovering state. Consequently, the control circuit 40 controls the transmission conductor selection circuit 22 and the reception conductor selection circuit 231 (see FIG. 39) based on a predetermined signal received from the position detection circuit 35, to connect the spread code supplying circuit 21 and the transmission conductor array 11 so that the spread code $C_k$ is supplied to the four transmission conductors $Y_n$ to $Y_{n+3}$. Similarly, the control circuit 40 controls the reception conductor selection circuit 231 to connect the four reception conductors $X_m$ to $X_{m+3}$ to the input terminals of the amplifier 532 provided in the amplification circuit 32. Consequently, the detection area changes from a detection area $S_1$ in the state wherein the pointer 19 touches the surface of the sensor section 100 as seen in FIG. 59, to another detection area $S_2$ having a broader range for detection as seen in FIG. 60.

In this instance, the supply pattern of the spread code $C_k$ in the transmission section 200 and the detection pattern of a signal in the reception section 300 may be, for example, "++" or "+−."

As described hereinabove, in the present modification 22, where it is determined that the pointer 19 is in a hovering state, control is carried out so as to increase the number of transmission conductors 12 and reception conductors 14 so that the number of transmission conductors 12 to which the same spread code $C_k$ is to be supplied and the number of reception conductors 14 to be connected to the amplifier at the same time are increased, thereby enhancing the detection sensitivity. This makes it possible to carry out position detection of the pointer 19 in a hovering state with a higher degree of certainty.

While, in the present modification 22 described above, the number of transmission conductors and reception conductors to be selected is adjusted to two or four in response to a determined state of a pointer, the present invention is not limited to this configuration. For example, the number of transmission conductors and reception conductors to be selected can be set arbitrarily. As a specific example, a plurality of threshold values for a peak value of the detection signal may be set in advance such that a peak value is compared with the plurality of threshold values and the number of transmission conductors and reception conductors to be selected can be gradually increased as the peak value decreases successively below the threshold values. Further, the number of transmission conductors to be selected and the number of reception conductors to be selected need not be equal to each other. Still further, the adjustment of the numbers of transmission conductors 12 and reception conductors 14 to be selected need not be carried out for both of the transmission conductors 12 and the reception conductors 14, but may be carried out only for the transmission conductors 12 or for the reception conductors 14.

Figure 18:
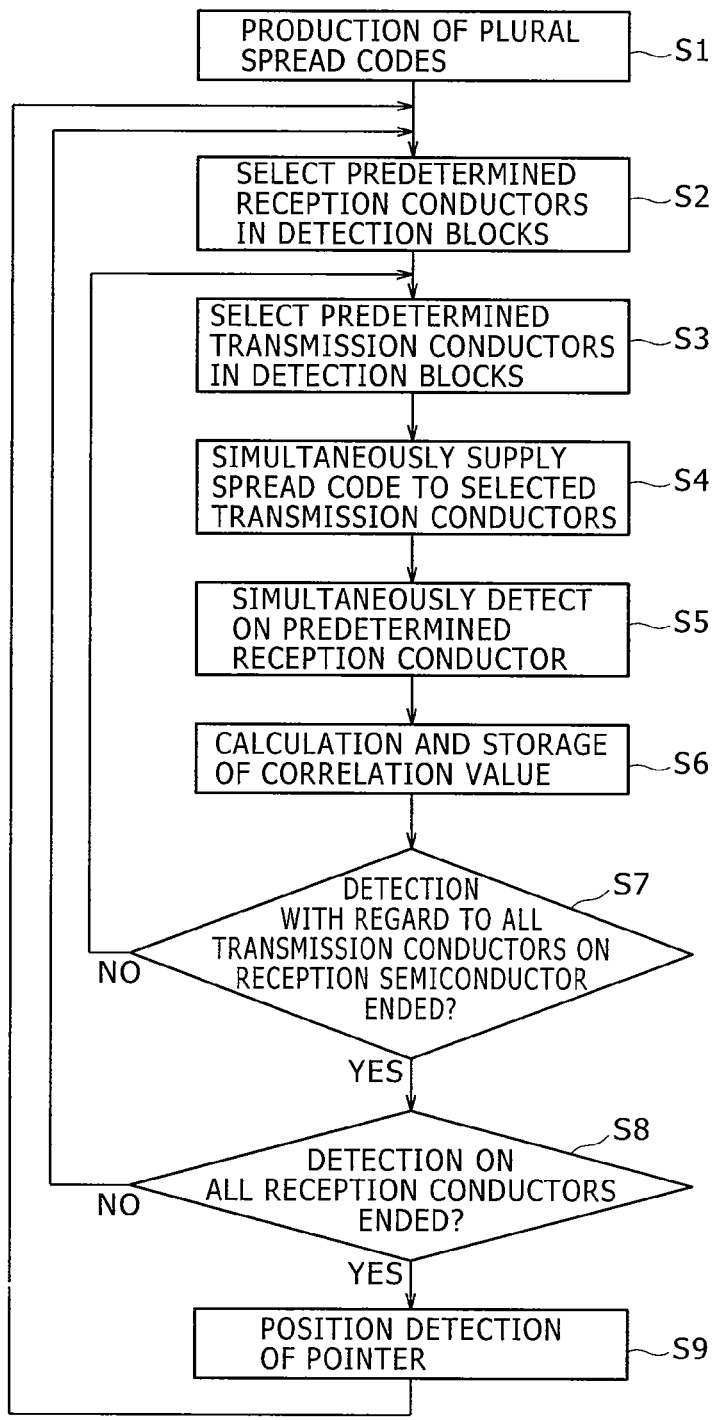
FIG. 18 is a flow chart illustrating a processing procedure for position detection by the pointer detection apparatus of FIG. 1.

The pointer detection apparatus periodically carries out a detection process, that is, scanning, of a variation of current over all cross points on the sensor section in order to detect a pointer even when no pointer is touching the pointer detection apparatus, for example, in order to immediately detect a pointer such as a finger (see FIG. 18). It is to be noted that, in the following description, to carry out a detection operation using all of the transmission conductors and the reception conductors is referred to as "all scanning." For all scanning, a high detection sensitivity and a high speed are demanded so that a pointer can be detected immediately and with certainty.

However, if all scanning is carried out for the transmission conductors and the reception conductors per (in the unit of) one conductor or a small number of conductors at a time, a large number of points need to be scanned and a longer period of time is required to complete the all scanning.

[Modification 23]

In the following, a method of carrying out the all scanning with a high sensitivity and at a higher speed is described. Further, if an output signal is not detected from the sensor section, the number of transmission conductors and reception conductors to be used in a single cycle of a detection process (that is, the size of a minimum detection area) is increased so as to enlarge the detection area.

It is to be noted that the number of conductors to be selected can be set arbitrarily in response to the size of the sensor section, a required sensitivity, a desired detection speed, and so forth.

Those conductors whose number is to be increased or decreased may be both of the transmission conductors and the reception conductors or either the transmission conductors alone or the reception conductors alone. It is to be noted that, where the numbers of both of the transmission conductors and the reception conductors are to be increased or decreased, the numbers may be different from each other. Further, according to the present invention, various methods can be applied as long as the methods increase or decrease the effective area of the detection area for which signal detection is carried out.

It is to be noted that the number of transmission conductors and reception conductors to be used may be varied based not only on the presence or absence of a detection signal but also on the level of the detection signal. For example, when the level of the detection signal is higher than a predetermined threshold value set in advance, the number of conductors may be decreased, but when the level of the detection signal is lower than the predetermined threshold value, the number of conductors may be increased. Not one but two or more threshold values may be set. As the method of detecting the level of the detection signal, the technique described hereinabove in connection with the modification 21 with reference to FIGS. 56A to 58 may be used.

With the present modification 23, when a detection signal cannot be obtained from the sensor section, the all scanning can still be implemented with a high sensitivity and at a high speed by increasing the number of transmission conductors and reception conductors to be used for detection of a pointer to thereby expand the detection area.

[Modification 24]

In the first embodiment described hereinabove, the sensor section 100 includes the reception conductors 14 provided in the proximity of the detection surface, that is, adjacent to the second substrate 17 as described hereinabove with reference to FIG. 2. Since, in the sensor section 100 according to the first embodiment, the transmission conductors 12 are disposed at a position farther than the reception conductors 14 from the pointer 19, an electric field emerging from the transmission conductors 12 converges to the pointer 19 in a wider (expanded) path than an electric field which converges to the reception conductors 14, as seen in FIG. 12B. Therefore, even an electric field from a transmission conductor 12 on the outer side in the extension direction of the reception conductors 14 with respect to the position at which the pointer 19 is actually positioned may converge to the pointer 19.

In the following, this phenomenon is described with reference to FIG. 61. In the following, it is assumed that the transmission conductor selection circuit and the reception conductor selection circuit select five transmission conductors $Y_n$ to $Y_{n+4}$ and five reception conductors $X_m$ to $X_{m+4}$ at the same time to detect the pointer 19.

Figure 61:
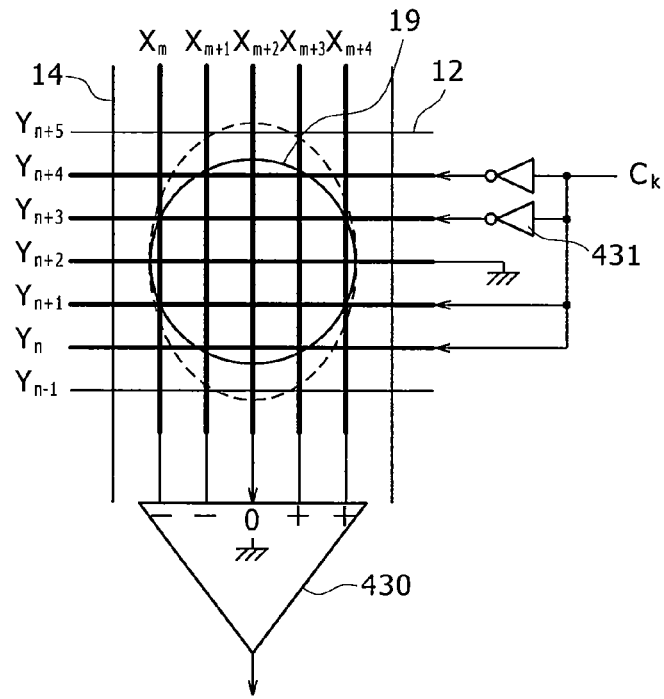
FIG. 61 is a diagrammatic view illustrating an adjustment method of the aperture ratio of a detection level distribution on a detection surface upon position detection according to a modification 24.

As seen in FIG. 61, the transmission conductor selection circuit supplies a spread code $C_k$ supplied from the spread code supplying circuit 21 to the transmission conductors $Y_n$ to $Y_{n+1}$ having relatively low indexes n among the selected five transmission conductors $Y_n$ to $Y_{n+4}$. Meanwhile, to the transmission conductors $Y_{n+3}$ and $Y_{n+4}$ having relatively high indexes n, the reversed code $\overline{C_k}$ produced by inversion of the spread code $C_k$ by means of an inverter 431 is supplied. Further, the centrally located transmission conductor $Y_{n+2}$ is grounded.

Similarly, the reception conductor selection circuit connects the reception conductors $X_{m+3}$ and $X_{m+4}$ having relatively high indexes m among the selected reception conductors $X_m$ to $X_{m+4}$ to the input terminals of the differential amplifier 430 whose polarity is "+," and connects the reception conductors $X_m$ and $X_{m+1}$ having relatively low indexes m to the input terminals of the differential amplifier 430 whose polarity is "−," and further connects the centrally positioned reception conductor $X_{m+2}$ to the ground. It is to be noted that, since the configuration of the other part of the present modification 24 is the same as that of the modification 12 described hereinabove with reference to FIG. 40, overlapping description of the same configuration is omitted herein to avoid redundancy.

When, for example, a pointer 19 of a substantially circular shape (a solid line in FIG. 61) is placed, then electric fields emerging from the transmission conductors $Y_{n-1}$ and $Y_{n+5}$, which are positioned adjacent to the transmission conductors $Y_n$ to $Y_{n+4}$ on which the pointer 19 is placed and thus are positioned on the outer sides of the transmission conductors $Y_n$ to $Y_{n+4}$ in the direction in which the reception conductors 14 extend, are absorbed by the pointer 19 and thus detected as indicated by a broken line in FIG. 61. This occurs more conspicuously where the distance between the transmission conductors 12 and the pointer 19 is relatively large, for example, where the spacer 16 interposed between the transmission conductors 12 and the reception conductors 14 is thick or where the pointer 19 to be detected is in a hovering state.

Therefore, in the present modification 24, in order to solve the problem described above, the detection width of the transmission conductor array 11, which is disposed relatively farther from the detection surface of the sensor section 100, is set relatively narrow while the detection width of the reception conductor array 13, which is disposed relatively nearer to the detection surface, is set relatively wide so that, on the detection surface, no difference will appear between the extent to which the level curve of the transmission signal supplied from the transmission section expands (i.e., the detection width) and the extent to which the level curve of the reception signal input to the reception section expands.

[Modification 25]

Figure 62:
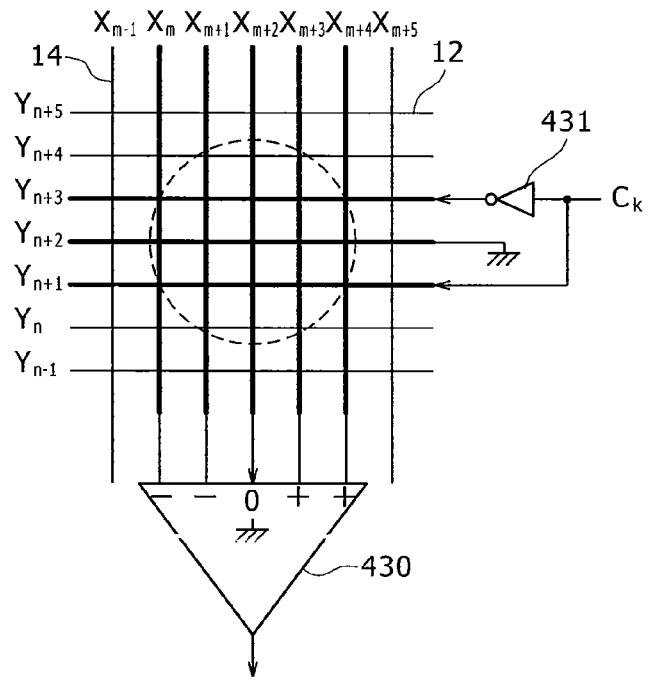
FIG. 62 is a diagrammatic view illustrating an adjustment method of the aperture ratio of a detection level distribution on a detection surface upon position detection according to a modification 25.

FIG. 62 illustrates a relationship between a supply pattern of a spread code used by the transmission section and a detection pattern of a signal used by the reception section according to the modification 25. In the following, the modification 25 is described with reference to FIGS. 39 and 62. FIG. 62 illustrates the case where the number of transmission conductors 12 to be selected by the transmission conductor selection circuit is reduced from five to three while the configuration of the other part is the same as that described hereinabove with reference to FIG. 61.

In the present modification 25, the reception conductor selection circuit 31 connects, for example, the reception conductors $X_m$ and $X_{m+1}$ and the reception conductors $X_{m+3}$ and $X_{m+4}$ positioned on the opposite ends among five arbitrary reception conductors $X_m$ to $X_{m+4}$ positioned adjacent to each other to input terminals of a differential amplifier. Also in the present modification 25, output signals from the reception conductors $X_m$ and $X_{m+1}$ selected by the reception conductor selection circuit 31 are converted into voltage signals by the I/V conversion circuit 32a (not shown) and supplied to input terminals of the differential amplifier 430. However, this is the same configuration as that of the modification 10 described hereinabove with reference to FIG. 39, and therefore, the reception conductor selection circuit 231 and the I/V conversion circuit 232a are not shown.

The transmission conductor selection circuit 22 selects three arbitrary transmission conductors $Y_{n+1}$ to $Y_{n+3}$ positioned adjacent to each other, and supplies a spread code to the transmission conductor $Y_{n+1}$ having the lowest index m among the selected three transmission conductors, and supplies a reversed code to the transmission conductor $Y_{n+3}$ having the highest index m, while it connects the centrally located transmission conductor $Y_{n+2}$ to the ground.

Where the number of transmission conductors $Y_n$ to be selected by the transmission conductor selection circuit 22 is smaller than the number of reception conductors $X_m$ to be selected by the reception conductor selection circuit 231 as in this example, the spread of the level curve of the transmission signals by the transmission section 200 on the detection surface becomes substantially the same as the spread of the level curve of the reception signals input to the reception section 310. In other words, the aperture ratio (aspect ratio) of the spread of the level curve by the transmission section 200 and the reception section 310 can be made close to 1. As a result, even if a pointer having a circular opposing surface is disposed on the sensor section 100, the opposing surface of the pointer can be detected not as an elliptic shape as indicated by a broken line in FIG. 61 but as a circular shape.

While, in the present modification 25 described above, the numbers of transmission conductors and reception conductors to be selected are different from each other so that the aperture ratio may become one, the present invention is not limited to this configuration. For example, the aperture ratio may be adjusted by making the shapes such as the widths of the transmission conductors and the reception conductors different from each other, or by making the arrangement patterns such as circular patterns or conjoined hexagonal patterns of the conductors or the pitches between the conductors different from each other between the transmission conductors and the reception conductors. Further, while FIG. 61 shows an example wherein a differential amplifier is used for the amplification circuit of the reception section, a single-input amplifier may be used instead.

[Modification 26]

In the pointer detection apparatus 1 of the first embodiment described hereinabove, an output signal output from an I/V conversion circuit 32a is amplified by an amplifier (not shown) so that it has a predetermined signal level and then converted into a digital signal by the A/D conversion circuit 33. The digital signal is then input to the correlation value calculation circuit 34 as seen in FIG. 1 so that correlation calculation can be carried out.

In this instance, there is a problem that, where the noise is higher than the reception signal, if the signal level of the output signal is always amplified, then the noise is amplified together with the reception signal. Then, the A/D converter, to which the amplified noise is input, clips the reception signal, resulting in failure of appropriate detection of the reception signal.

On the other hand, if the signal level of an output signal is always amplified, then when a pointer in a hovering state is to be detected, for example, as in the case of the modification 23, the change level (variation) of the reception signal becomes very low, making it difficult to detect a pointer.

Figure 63:
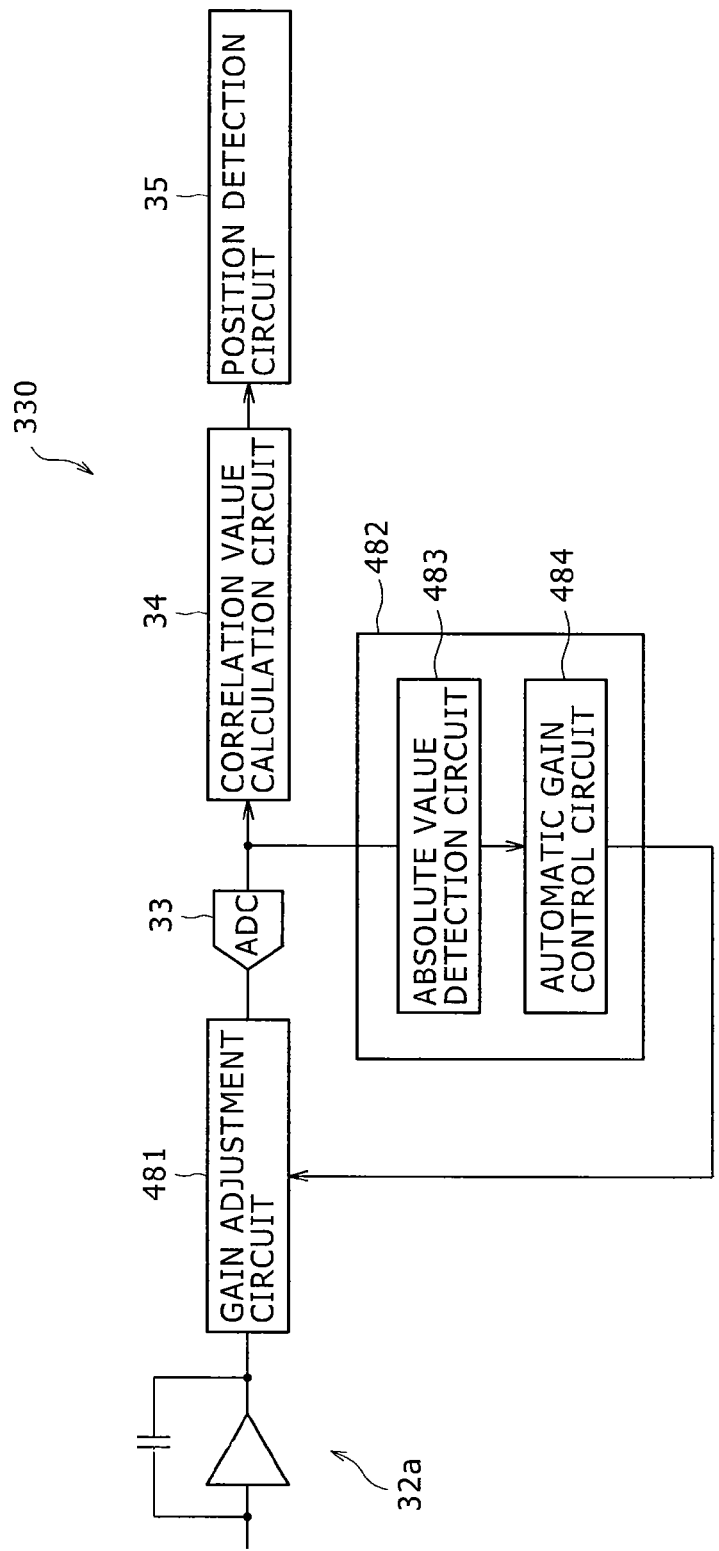
FIG. 63 is a block diagram showing a general configuration of a reception section according to a modification 26.
Figure 64:
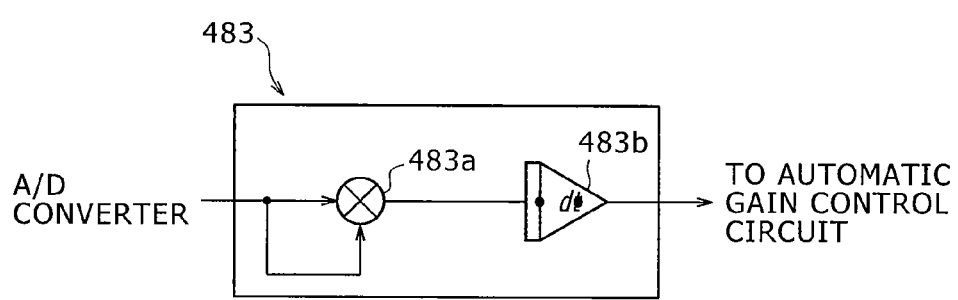
FIG. 64 is a block diagram showing a configuration of an absolute value detection circuit according to the modification 26.

In the following, the modification 26 is described with reference to FIGS. 63 and 64. FIG. 63 shows a general block configuration of a reception section 330 in the modification 26 and FIG. 64 shows a circuit configuration of an absolute value detection circuit which forms a gain value setting circuit hereinafter described. If the reception section 330 in the present modification 26 is compared with the reception section 300 in the first embodiment described hereinabove with reference to FIGS. 1, 6 and 8, then it is different in that a gain adjustment circuit 481 is provided in place of the amplifier (not shown) between an I/V conversion circuit 32a of the amplification circuit 32 and the A/D conversion circuit 33, and that a gain value setting circuit 482 is provided. Since the configuration of the other part of the reception section 320 in the present modification 24 is the same as the reception section 300 in the first embodiment described hereinabove with reference to FIG. 1, overlapping description of the same configuration is omitted herein to avoid redundancy.

The gain adjustment circuit 481 is provided in order to increase or decrease the signal level of a signal input thereto according to a predetermined signal level. The gain adjustment circuit 481 is provided between the I/V conversion circuit 32*a* of the amplification circuit 32 and the A/D conversion circuit 33 and carries out predetermined signal level variation based on a control signal from the gain value setting circuit 482 hereinafter described. Since the signal intensity of an energy component of the gain adjustment circuit 481 includes not only a signal component (spread code component) to be detected but also noise and so forth, the gain value setting circuit 482 sets a reception gain value based on the signal intensity of the energy component of the entire signal to be detected by the reception conductor selection circuit 31.

The gain value setting circuit 482 is provided in order to control the gain adjustment circuit 481 based on an output signal converted into a digital signal by the A/D conversion circuit 33. The gain value setting circuit 482 includes a gain value detection circuit 483 and an automatic gain control circuit 484.

The absolute value detection circuit 483 detects the signal intensity of the energy component of an output signal output from the A/D conversion circuit 33. Since the signal output from the A/D conversion circuit 33 includes not only the signal component (spread code component) to be detected but also an unnecessary signal component such as noise, the gain adjustment circuit 481 detects the signal intensity of the energy component of the entire detection signal which includes an unnecessary signal component such as noise.

The automatic gain control circuit 484 controls the gain of the gain adjustment circuit 481 based on the signal intensity detected by the absolute value detection circuit 483. The automatic gain control circuit 484 is connected to the absolute value detection circuit 483 and the gain adjustment circuit 481, and outputs a control signal to the gain adjustment circuit 481.

Next, a configuration of the absolute value detection circuit 483 is described with reference to FIG. 64. The absolute value detection circuit 483 includes an accumulator 483*a*, and another integrator 483*b* connected to an output terminal of the accumulator 483*a*.

The accumulator 483*a* performs squaring calculation of an output signal of the A/D conversion circuit 33 and outputs an output signal obtained by the calculation to the integrator 483*b*. It is to be noted that an output signal of the A/D conversion circuit 33 shown in FIG. 63 is branched and input to two input terminals of the accumulator 483*a* so that the branched signals are multiplied by the accumulator 483*a*. The integrator 483*b* temporally integrates an output signal of the accumulator 483*a* and outputs a resulting integration signal as a control signal to the automatic gain control circuit 484 and then to the gain adjustment circuit 481 shown in FIG. 63.

As described above, in setting the reception gain value in the present modification 26, the signal intensity of an energy component of a signal, which includes not only the signal component (spread code component) to be detected but also noise and so forth, is detected and the reception gain value is set based on the signal intensity. Thus, even if noise and so forth are superposed on the output signal input to the gain adjustment circuit 481, the reception gain value can be set optimally.

It is to be noted that, for the absolute value detection, any other suitable method can be used as long as the method can detect the level of a signal including both a signal component to be detected and noise. For example, in addition to the technique described above, a technique such as integrating the absolute value of the level of the output signal can be used. Further, as the absolute value detection process, either a digital signal process after A/D conversion or an analog signal process before A/D conversion may be used.

[Modification 27]

The pointer detection apparatus of the present invention makes it possible to detect a plurality of pointers such as fingers at the same time. Therefore, for example, the pointer detection apparatus of the present invention may be used by a plurality of users at the same time or may be operated by both hands of one user. As a result, the scale of the sensor section may become large in order to allow use of the sensor section with a plurality of pointers.

The embodiments and the modifications described hereinabove are configured such that the spread codes $C_k$ are supplied to one ends of the transmission conductors 12. However, if the scale of the sensor section increases, then the length of the transmission conductors 12 which serve as transmission lines for the spread codes $C_k$ as well as the length of the reception conductors 14 which serve as transmission lines for output signals increases correspondingly to the increase in the scale of the sensor section. Then, floating capacitance of the transmission lines for the spread codes $C_k$ may cause a drop of the level of the output signals or a delay in the phase of the detection signals. This problem is described particularly with reference to FIGS. 65A and 65B.

FIG. 65A illustrates a case where a spread code $C_k$ is supplied to an arbitrary transmission conductor $Y_k$, and FIG. 65B illustrates a variation of the signal level and the phase of a detection signal obtained with each reception conductor 14 when the spread code $C_k$ is supplied to the transmission conductor $Y_k$. It is to be noted that, in FIG. 65B, the axis of abscissa indicates the positions of reception conductors 14 and the axis of ordinate indicates the level of the detection signal and the phase. Further, FIG. 65B indicates the variation of detection signals from five reception conductors 14, that is, the reception conductors $X_m$, $X_{m+2}$, $X_{m+4}$, $X_{m+6}$ and $X_{m+8}$, for simplified illustration and description.

As seen in FIG. 65A, if the spread code $C_k$ of a supply signal is supplied to one end of the transmission conductor $Y_k$, that is, in the example of FIG. 65A, to the right end of the transmission conductor 12, then the signal level of the output signal of the reception conductors 14 drops by an increasing amount as the distance from the supply side of the spread code $C_k$ increases, that is, from the reception conductor $X_{m+8}$ positioned closest to the supply side toward the reception conductor $X_m$ positioned farther away from the supply side, due to the influence of the floating capacitance of the transmission conductor $Y_k$ serving as a transmission line. Similarly, the phase delay of the output signal increases as the distance from the supply side of the spread code $C_k$ increases.

As a result, both the signal level and the phase of the output signal decrease, starting from the reception conductor $X_{m+8}$ to the reception conductor $X_m$, as seen in FIG. 65B. Thus, the signal level difference and the phase difference of the output signals which appear between the reception conductor $X_{m+8}$ and the reception conductor $X_m$ make it difficult to calculate an accurate correlation value for position detection purposes, resulting in a drop in the detection sensitivity. Particularly, in the sensor section where an ITO film is used for the transmission conductors 12 and the reception conductors 14, the resistance value of the conductors is high, and the problem such as a drop in the signal level or a delay of the phase of the output signal becomes exacerbated.

Therefore, the present modification 27 is directed to a supplying method of a spread code which can eliminate the problem described above and is described with reference to FIGS. 66A and 66B. FIGS. 66A and 66B illustrate a supply pattern of a spread code $C_k$ in the present modification 27 and a variation characteristic of the level and the phase of the output signal.

The present modification 27 is different from the embodiments and the modifications described hereinabove in that the same spread code $C_k$ is supplied at the same time to the opposite ends of one transmission conductor $Y_k$, as seen in FIG. 66A. In order to implement this supply pattern, for example, in the configuration of the first embodiment, each output terminal of the spread code supplying circuit 21 shown in FIG. 1 is connected to the opposite ends of the transmission conductor $Y_k$.

Where the same spread code $C_k$ is supplied at the same time to the opposite ends of the transmission conductor $Y_k$ in this manner, the distance from the supply side of the spread code $C_k$, that is, from the opposite ends of the transmission conductor 12, to the reception conductor 14 positioned farthest, which is the centrally-located reception conductor $X_{m+4}$ in FIG. 66A, becomes one half of that in an alternative case where the spread code $C_k$ is supplied only to one end of the transmission conductor $Y_k$. As a result, although the level of the output signal is lowest at the reception conductor $X_{m+4}$ positioned farthest from the supply side of the spread code $C_k$, that is, from the opposite ends of the transmission conductor 12, the decreasing amount of the signal level and the phase delay of the output signal can be reduced in comparison with an alternative case wherein the spread code $C_k$ is supplied only to one end of the reception conductor 14. Consequently, the level difference and the phase difference among the reception conductors 14 are minimized, and the detection sensitivity can be maintained.

[Modification 28]

The modification 28 is directed to a method suitable to detect pressing force (hereinafter referred to as "pointing pressure") when a pointer such as a finger touches the detection surface of the sensor section of the pointer detection apparatus of the present invention.

According to a conventional technique, the pointing pressure is calculated based on the contact area between the pointer and the detection surface of the sensor section. However, the conventional technique is disadvantageous in that, for example, when a user having a thin finger strongly touches (with force) the detection surface of the sensor section, since the contact area remains relatively small, the touch is detected as a light touch.

Therefore, in the present modification 28, in order to eliminate such a problem as described above, the pointing pressure is detected using a spatial distribution or mapping data of the level of a detection signal (correlation value) at each cross point obtained upon position detection of a pointer. In the following, this technique is described particularly with reference to FIGS. 1, 67 and 68. It is to be noted that the detection of the pointing pressure is carried out by the position detection circuit 35 of the reception section 300 described hereinabove with reference to FIG. 1.

Figure 8:
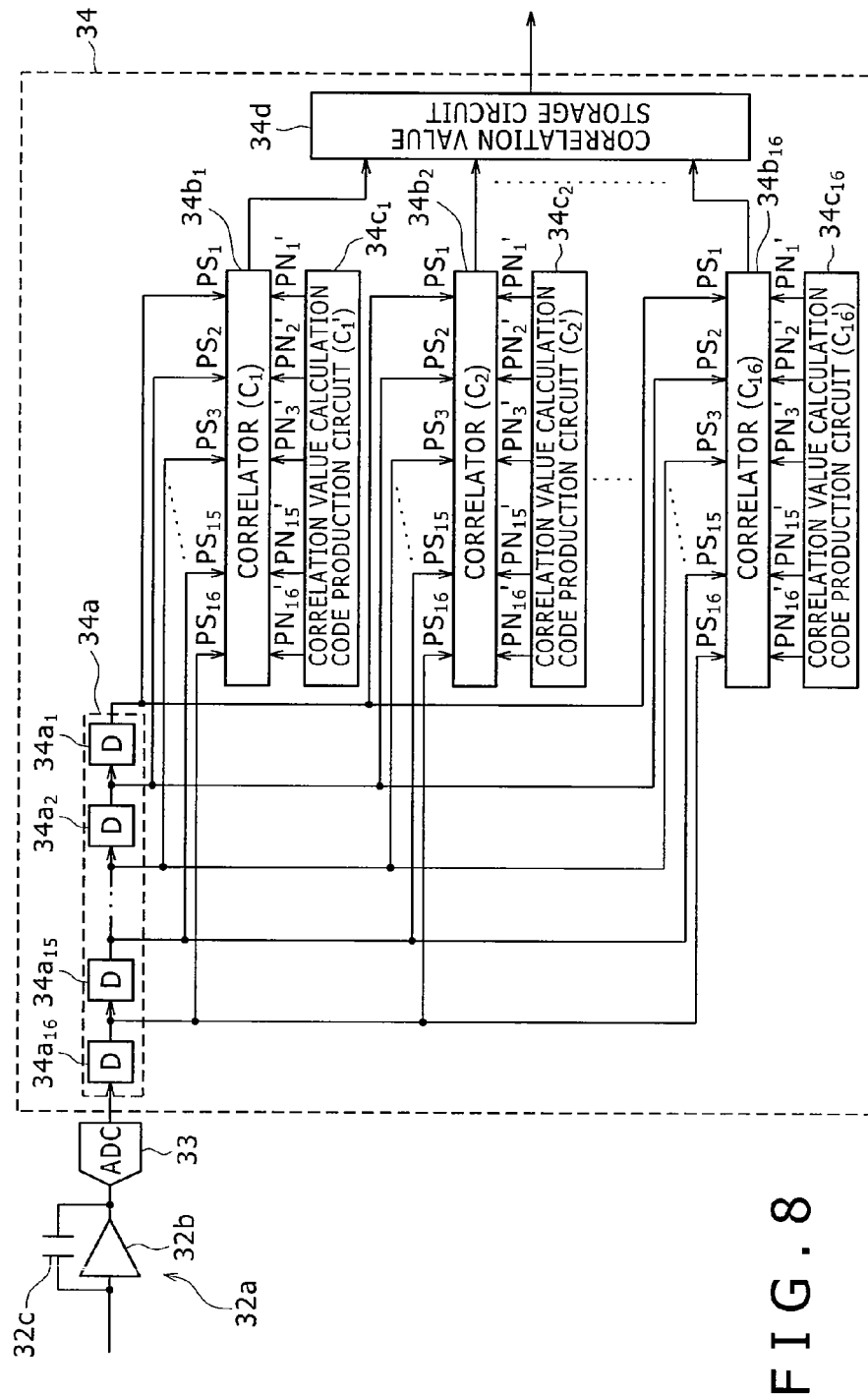
FIG. 8 is a block diagram of a correlation value calculation circuit of the pointer detection apparatus of FIG. 1.
Figure 67:
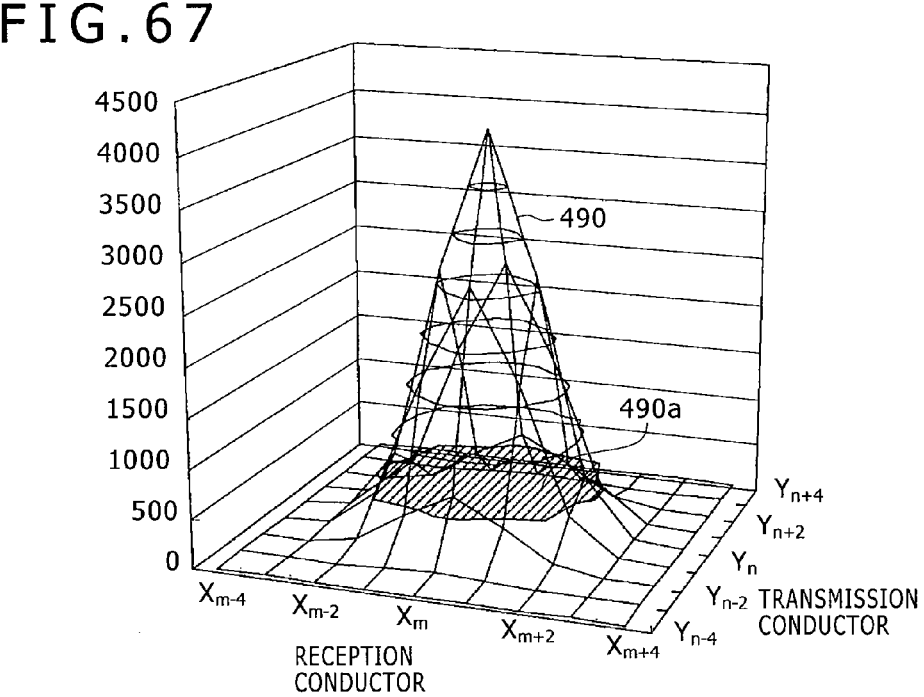
FIGS. 67 and 68 are diagrammatic views illustrating a principle of determination of a pointing pressure of a pointer according to a modification 28.

FIG. 67 illustrates a spatial variation of the level of the signal (correlation value) stored in the correlation value storage circuit 34d shown in FIG. 8 when a pointer touches the detection surface of the sensor section 100 shown in FIG. 2. In FIG. 67, the axis of abscissa represents the positions of the reception conductors 14 and the axis extending into the surface of the figure represents the positions of the transmission conductors 12, while the axis of ordinate represents the level of the detection signal (correlation value). It is to be noted that the level on the axis of ordinate is represented in a normalized value. Further, in the example illustrated in FIG. 67, a spatial distribution of the level of the detection signal is shown, where a pointer touches a cross point between the transmission conductor $Y_n$ and the reception conductor $X_m$, and a spatial distribution of the level only in an area defined by the transmission conductors $Y_{n-4}$ to $Y_{n+4}$ and the reception conductors $X_{m-4}$ to $X_{m+4}$ is shown for simplified illustration and description.

First, the position detection circuit 35 reads out the mapping data of the signal stored in the correlation value storage circuit 34d and applies an interpolation process or the like to the signal levels of the output signals at the cross points, thereby interpolating the signal levels between the cross points. Then, the position detection circuit 35 calculates a mountain-shaped level curved surface 490 which exhibits an apex or peak at the cross point $[X_m, Y_n]$ at which the pointer touches. While, in the example illustrated in FIG. 67, the level curved surface 490 is produced by applying an interpolation process or the like to the signal level of the output signal at each cross point, alternatively, the correlation values determined for the respective cross points may be first interpolated and the resulting interpolated data may be stored as mapping data in the correlation value storage circuit 34d, which may thereafter be used to produce the level curved surface 490.

Thereafter, a signal process of cutting the level curved surface 490 along a predetermined level plane 490a represented as a region indicated by slanting lines in FIG. 67 is carried out. Furthermore, another signal process of determining the volume of a region surrounded by the level curved surface 490 is carried out. It is to be noted here that the area of the level plane 490a is the contact area of the pointer.

Figure 68:
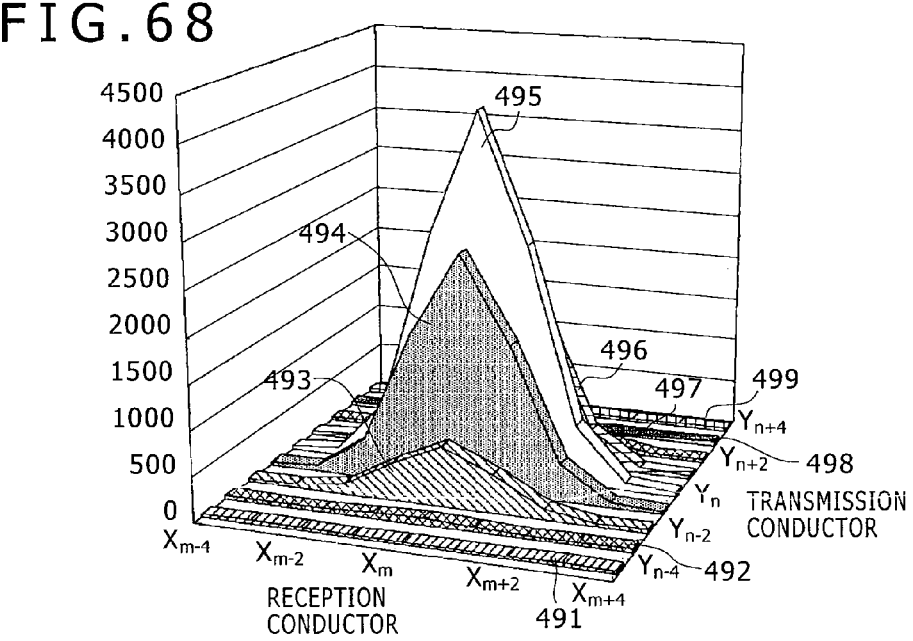

Here, a method of simply determining the volume of the region surrounded by the level curved surface 490 is described with reference to FIG. 68. First, the level curved surface 490 is divided into planes extending along the extension direction of the transmission conductors 12, as seen in FIG. 67. Consequently, divisional planes 491 to 499 are produced, for example, along the extension direction of the transmission conductors $Y_{n-4}$ to $Y_{n+4}$ as seen in FIG. 68.

Then, the areas $Sa_1$ to $Sa_9$ of the divisional planes 491 to 499 are determined. The calculated areas $Sa_1$ to $Sa_9$ are added, and a resulting sum value is used as an approximate value of the volume of the region surrounded by the level curved surface 490. The volume of the region surrounded by the level curved surface 490 has a value corresponding to the pointing pressure, and if the pointing pressure increases, then the volume correspondingly increases. Therefore, the pointing pressure can be determined based on the volume of the region surrounded by the level curved surface 490. In the present modification 28, the pointing pressure of the pointer is determined by carrying out the signal processing as just described.

It is to be noted that the volume of the region surrounded by the level curved surface 490, determined in the manner described above, may further be divided by the contact area. In this instance, a value corresponding to the pointing pressure per unit area of the contact area is calculated.

As described above, in the present modification 28, when a pointer touches the detection surface of the sensor section 100, the position detection circuit calculates a three-dimensional level curved surface of the detection signal (correlation value), and the volume of a region surrounded by the level curved surface is calculated to determine the pointing pressure. Therefore, the problem associated with the conventional pointing pressure detection method described hereinabove can be eliminated, and a pointing pressure that corresponds to the user's actual touch (a light touch, a strong touch, etc.) can be detected.

In the detection method of the pointing pressure described above, the level curved surface 490 is divided into a plurality of planes and the sum of the areas of the plural divisional planes, that is, an integration value of the areas, is determined and used as the volume of the level curved surface 490. The present invention, however, is not limited to this configuration. In order to calculate the volume of the level curved surface 490 with a higher degree of accuracy, the level values may be weighted-added as in a numerical analysis method. Further, the calculation method of the volume is not limited to the summing of divisional planes, and multi-dimensional curved surface approximation methods such as trapezoid approximation or square approximation methods may be used to calculate the volume.

Next, a procedure of determining the region surrounded by the level curved surface 490 using trapezoid approximation is described with reference to FIG. 69, wherein the areas of the divisional planes are weighted-added.

Figure 69:
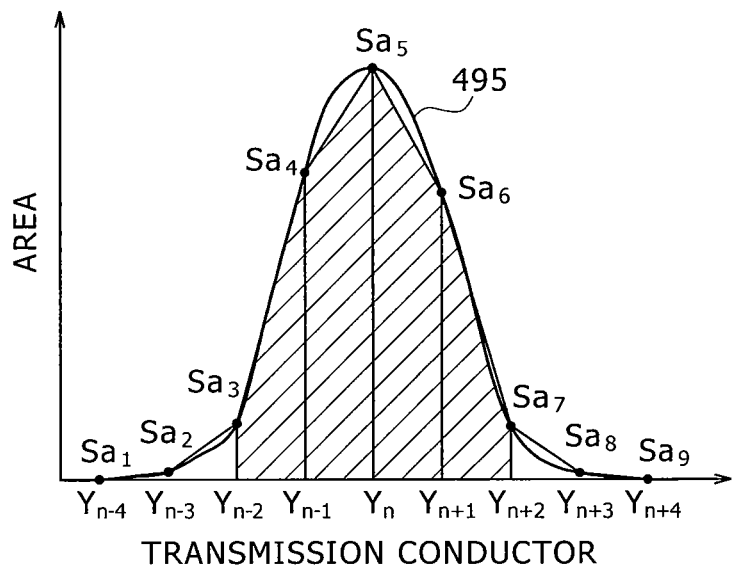
FIG. 69 is a graph illustrating a procedure of determination of the volume of a region defined by a level curved surface using trapezoid approximation according to the modification 28.

FIG. 69 illustrates a relationship between the positions of transmission conductors 12 and the areas $Sa_1$ to $Sa_9$ of the divisional planes 491 to 499 of the level curved surface 490 determined by the technique described hereinabove with reference to FIG. 69. In FIG. 69, the axis of abscissa indicates the positions of the transmission conductors 12, and the axis of ordinate indicates the areas of the divisional planes. A curve 495 in FIG. 69 is formed by joining data points of the areas $Sa_1$ to $Sa_9$.

The volume of the region surrounded by the level curved surface 495 corresponds to the area of a region surrounded by the axis of abscissa and the curve 495 in FIG. 69. Further, if adjacent data points of the areas $Sa_1$ to $Sa_9$ in FIG. 69 are interconnected by straight lines, then four trapezoidal regions are formed in the area between the transmission conductors $Y_{n-2}$ to $Y_{n+2}$. In the trapezoid approximation, the area of the portion surrounded by the axis of abscissa and a curve 495 in FIG. 69 is approximated as a sum value of the areas of the four trapezoidal regions formed between the transmission conductors $Y_{n-2}$ to $Y_{n+2}$ in FIG. 69. More particularly, the volume is determined in the following manner.

First, a weight value is applied to each of the data points $S_{a3}$ to $S_{a7}$ which define the region indicated by slanting lines in FIG. 69 in accordance with the trapezoidal approximation. For example, the weight 1 is applied to the data point $S_{a3}$; the weight 2 to the data point $S_{a4}$; the weight 2 to the data point $S_{a5}$; the weight 2 to the data point $S_{a6}$; and the weight 1 to the data point $S_{a7}$. Then, the volume $V_1$ of the level curved surface 490 is determined by dividing the "sum value of the areas of the weighted divisional planes" by the "average value of the weight values included in the trapezoidal shapes." In particular, the volume $V_1$ of the level curved surface 490 is given by:

$$\text{Volume } V_1 = (1 \times S_{a3} + 2 \times S_{a4} + 2 \times S_{a5} + 2 \times S_{a6} + 1 \times S_{a7})/2$$

Here, the "average value of the weight values," which is the denominator of the expression above, is determined by dividing the "sum total of the weight values at the data points" by the "number of the trapezoids." In the example above, $(1+2+2+2+1)/4=2$.

If the method of the trapezoid approximation described above is used, then since the error (offset) between the hypotenuses which form the four trapezoids in FIG. 69 and the curve 495 is small, the error between a result of calculation obtained using the trapezoid approximation, that is, the area of the slanting line portion, and the actual volume of the level curved surface 490 is also small. Therefore, by using the technique described above, the volume of the level curved surface 490 can be determined relatively accurately. Further, by determining the volume of the level curved surface 490 using such approximation calculation, the calculation load to be applied to the position detection circuit 35 can be reduced.

Further, in the method described above of weighted-adding the divisional planes, the square approximation may be used in place of the trapezoid approximation. In this instance, to the data points $S_{a3}$ to $S_{a7}$ which form the region indicated by slanting lies in FIG. 69, weighted values are applied in accordance with square approximation. For example, the weight 1 is applied to the data point $S_{a3}$; the weight 4 to the data point $S_{a4}$; the weight 2 to the data point $S_{a5}$; the weight 4 to the data point $S_{a6}$; and the weight 1 to the data point $S_{a7}$. In this instance, the volume $V_2$ of the level curved surface 490 is given by:

$$\text{Volume } V_2 = (1 \times S_{a3} + 4 \times S_{a4} + 2 \times S_{a5} + 4 \times S_{a6} + 1 \times S_{a7})/3$$

Here, the "average value of the weight values," which is the denominator of the expression above, is determined by dividing the "sum total of the weight values at the data points" by the "number of the trapezoids" and is $(1+4+2+4+1)/4=3$.

[Modification 29]

In the embodiments and the modifications described above, a number of spread codes $C_k$ smaller than the number of transmission conductors 12 are used and selectively supplied to the transmission conductors 12. However, for example, a number of different spread codes $C_k$ equal to the number of the transmission conductors 12 may be used such that the spread codes $C_k$ and the transmission conductors 12 correspond in a one-to-one corresponding relationship to each other without the necessity for switching the transmission conductors 12 to which the spread codes $C_k$ are to be supplied.

Figure 70:
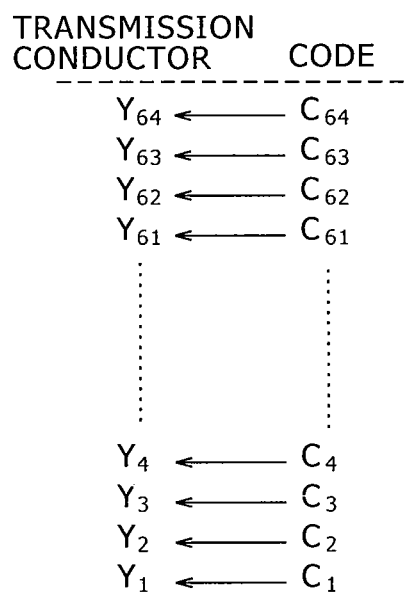
FIG. 70 is a diagrammatic view illustrating a supply of spread codes to different transmission conductors, respectively, where a number of spread codes equals to the number of transmission conductors according to a modification 29.

FIG. 70 illustrates an example wherein a number of spread codes equal to the number of transmission conductors are used and supplied to the respective different transmission conductors. Accordingly, in the present modification 29, the transmission conductor selection circuit 22 described hereinabove with reference to FIG. 1 is not required, similarly as in the second embodiment described hereinabove with reference to FIG. 20.

In the present modification 29, in order to supply a number of spread codes $C_k$ equal to the number of the transmission conductors 12, that is, 64 different spread codes $C_k$, the number of chips forming each spread code $C_k$ must be set to greater than 16 chips, which are used in the first embodiment described above, for example, to 64 chips or greater.

Figure 71:
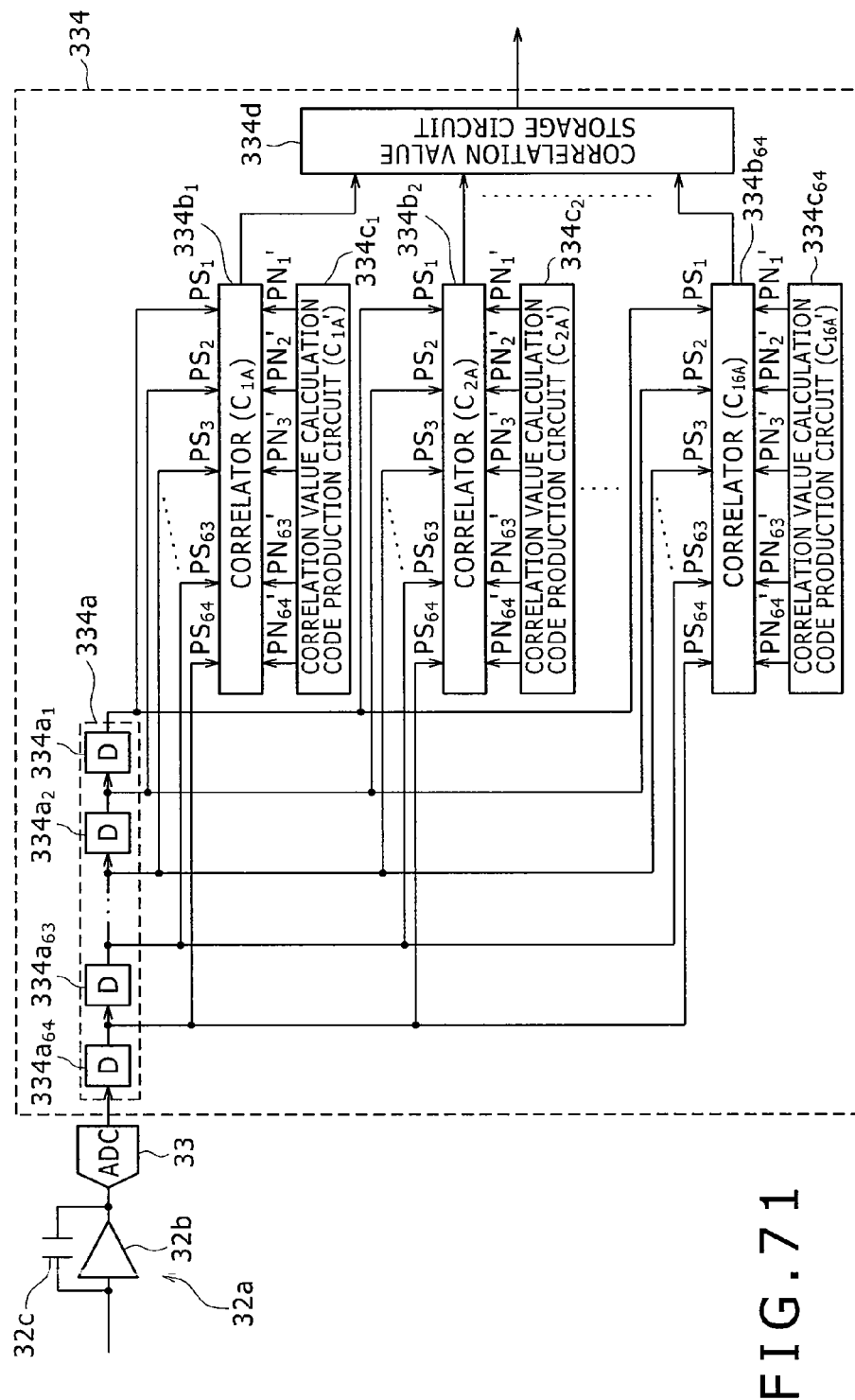
FIG. 71 is a block diagram showing a configuration of a correlation value calculation circuit according to the modification 29.

FIG. 71 shows a configuration of the correlation value calculation circuit 334 in the present modification 29. The correlation value calculation circuit 334 in the present modification 29 is different from the correlation value calculation circuit 34 in the first embodiment in that a signal delay circuit 334a provided in the correlation value calculation circuit 334 is composed of 64 D-flip-flop circuits $334a_1$ to $334a_{64}$ and that the number of correlators 334b for calculating correlation values and the number of correlation value calculation code production circuits 334c for supplying correlation value calculation codes to the correlators 334b are equal to the number of the spread codes $C_k$, that is, 64. It is to be noted that the configuration of the other part of the correlation value calculation circuit 334 in the present modification 29 is the same as that of the correlation value calculation circuit 34 in the first embodiment described hereinabove with reference to FIG. 8, and overlapping description of the same is omitted herein to avoid redundancy.

In the correlation value calculation circuit 334, the 64 correlators $334b_1$, $334b_2$, $334b_3$, . . . , $334b_{64}$ respectively multiply the 64 spread codes $C_1$ to $C_{64}$ illustrated in FIG. 71 by correlation value calculation codes $C_1'$ to $C_{64}'$, which respectively correspond to the spread codes $C_1$ to $C_{64}$, to calculate correlation values of the spread codes. In particular, the correlator $334b_1$ calculates a correlation value by multiplication of the spread code $C_1$ by the correlation value calculation code $C_{1A}'$, and the correlator $334b_2$ calculates a correlation value by multiplication of the spread code $C_2$ and the correlation value calculation code $C_{2A}'$. Similar multiplication is carried out until a correlation value is calculated with regard to all of the 64 spread codes $C_1$ to $C_{64}$. The calculated correlation values are stored in the correlation value storage circuit 334d.

Where the correlation values are calculated by the correlation value calculation circuit 334 shown in FIG. 71, since there is no necessity to switch between the transmission conductors 12 to which the spread codes $C_k$ are to be supplied, the configuration of the transmission section 200 can be further simplified.

While, in the present modification 29, a number of spread codes $C_k$ equal to the number of the transmission conductors 12 are used, the present invention is not limited to this configuration. For example, the same spread code $C_k$ may be supplied, for example, to two transmission conductors 12 positioned adjacent to each other as in the case of the modification 13 described hereinabove with reference to FIG. 41. In this instance, a number of spread codes $C_k$ need not equal the number of the transmission conductors 12, and a number of spread codes $C_k$ need equal only one half of the number of transmission conductors 12. In other words, 32 spread codes $C_k$ can be used while similar effects can be achieved.

[Modification 30]

When a pointer touches a cross point between a transmission conductor and a reception conductor, the variation of the capacitance value which appears at the cross point is very small. For example, while the capacitance value at a cross point when the pointer 19 does not touch the sensor section 100 is 0.5 pF, the variation amount of the capacitance value at the cross point when the pointer 19 touches the sensor section 100 is approximately 0.05 pF.

For example, an output signal obtained from an arbitrary one of the reception conductors 14 where a code string of a 2n-chip length is supplied exhibits the highest signal level when the mth chip (m is a natural number equal to or higher than 1 but equal to or lower than n) of each of all code strings supplied to the transmission conductors 12 is "1." This is because the signal level of the output signal increases in proportion to the sum of values obtained by multiplying the capacitance values at the cross points with the chips supplied to the cross points. Accordingly, for example, if Hadamard codes of a 16-chip length shown in FIG. 17A are supplied, then the output signal obtained from the reception conductor 14 exhibits the highest signal level when the 1st chips (all "1") of the Hadamard codes of the 16-chip length are supplied to the reception conductor 14.

On the other hand, the signal level of the output signal obtained when the pointer 19 touches a cross point is equal to the output signal in the form of a current signal obtained when the pointer 19 does not touch the cross point minus a current signal shunted through the pointer 19 at the cross point. Since the variation amount of the capacitance value at the cross point when the pointer 19 touches the cross point is very small, the variation amount of the current signal is very small. In order to detect the very small variation of the current signal, it is necessary to use an amplifier having a high amplification factor in the amplification circuit.

However, if an amplifier having an amplification factor suitable for the output signal obtained when the pointer 19 is touching is used, then a new problem arises whereby the output signal obtained when the 1st chip of the Hadamard code of the 16-chip length is supplied to the reception conductor 14 gets clipped. Conversely, if an amplifier having an amplification factor suitable for the output signal obtained when the 1st chip of the Hadamard code of the 16-chip length is supplied to the reception conductor 14 is used, then another problem arises whereby a very small variation of the output signal cannot be detected.

When code strings of the 2n-chip length which are different from each other are supplied to different transmission conductors 12, since the problem described above appears when all of the mth chips of the code strings are "1," if the mth chips (all "1") are prevented from being supplied to the transmission conductors 12, then the maximum value of the signal level of the output signal can be suppressed low. In particular, if the Hadamard codes of the 15-chip length illustrated in FIG. 17B are supplied, then the maximum value of the output signal can be suppressed lower by a value equal to the number of the Hadamard codes supplied to the transmission conductors 12. Thus, in the case of the Hadamard codes illustrated in FIG. 17B (16 Hadamard codes), the maximum value of the output signal can be suppressed by "16." In this instance, the level of the correlation value obtained when the Hadamard codes of the 15-chip length are supplied to the transmission conductors 12 is also suppressed to a fixed low level when the pointer 19 is not placed at any cross point of the reception conductor 14. The fixed level of the correlation value described above is hereinafter referred to as a "reference level."

However, where the Hadamard codes of the 15-chip length are supplied to the transmission conductors 12, a new problem arises that, if the pointer 19 touches a cross point, then the reference level varies. This is because, since the Hadamard codes of the 15-chip length are shorter in code length by one chip than the Hadamard codes of the 16-chip length, if the pointer 19 touches a cross point, then the reference level increases by an amount corresponding to the amount of current shunted at the cross point to the ground. Accordingly, if the pointer 19 touches a plurality of cross points at the same time, then the reference level varies by an amount corresponding to the number of the cross points touched by the pointer 19.

Figure 16B:
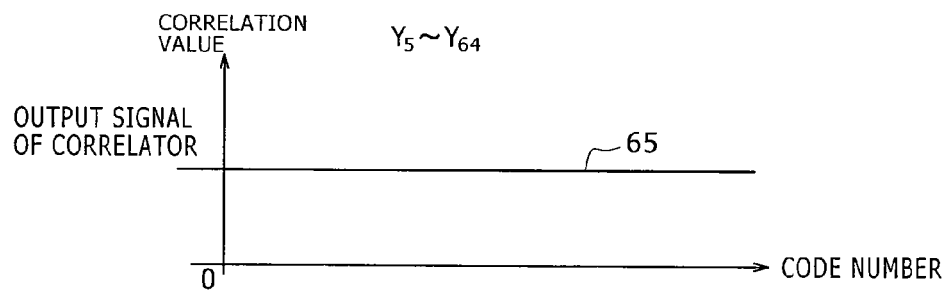
FIG. 16B is a graph illustrating a relationship between an output signal of the reception conductors and a spread code where the spread code is supplied to transmission conductors shown in FIG. 15 on which no pointer is placed.

The decision of whether or not the pointer 19 touches a cross point is carried out, for example, by comparing the signal level of the output signal with a predetermined threshold value (see FIGS. 16A and 16B). Since the pointer detection apparatus according to the present invention can detect a plurality of pointers at the same time, for example, the palm of the hand may possibly be placed on the sensor section 100, or a plurality of pointers such as, for example, a plurality of fingers, may possibly touch a plurality of cross points on the same reception conductor array 13 at the same time. In those cases, the reference level of the output signal of the reception conductor 14 varies by a great amount. As a result, the level of the correlation value at the cross point which the pointer 19 touches may vary by a great amount such that the signal level of the output signal will not exceed the threshold value, resulting in wrong decision.

In the following, a modification 30 which solves the problem described above is described with reference to FIGS. 72 and 73. The pointer detection apparatus 3 according to the present modification 30 is similar to the pointer detection apparatus 1 according to the first embodiment described hereinabove with reference to FIG. 1 except that the spread code supplying circuit 21 and an amplification circuit 332 are connected to each other in order to supply one of the spread codes $C_k$, which are supplied from the spread code supplying circuit 21 to the sensor section 100, directly to the amplification circuit 332. It is to be noted that the reception conductor selection circuit 31 is omitted in FIG. 73 in order to avoid complicated illustration. Further, for ease of understanding, only a region of the sensor section 100 where the transmission conductors $Y_1$ to $Y_6$ cross the reception conductors $X_{123}$ to $X_{128}$ is shown in FIG. 73, and the following description is given in regard to a case in which the spread codes $C_k$ are respectively supplied to the transmission conductors $Y_1$ to $Y_6$ and output signals from the reception conductors $X_{123}$ to $X_{128}$ are detected. It is to be noted that like components to those of the pointer detection apparatus 1 of the first embodiment are denoted by like reference characters and overlapping description of the like components is omitted herein to avoid redundancy.

Figure 72:
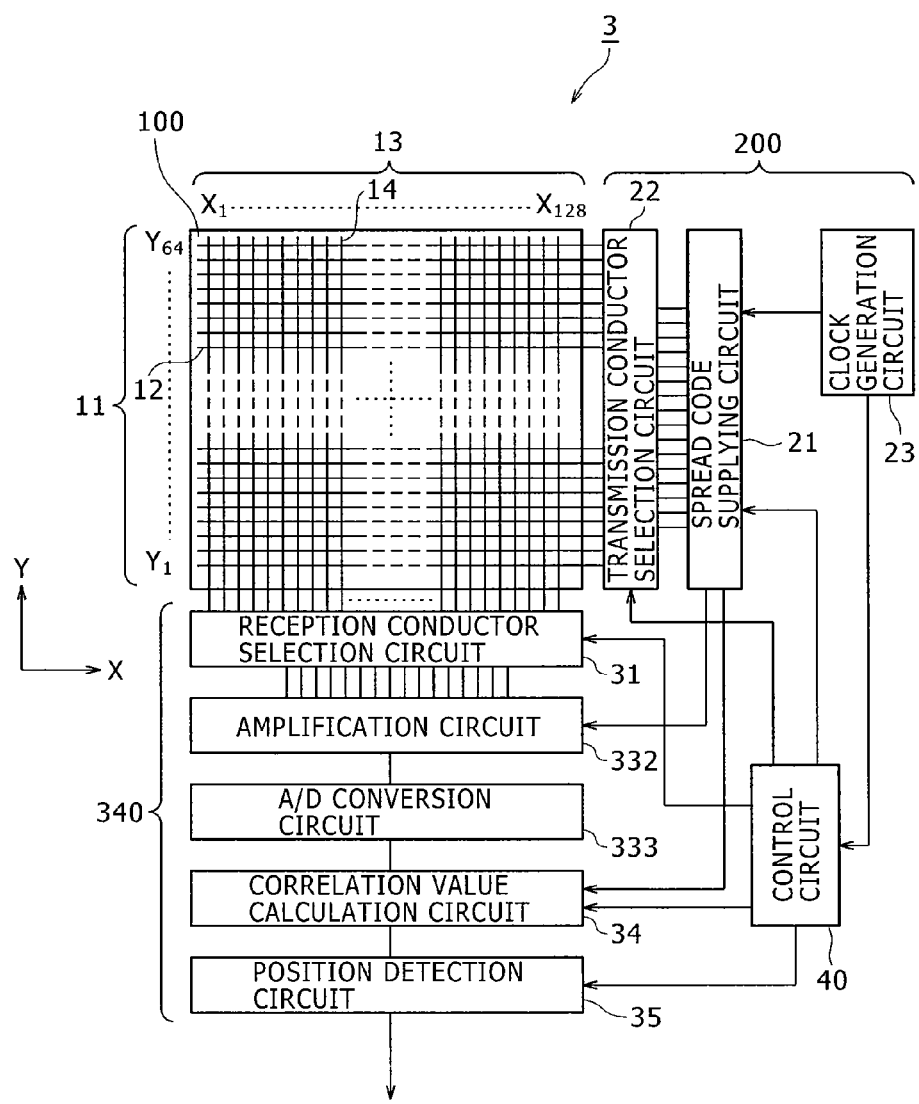
FIG. 72 is a block diagram showing a configuration of a pointer detection apparatus according to a modification 30.
Figure 73:
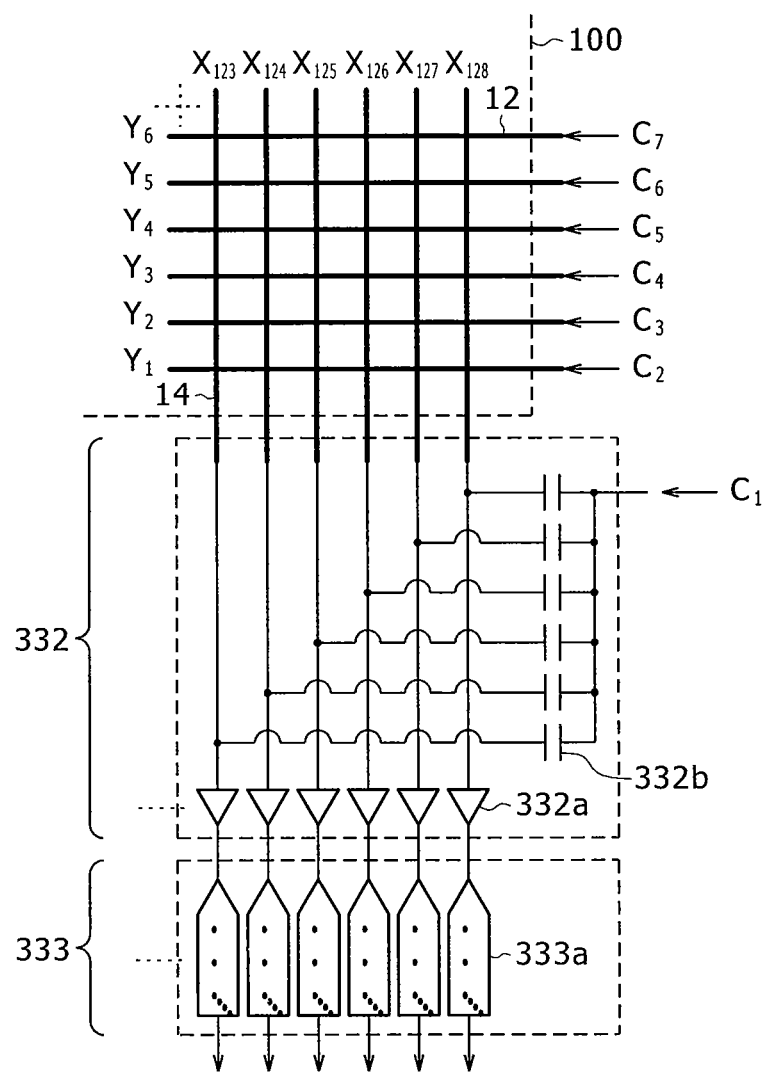
FIG. 73 is a diagrammatic view showing a general configuration of a reception section according to the modification 30.

Referring first to FIG. 72, the spread code supplying circuit 21 is connected to an amplification circuit 332 in addition to a transmission conductor selection circuit 22, a clock generation circuit 23, a correlation value calculation circuit 34, and a control circuit 40. From among a plurality of spread code production circuits 24 which form the spread code supplying circuit 21, for example, an arbitrary spread code production circuit 24 is connected to the amplification circuit 332. A spread code, for example, the spread code $C_1$, output from the spread code production circuit 24 connected directly to the amplification circuit 332 is supplied directly to the amplification circuit 332 of a reception section 340 without passing through any transmission conductor 12 so that the spread code $C_1$ is used as a calibration signal or a reference signal having a reference level for correlation characteristic.

The reception section 340 in the modification 30 is described with reference to FIG. 73. The amplification circuit 332 includes the number of I/V conversion circuits 332a equal to the number of reception conductors 14, and the number of capacitors 332b equal to the number of I/V conversion circuits 332a. The capacitors 332b are provided between the spread code production circuit 24 (not shown) for generating the spread code $C_1$ and the I/V conversion circuits 332a. Accordingly, the spread code $C_1$ is supplied to the I/V conversion circuits 332a through the capacitors 332b. It is to be noted that spread code production circuits 24 which generate the other spread codes $C_2$ to $C_7$ are connected to the transmission conductors $Y_1$ to $Y_6$, respectively.

Since the spread code $C_1$ is supplied to the capacitors 332b, output signals output from the reception conductors 14 are combined with current signals (calibration signals) generated when the spread code $C_1$ is supplied to the capacitors 332b and are input to the I/V conversion circuits 332a. The output signals combined with the calibration signal are converted into voltage signals, amplified, and output by the I/V conversion circuits 332a.

An A/D conversion circuit 333 includes the number of A/D converters 333a equal to the number of I/V conversion circuits 332a which form the amplification circuit 332. Each of the A/D converters 333a is connected to a corresponding one of the I/V conversion circuits 332a. A voltage signal output from each of the I/V conversion circuits 332a is input to the A/D conversion circuit 333, by which it is converted into a digital signal. The digital signal is output to a position detection circuit 35 shown in FIG. 72.

The correlation value calculation circuit 34 carries out correlation calculation with correlation value calculation codes corresponding to the spread codes. Here, since the spread code $C_1$ is directly input to the amplification circuit 332 which forms the reception section 340 without passing through any of the transmission conductors 12 and the reception conductors 14, signal components of the spread code $C_1$ do not include a variation factor introduced by the transmission conductors 12 and the reception conductors 14. As a result, a result of the correlation calculation based on a correlation value calculation code $C_1'$ corresponding to the spread code $C_1$, that is, a correlation value, is a value which is fixed and always stable.

In the present modification 30, this fixed correlation value is used as a reference level. In particular, the correlation value calculation circuit 34 carries out correlation calculation with the correlation value calculation code $C_1'$ of the spread code $C_1$ for the digital signals input from the A/D conversion circuit 333. Then, a correlation value obtained by the correlation calculation is stored as a reference level of correlation characteristics, for example, in the correlation value storage circuit 34d shown in FIG. 8. Thereafter, the correlation value calculation circuit 34 carries out correlation calculation regarding the correlation value calculation codes $C_2'$ to $C_7'$ corresponding to the spread codes $C_2$ to $C_7$, respectively, similarly as in the first embodiment described hereinabove, and stores correlation values which are the results of the calculation in the correlation value storage circuit 34d.

Then, the position detection circuit 35 (see FIG. 1) determines whether or not a pointer 19 is touching the sensor section 100 based on the correlation values, which are calculated in regard to the spread codes $C_2$ to $C_7$ and stored in the correlation value storage circuit 34d, the correlation value corresponding to the reference level for correlation characteristics, and a predetermined threshold value. In particular, the position detection circuit 35 subtracts the value of the reference level for correlation characteristics from the correlation values calculated with regard to the spread codes $C_2$ to $C_7$. Then, the position detection circuit 35 compares the resulting difference values with the predetermined threshold value to determine whether or not one or more pointers 19 exist on the sensor section 100.

By supplying a predetermined one of a plurality of spread codes to the reception section directly without going through any of the transmission conductors 12 and the reception conductors 14 and using the spread code as a calibration signal or a reference signal for the reference level for correlation characteristics in this manner, even if variation occurs with the reference level, a touched position of the pointer 19 can be detected accurately.

[Modification 31]

In the modification 30 described above, output signals from the reception conductors and the calibration signal are combined while they remain in the form of an analog signal before they are input to the A/D conversion circuit. Where the calibration signal and the output signals are combined in the form of an analog signal, since this can be implemented with only the capacitors 332b, the circuit configuration can be simplified.

However, it is necessary for the capacitors 332b to have a capacitance value set so as to be substantially equal to that of the capacitors formed between the transmission conductors 12 and the reception conductors 14. Since the capacitance of a capacitor formed at a cross point between a transmission conductor 12 and a reception conductor 14 is approximately 0.5 pF and very low, it is difficult to mount such capacitors on an actual circuit board. Further, in the modification 30, since the calibration signal and the reception signals are combined while they remain in the form of an analog signal, an error may be introduced.

Therefore, in the present modification 31, the calibration signal is combined with output signals of the A/D conversion circuit, that is, with reception signals after being converted into digital signals.

Figure 74:
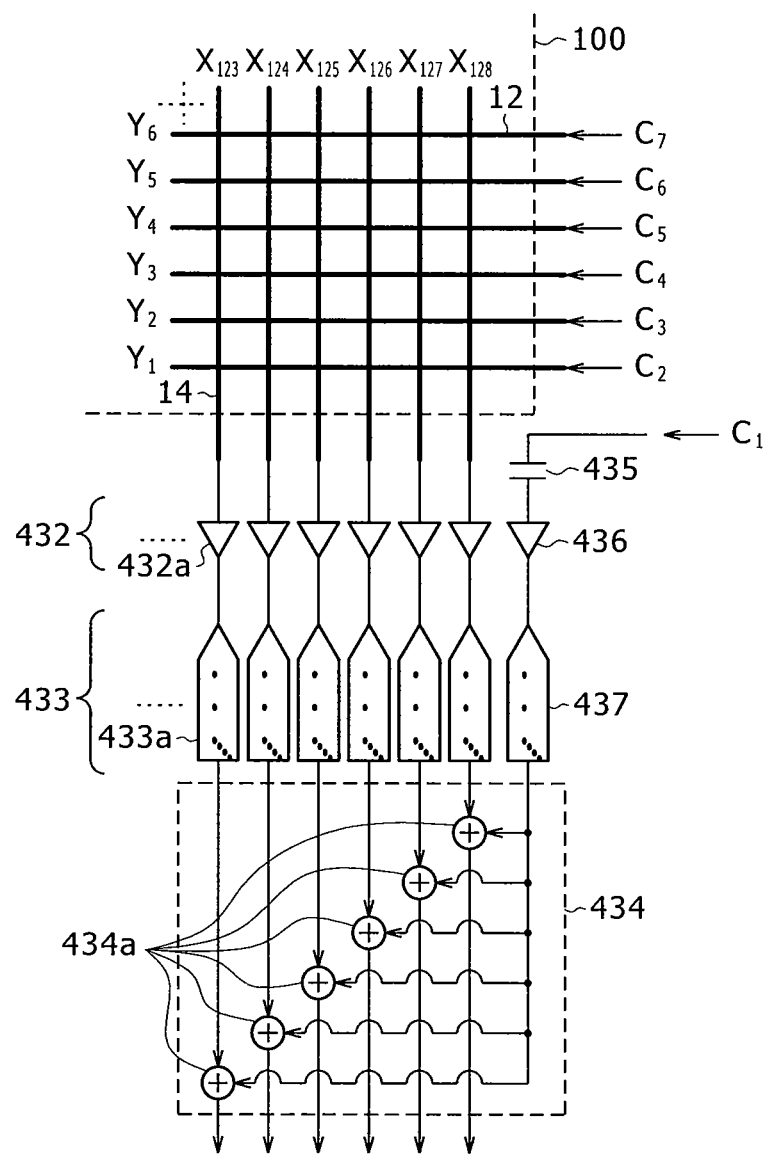
FIG. 74 is a diagrammatic view showing a general configuration of a reception section according to a modification 31.
Figure 75A:
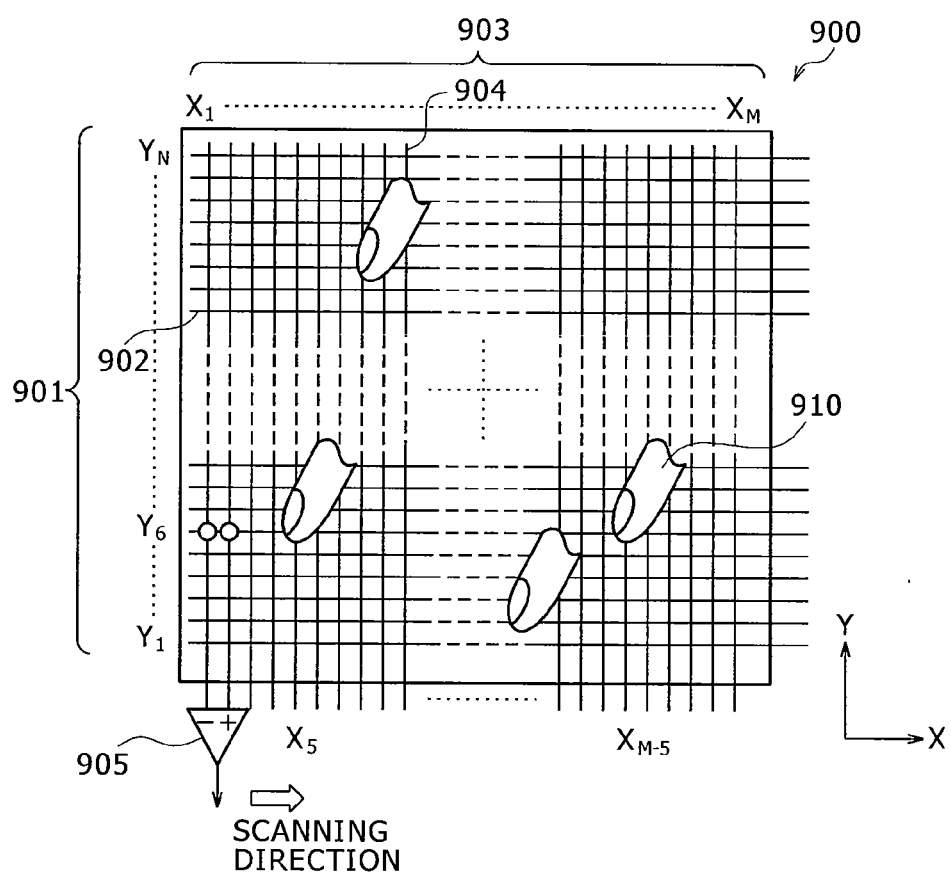
FIG. 75A is a schematic view showing a general configuration of a conventional pointer detection apparatus.
Figure 75B:
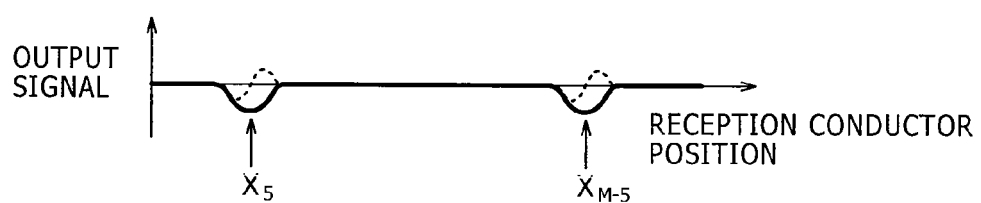
FIG. 75B is a waveform diagram of an output signal of the pointer detection apparatus of FIG. 72A.

An example of a configuration for combining a calibration signal and reception signals having been converted into digital signals is described with reference to FIG. 74. The present modification 31 includes, between the A/D conversion circuit 433 and the correlation value calculation circuit 34 (see FIG. 72), an adder array 434 that combines digital signals output from the A/D conversion circuit 433 with a calibration signal converted into a digital signal. The present modification 31 also includes a capacitor 435, an I/V conversion circuit 436, and an A/D converter 437. The capacitor 435 supplies a spread code to be used as a calibration signal directly to the reception section. The I/V conversion circuit 436 converts a current signal into a voltage signal. The A/D converter 437 converts the calibration signal into a digital signal. The other components are similar to those of the modification 30 described hereinabove with reference to FIG. 72, and like elements are denoted by like reference characters, and overlapping description of the same is omitted herein to avoid redundancy.

When the spread code $C_1$ is supplied to the capacitor 435, a current signal is supplied to the I/V conversion circuit 436. The I/V conversion circuit 436 converts the current signal input thereto into a voltage signal and amplifies and outputs the voltage signal. The voltage signal output from the I/V conversion circuit 436 is converted into a digital signal by the A/D converter 437 and then input to the adder array 434.

The adder array 434 is formed of a number of adders 434a equal to the number of A/D converters 433a which form the A/D conversion circuit 433. Each of the adders 434a is interposed between an A/D converter 433a connected to the reception conductors 14 and an input terminal of the correlation value calculation circuit 34 such that the adders 434a receive a digital signal output from each of the A/D converters 433a and the calibration signal also converted into a digital signal by the A/D converter 437. Then, the adders 434a combine (add) the output signals and the calibration signal, respectively, and output the combined digital signals.

The digital output signals combined with the calibration signal by the adders 434a are then input to the correlation value calculation circuit 34. The correlation value calculation circuit 34 carries out correlation calculation.

In the configuration example described above with reference to FIG. 74, adjustment of the reference level can be carried out similarly as in the example shown in FIG. 73. In the present modification 31, since the calibration signal and the reception signals are combined as digital signals, by using a capacitor of, for example, 8 pF, as the capacitor 435 provided for supplying the calibration signal (8 pF being 16 times the capacitance of 0.5 pF at each cross point between a transmission conductor 12 and a reception conductor 14) and by dropping 4-bits worth of data in the A/D converter 437, signal combination can be achieved with a higher degree of accuracy than where such combination is carried out in analog signals. a capacitor of 0.5 pF is formed at each of the cross points between the transmission conductor array 11 and the reception conductor array 13.

It is to be noted that, while, in the present embodiment 31, one spread code is used as a calibration signal for adjusting the reference level, the present invention is not limited to this configuration. For example, two or more spread codes may be supplied as calibration signals.

While preferred embodiments of the present invention have been described using specific terms, such description is for illustrative purposes only, and it is to be understood that changes and variations may be made without departing from the spirit or scope of the following claims.

What is claimed is:

1. A pointer detection apparatus for detecting a pointer positioned on a conductor pattern, the conductor pattern including a plurality of first conductors disposed in a first direction and a plurality of second conductors disposed in a second direction which crosses the first direction, the pointer detection apparatus comprising:

a code supplying circuit having a plurality of code strings of different codes from each other, the code supplying circuit being configured to supply predetermined ones of the code strings to the first conductors disposed in the first direction;

a correlation calculation code supplying circuit configured to supply correlation calculation codes that respectively correspond to the code strings;

a correlation calculation circuit configured to carry out correlation calculation between signals produced in the second conductors disposed in the second direction and the correlation calculation codes;

a detection circuit configured to detect the pointer positioned on said conductor pattern based on a level curve that results from the correlation calculation, the detection circuit being further configured to: (a) apply logarithmic conversion to the level curve; (b) determine a ratio between a gradient of an edge and a peak value of the level curve to which the logarithmic conversion is applied; (c) determine the pointer to be in a first hovering state at or beyond a first distance away from the conductor pattern if the ratio is at or below a first threshold value; (d) determine the pointer to be in a second hovering state at or within the first distance away from the conductor pattern if the ratio is at or above the first threshold value and at or below a second threshold value greater than the first threshold value; and (e) determine the pointer to be in contact with the conductor pattern if the ratio is at or above the second threshold value; and a conductor selection circuit configured to select, (i) in case the detection circuit determines the pointer to be in contact with the conductor pattern, one of the first conductors to which one of the code strings is supplied, and (ii) in case the detection circuit determines the pointer to be in the first or second hovering state, a plurality of the first conductors, which are connected with each other and to which one of the code strings is simultaneously supplied, and/or a plurality of the second conductors, which are connected with each other and from which the signals are received by the correlation calculation circuit for correlation calculation, wherein the width for pointer detection formed by a plural number of the first conductors to which said one of the code strings is simultaneously supplied is less than the width for pointer detection formed by a plural number of the second conductors from which the signals are received for the correlation calculation in case the first conductors are disposed farther away from a detection surface of the apparatus than the second conductors.

2. The pointer detection apparatus according to claim 1, further comprising:

a substrate having a surface on which said conductor pattern including the first conductors disposed in the first direction and the second conductors disposed in the second direction which crosses the first direction is disposed; and an insulating member disposed in a region in which the first conductors disposed in the first direction and the second conductors disposed in the second direction which is orthogonal to the first direction cross each other, for electrically isolating the first conductors disposed in the first direction from the second conductors disposed in the orthogonal direction;

wherein the first conductors disposed in the first direction are formed in a pattern having a plurality of land portions that are electrically connected to each other; and wherein the second conductors disposed in the second direction are formed in a line-shaped pattern.

3. The pointer detection apparatus according to claim 1, further comprising:

a substrate having a surface on which the first conductors disposed in the first direction are disposed and another surface on which the second conductors disposed in the second direction are disposed;

wherein the first conductors disposed in the first direction are formed in a pattern having a plurality of land portions that are electrically connected to each other; and wherein the second conductors disposed in the second direction are formed in a line-shaped pattern.

4. The pointer detection apparatus according to claim 1, wherein the first direction is a concentric circumferential direction around a predetermined central point, and the second direction is a radial direction extending from the central point.

5. The pointer detection apparatus according to claim 1, wherein a contact state between the pointer and said conductor pattern is determined based on a maximum value of the level curve and a distribution characteristic in the proximity of the maximum value.

6. The pointer detection apparatus according to claim 1, wherein the detection circuit is further configured to detect pressure applied by the pointer on said conductor pattern based on a spatial distribution of the level curve detected by said detection circuit.

7. The pointer detection apparatus according to claim 1, wherein a plural number of the first conductors to which said one of the code strings is simultaneously supplied is greater when the pointer is in the first hovering state than when the pointer is in the second hovering state.

8. A pointer detection apparatus for detecting a pointer positioned on a conductor pattern, the conductor pattern including a plurality of first conductors disposed in a first direction and a plurality of second conductors disposed in a second direction which crosses the first direction, the pointer detection apparatus comprising:

a code supplying circuit having a plurality of code strings of different codes from each other, the code supplying circuit being configured to supply predetermined ones of the plurality of code strings to the first conductors disposed in the first direction;

a correlation calculation circuit configured to carry out correlation calculation between signals produced in the second conductors disposed in the second direction and correlation calculation codes that respectively correspond to the code strings;

a detection circuit configured to detect the pointer positioned on said conductor pattern based on a level curve that results from the correlation calculation, the detection circuit being further configured to: (a) apply logarithmic conversion to the level curve; (b) determine a ratio between a gradient of an edge and a peak value of the level curve to which the logarithmic conversion is applied; (c) determine the pointer to be in a first hovering state at or beyond a first distance away from the conductor pattern if the ratio is at or below a first threshold value; (d) determine the pointer to be in a second hovering state at or within the first distance away from the conductor pattern if the ratio is at or above the first threshold value and at or below a second threshold value greater than the first threshold value; and (e) determine the pointer to be in contact with the conductor pattern if the ratio is at or above the second threshold value; and a conductor selection circuit configured to select, (i) in case the detection circuit determines the pointer to be in contact with the conductor pattern, one of the first conductors to which one of the code strings is supplied, and (ii) in case the detection circuit determines the pointer to be in the first or second hovering state, a plurality of the first conductors, which are connected with each other and to which one of the code strings is simultaneously supplied, and/or a plurality of the second conductors, which are connected with each other and from which the signals are received by the correlation calculation circuit for correlation calculation, wherein the width for pointer detection formed by a plural number of the first conductors to which said one of the code strings is simultaneously supplied is less than the width for pointer detection formed by a plural number of the second conductors from which the signals are received for the correlation calculation in case the first conductors are disposed farther away from a detection surface of the apparatus than the second conductors.

9. A pointer detection method for detecting a pointer positioned on a conductor pattern, the conductor pattern including a plurality of first conductors disposed in a first direction and a plurality of second conductors disposed in a second direction which crosses the first direction, the method comprising:

a code supplying step for supplying predetermined ones of a plurality of code strings of different codes to the first conductors disposed in the first direction;

a correlation calculation code supplying step for supplying correlation calculation codes that respectively correspond to the code strings;

a correlation calculation processing step for carrying out correlation calculation between signals produced in the second conductors disposed in the second direction and the correlation calculation codes;

a position detection step for detecting the pointer positioned on the conductor pattern based on a level curve resulting from the correlation calculation, the position detection step including: (a) applying logarithmic conversion to the level curve; (b) determining a ratio between a gradient of an edge and a peak value of the level curve to which the logarithmic conversion is applied; (c) determining the pointer to be in a first hovering state at or beyond a first distance away from the conductor pattern if the ratio is at or below a first threshold value; (d) determining the pointer to be in a second hovering state at or within the first distance away from the conductor pattern if the ratio is at or above the first threshold value and at or below a second threshold value greater than the first threshold value; and (e) determining the pointer to be in contact with the conductor pattern if the ratio is at or above the second threshold value; and a conductor selection step for selecting, (i) in case the detection circuit determines the pointer to be in contact with the conductor pattern, one of the first conductors to which one of the code strings is supplied, and (ii) in case the pointer is determined to be in the first or second hovering state, a plurality of the first conductors, which are connected with each other and to which one of the code strings is simultaneously supplied, and/or a plurality of the second conductors, which are connected with each other and from which the signals are received for the correlation calculation, wherein the width for pointer detection formed by a plural number of the first conductors to which said one of the code strings is simultaneously supplied is less than the width for pointer detection formed by a plural number of the second conductors from which the signals are received for the correlation calculation in case the first conductors are disposed farther away from a detection surface of the apparatus than the second conductors.

10. The pointer detection method according to claim 9, wherein a plural number of the first conductors to which said one of the code strings is simultaneously supplied is greater when the pointer is in the first hovering state than when the pointer is in the second hovering state.

\* \* \* \* \*